(12) United States Patent
Kovacevic et al.

(10) Patent No.: US 7,376,692 B2
(45) Date of Patent: *May 20, 2008

(54) METHOD AND SYSTEM FOR RECEIVING AND FRAMING PACKETIZED DATA

(75) Inventors: Branko Kovacevic, Willowdale (CA); Kevork Kechichian, Unionville (CA)

(73) Assignee: ATI Technologies, Inc., Markham, Ontario (CA)

( * ) Notice: Subject to any disclaimer, the term of this patent is extended or adjusted under 35 U.S.C. 154(b) by 715 days.

This patent is subject to a terminal disclaimer.

(21) Appl. No.: 10/818,812

(22) Filed: Apr. 6, 2004

(65) Prior Publication Data

US 2005/0021813 A1 Jan. 27, 2005

Related U.S. Application Data

(62) Division of application No. 09/490,350, filed on Jan. 24, 2000, now Pat. No. 6,763,390.

(51) Int. Cl.
*G06F 15/16* (2006.01)
(52) U.S. Cl. .................. 709/200; 709/231; 713/400
(58) Field of Classification Search ........ 709/200–202, 709/223–224, 231; 713/400, 500
See application file for complete search history.

(56) References Cited

U.S. PATENT DOCUMENTS

| | | | |
|---|---|---|---|
| 5,457,701 | A | 10/1995 | Wasilewski et al. |
| 5,506,904 | A | 4/1996 | Sheldrick et al. |
| 5,517,250 | A | 5/1996 | Hoogenboom et al. |
| 5,521,927 | A | 5/1996 | Kim et al. |

(Continued)

FOREIGN PATENT DOCUMENTS

EP 0942603 A2 9/1999

(Continued)

OTHER PUBLICATIONS

Zhigang Chen, et al.,"Real Time Video and Audio in the World Wide Web," pp. [online] [Retrieved from the Internet Oct. 30, 2002 at URL <http://www.geckil.com/~harvest/mirror/www.w3.org/Conferences/WWW4/Papers/p211/>.

(Continued)

*Primary Examiner*—Moustafa Meky

(57) ABSTRACT

In accordance with a specific aspect of the present invention, a compressed video stream, such as an MPEG-2 video stream, is received by a transport demultiplexor, synchronized, parsed into separate packet types, and written to buffer locations external the demultiplexor. Adaptation field is handled by a separate parser. In addition, primary elementary stream data can be handled by separate primary elementary stream parsers based upon the packet identifier of the primary elementary stream. Video packets can be parsed based upon stream identifier values. Specific packets of data are stored in one or more system memory or video memory buffers by an output controller based upon allocation table information. Private data associated with specific elementary streams or packet adaptation fields are repacketized, and written to an output buffer location. In specific implementations, the hardware associated with the system is used to acquire the data stream without any knowledge of the specific protocol of the stream. In another embodiment, the hardware is used to implement a splicing of streams of data.

33 Claims, 38 Drawing Sheets

U.S. PATENT DOCUMENTS

| | | | |
|---|---|---|---|
| 5,534,944 A | 7/1996 | Egawa et al. |
| 5,559,999 A | 9/1996 | Maturi et al. |
| 5,598,415 A | 1/1997 | Nuber et al. |
| 5,691,664 A | 11/1997 | Anderson |
| 5,703,887 A | 12/1997 | Heegard et al. |
| 5,726,989 A | 3/1998 | Dokic |
| 5,742,623 A | 4/1998 | Nuber et al. |
| 5,754,783 A | 5/1998 | Mendelson et al. |
| 5,768,292 A | 6/1998 | Galbi |
| 5,778,191 A | 7/1998 | Levine et al. |
| 5,801,781 A | 9/1998 | Hiroshima et al. |
| 5,805,602 A | 9/1998 | Cloutier et al. |
| 5,809,538 A | 9/1998 | Pollmann et al. |
| 5,812,760 A | 9/1998 | Mendenhall et al. |
| 5,812,976 A | 9/1998 | Ryan |
| 5,828,416 A | 10/1998 | Ryan |
| 5,831,690 A | 11/1998 | Lyons et al. |
| 5,835,493 A | 11/1998 | Magee et al. |
| 5,841,472 A | 11/1998 | Rim et al. |
| 5,856,973 A | 1/1999 | Thompson |
| 5,859,660 A | 1/1999 | Perkins et al. |
| 5,901,178 A | 5/1999 | Lee et al. |
| 5,917,830 A | 6/1999 | Chen et al. |
| 5,920,572 A | 7/1999 | Washington et al. |
| 5,923,860 A | 7/1999 | Olarig |
| 5,936,640 A | 8/1999 | Horan et al. |
| 5,946,318 A | 8/1999 | Post |
| 5,948,119 A | 9/1999 | Bock et al. |
| 5,949,436 A | 9/1999 | Horan et al. |
| 5,959,659 A | 9/1999 | Dokic |
| 5,982,436 A | 11/1999 | Balakrishnan et al. |
| 5,990,958 A | 11/1999 | Bheda et al. |
| 6,014,368 A | 1/2000 | Sanami |
| 6,038,000 A | 3/2000 | Hurst, Jr. |
| 6,043,828 A | 3/2000 | Ort |
| 6,058,459 A | 5/2000 | Owen et al. |
| 6,067,303 A | 5/2000 | Aaker et al. |
| 6,108,046 A | 8/2000 | Wu et al. |
| 6,118,462 A | 9/2000 | Margulis |
| 6,122,123 A | 9/2000 | Saeijs et al. |
| 6,128,026 A | 10/2000 | Brothers, III |
| 6,134,272 A | 10/2000 | Rim |
| 6,137,834 A | 10/2000 | Wine et al. |
| 6,141,358 A | 10/2000 | Hurst, Jr. et al. |
| 6,157,674 A | 12/2000 | Oda et al. |
| 6,173,333 B1 | 1/2001 | Jolitz et al. |
| 6,181,706 B1 | 1/2001 | Anderson et al. |
| 6,181,713 B1 | 1/2001 | Patki et al. |
| 6,188,703 B1 | 2/2001 | Dobson et al. |
| 6,223,211 B1 | 4/2001 | Hamilton et al. |
| 6,226,291 B1 | 5/2001 | Chauvel et al. |
| 6,226,769 B1 | 5/2001 | Schuster et al. |
| 6,233,256 B1 | 5/2001 | Dieterich et al. |
| 6,236,432 B1 | 5/2001 | Lee |
| 6,269,107 B1 | 7/2001 | Jong |
| 6,275,507 B1 | 8/2001 | Anderson et al. |
| 6,275,534 B1 | 8/2001 | Shiojiri |
| 6,285,408 B1 | 9/2001 | Choi et al. |
| 6,292,490 B1 | 9/2001 | Gratacap et al. |
| 6,298,089 B1 | 10/2001 | GTazit |
| 6,301,248 B1 | 10/2001 | Jung et al. |
| 6,310,652 B1 | 10/2001 | Li et al. |
| 6,310,898 B1 | 10/2001 | Schwartz |
| 6,310,922 B1 | 10/2001 | Canfield et al. |
| 6,323,910 B1 | 11/2001 | Clark, III |
| 6,330,285 B1 | 12/2001 | Crosby et al. |
| 6,333,938 B1 | 12/2001 | Baker |
| 6,336,200 B1 | 1/2002 | Wolfgang |
| 6,351,471 B1 | 2/2002 | Robinett et al. |
| 6,356,567 B2 | 3/2002 | Anderson et al. |
| 6,359,911 B1 | 3/2002 | Movshovich |
| 6,378,035 B1 | 4/2002 | Parry et al. |
| 6,380,991 B1 | 4/2002 | Teichmer |
| 6,414,954 B1 | 7/2002 | Miyamoto |
| 6,424,658 B1 | 7/2002 | Mathur |
| 6,425,021 B1 | 7/2002 | Ghodrat et al. |
| 6,427,169 B1 | 7/2002 | Elzur |
| 6,434,146 B1 | 8/2002 | Movshovich et al. |
| 6,434,170 B1 | 8/2002 | Movshovich et al. |
| 6,438,145 B1 | 8/2002 | Movshovich et al. |
| 6,449,352 B1 | 9/2002 | Takahashi et al. |
| 6,449,656 B1 | 9/2002 | Elzur |
| 6,463,059 B1 | 10/2002 | Movshovich et al. |
| 6,463,486 B1 | 10/2002 | Parry et al. |
| 6,493,847 B1 | 12/2002 | Sorgi et al. |
| 6,512,775 B1 | 1/2003 | Eleftheriades et al. |
| 6,526,175 B2 | 2/2003 | Sodagar et al. |
| 6,538,999 B1 | 3/2003 | Sato |
| 6,557,031 B1 | 4/2003 | Mimura et al. |
| 6,567,471 B1 | 5/2003 | Yoshinari |
| 6,573,942 B1 | 6/2003 | Crinon |
| 6,621,870 B1 | 9/2003 | Gordon et al. |
| 2003/0206605 A1 | 11/2003 | Anderson |

FOREIGN PATENT DOCUMENTS

EP    1014730 A1    6/2000

OTHER PUBLICATIONS

J. Civanlar, et al., "RTP Payload Format for Bundled MPEG," May 1998, 8 pp. [online] [Retrieved from the Internet Oct. 30, 2002 @ URL <http://www.geckil.com/~harvest/rfc/rfc2343.txt>.

D. Hoffman, et al., "RTP Payload Format for MPEG1/MPEG2 Video," Jan. 1998 [online] [Retrieved from the Internet Oct. 30, 2002 @ URL <http://www.geckil.com/~harvest/rfc/rfc2250.txt>.

J.-C. Bolot and T. Turletti, "Adaptive Error Control for Packet Video in the Internet," International Conference on Image processing, 1996. Proceedings, pp. 25-28, vol. 1, Sep. 16-19, 1996, ISBN 0-7803-3259-8.

Jian Feng, et al., "Error Concealment for MPEG Video Transmissions," Mar. 13, 1997, IEEE Transactions on Consumer Electronics, pp. 183-187, vol. 43, Issue 2, ISSN 0098-3063.

Le Gull, "MPEG: Video Compression Standard for Multimedia Applications,""Communications of the ACM, Apr. 1991, vol. 34, No. 4, pp. 47-58."

Wenw Zhu et al., "End-to-end Modeling and Simulation of MPEG-2 Transport Streams over ATM Networks with Jitter," 1998 IEEE Transactions on Circuits and Systems for Video Technology, vol. 8, No. 1, Feb. 1998, pp. 9-12.

A. Kassler, O. Schirpf, "Simulating MPEG-2 Transport Stream Transmission over Wireless ATM," 1999 IEEE, 0-7803-5041-3/99, pp. 3057-3060.

--PRIOR ART--

--PRIOR ART--

| Transport Demultiplexer Global Status Register | | | | |
|---|---|---|---|---|
| Field Name | Bits Len Default | | Type | Description |
| FramerSyncLock | 0 [ 1] | 0 | R/W | This bit is set to '1' after the frame synchronization has been acquired. WR_ACC_CLEAR. |
| FramerSyncDrop | 1 [ 1] | 0 | R/W | This bit is set to '1' after the frame synchronization has been lost. WR_ACC_CLEAR. |
| | | | | |
| CurrentFramerState | 20-22 [ 3] | '000' | R | This 3 bit field codes the current state of the framer:<br><br>'000' – Capturing a byte<br>'001' – Out of TP frame synchronization<br>'010' – Searching for synchronization<br>'011' – Checking for synchronization<br>'100' – In the TP frame synchronization<br><br>NOTE: Only a framer state machine updates this field. Write access does not modify it. |
| | | | | |
| UnusedField | 29-31 [ 3] | '000' | R/W | Unused and reserved field. |

FIGURE 12

| Transport Demultiplexer Interrupt Mask Register | | | | |
|---|---|---|---|---|
| Field Name | Bits Len Default | | Type | Description |
| EventInterruptMask | 0-18 [19] | 0 | R/W | If set to '1' enables local sources of interrupts.<br><br>Bit 0 – FramerSyncLock<br>Bit 1 – FramerSyncDrop<br><br>Bits 2 – 19 Other Functionality |
| EnableGlobalDemuxInterrupt | 20 [ 1] | 0 | R/W | If set to '1' enables globally TD core interrupts. |
| UnusedField | 21-31 [11] | 0 | R/W | Unused and reserved field. Always set to 0. |

FIGURE 13

| Transport Demultiplexer Global Control Register | | | | |
|---|---|---|---|---|
| Field Name | Bits Len Default | | Type | Description |
| FramerSyncLockLength | 0-4 [ 5] 00101 | | R/W | Five bits field to select a number of consecutive transport packets after MPEG-2 frame (bit-stream) synchronization is declared. |
| FramerSyncDropLength | 5-7 [ 3] 011 | | R/W | Three bits field to select a number of consecutive transport packets after a loss of MPEG-2 frame synchronization is declared. |
| FramerBitPolarity | 8 [ 1] 0 | | R/W | '0' selects msb first (default mode), '1' select lsb first |
| FramerClockPolarity | 9 [ 1] 0 | | R/W | If set to '0' framer will latch on falling edge (default) If set to '1' framer will latch on rising edge. |
| FramerMode: | 10-11 [ 2] '00' | | R/W | Defines a combination of external control signals: '00' – Framer uses T_start only. '01' – Framer uses T_valid only. '10' – Framer uses T_start and T_valid. '11' – Framer uses T_clock and T_data only. |
| Other Functionality Bits | 12-15 [ 4] | | | Other functionality (not relevant to Framer) |
| T_ValidPolarity | 16 [ 1] 1 | | R/W | '1' selects active high [5V] for t_valid external signal |
| T_StartPolarity | 17 [ 1] 1 | | R/W | '1' selects active high [5V] for t_start external signal |
| T_ErrorPolarity | 18 [ 1] 1 | | R/W | '1' selects active high [5V] for t_error external signal |
| Other Functionality Bits | 19-28 [10] | | | Other functionality (not relevant to Framer) |
| UnusedField | 29-31 [ 3] 0 | | R/W | Unused and reserved field. Always set to 0. |

FIGURE 14

| Video Control Registers | | | | |
|---|---|---|---|---|
| Field Name | Bits Len Default | | Type | Description |
| VideoPid | 0-12 [13] 0x1FFF | | R/W | Selects a specific PID of the video component stream to filter on. Value of 4095 is reserved one (it means a NULL transport packets). |
| EnableParsing | 13 [ 1] | 0 | R/W | If '1' enables parsing from the next transport packet. |
| StartFromPUSICommand | 14 [ 1] | 0 | R/W | '0' enables PES parsing immediately. '1' enables PES parsing a transport packet from new PES packet. After that, this bit auto-returns to 0. |
| ProcessStreamID | 15 [ 1] | 0 | R/W | If '1' enables parsing on specific stream_id field. |
| StreamID | 16-23 [ 8] 0xE0 | | R/W | stream_id of the ES stream to filter on in the PESP. |

FIGURE 18

| Transport Demultiplexer Registers | | | | |
|---|---|---|---|---|
| Field Name | Bits Len Default | | Type | Description |
| PID_yz, 0 ≤ yz ≤ 30 | 0-12 [13] 0x1FFF | | R/W | Selects a specific PID of the component stream to filter on. Value of 0x1FFF is reserved (it means a NULL transport packets). |
| EnableParsing | 13 [ 1] | 0 | R/W | If set to '1' extraction of defined PID_yz is enabled. |
| BufferIndex | 14-17 [ 4] | 0 | R/W | Specifies 1 of 16 destination buffers in the sys. mem. |

FIGURE 19

| Transport Demultiplexer Global Status Register | | | | |
|---|---|---|---|---|
| Field Name | Bits Len Default | | Type | Description |
| VideoPESHeaderAvailable | 12 [ 1] | 0 | R/W | This bit is set to '1' when the new PES header of the video stream is received. WR_ACC_CLEAR. |
| VideoPESHeaderError | 13 [ 1] | 0 | R/W | This bit is set to '1' after an error in the PES header is found. WR_ACC_CLEAR. |
| VideoPESDataAlignment | 14 [ 1] | 0 | R/W | This bit is set to '1' when video PID has AF data_alignment_flag, indicating a possible start of I frame. WR_ACC_CLEAR. |
| VideoPESDSMTrickMode | 15 [ 1] | 0 | R/W | Indicates that DSM data is found and extracted. WR_ACC_CLEAR. |
| VideoPESPrivateData | 16 [ 1] | 0 | R/W | This bit is set to '1' when video PID has 16 bytes of private data in the PES header. WR_ACC_CLEAR. |
| VideoPESCRCError | 17 [ 1] | 0 | R/W | This bit is set to '1' if the video CRC of the PESP parser found a CRC mismatch. WR_ACC_CLEAR. |

Figure 24

| Transport Demultiplexer Interrupt Mask Register | | | | |
|---|---|---|---|---|
| Field Name | Bits Len Default | | Type | Description |
| EventInterruptMask | 0-18 [19] | 0 | R/W | If set to '1' enables local sources<br>Bit 12 – VideoPESHeaderAvailable<br>Bit 13 – VideoPESHeaderError<br>Bit 14 – VideoPESDataAlignment<br>Bit 15 – VideoPESDSMTrickMode<br>Bit 16 – VideoPESPrivateData<br>Bit 17 – VideoPESCRCError<br>Bit 18 – VideoPTSReceived<br>Bit 19 – VideoESCRReceived |

Figure 25

| Transport Demultiplexer Global Status Register | | | | |
|---|---|---|---|---|
| Field Name | Bits Len Default | | Type | Description |
| VideoAFPcrReceived | [ 1] | 0 | R/W | This bit is set to '1' after arrival and extraction of PCR sample in the adaptation field. WR_ACC_CLEAR. |
| VideoAFPcrDiscontinuity | [ 1] | 0 | R/W | This bit is set to '1' when a discontinuity_indicator in The adaptation field of the PCR PID is asserted. WR_ACC_CLEAR. |
| VideoAFDiscontinuityFlag | [ 1] | 0 | R/W | This bit is set to '1' after a discontinuity_indicator_flag has been asserted in the AF of video TP, indicating a discontinuity on continuity_counter. WR_ACC_CLEAR. |
| VideoAFRandomAccess | [ 1] | 0 | R/W | This bit is set to '1' when video PID has random_access_flag asserted in the AF, indicating a start of the elementary stream. WR_ACC_CLEAR. |
| VideoAFSplicingFlag | [ 1] | 0 | R/W | This bit is set to '1' when video PID has splicing_point_flag asserted in the AF, indicating approaching of the splicing point. WR_ACC_CLEAR. |
| VideoAFSplicingPoint | [ 1] | 0 | R/W | This bit is set to '1' when video PID has splicing_point_flag asserted in the AF, after splicing point occurred (splice_countdown =0). WR_ACC_CLEAR. |
| VideoAFPrivateData | [ 1] | 0 | R/W | This bit is set to '1' when video has AF private data. WR_ACC_CLEAR. |
| AFSpliceCountdown | [ 8] | 0x00 | R/W | Current splice countdown value from adaptation field of A/V packets. Modified on the fly by AF content |

Figure 29

| Transport Demultiplexer Interrupt Mask Register | | | | |
|---|---|---|---|---|
| Field Name | Bits Len Default | | Type | Description |
| EventInterruptMask | 0-18 [19] | 0 | R/W | If set to '1' enables local sources<br>Bit 5 – VideoAFPcrReceived<br>Bit 6 – VideoAFPcrDiscontinuity<br>Bit 7 – VideoAFDiscontinuityFlag<br>Bit 8 – VideoAFRandomAccessFlag<br>Bit 9 – VideoAFSplicingFlag<br>Bit 10 – VideoAFSplicingPoint<br>Bit 11 – VideoAFPrivateData |

Figure 30

| Transport Demultiplexer Global Control Register | | | | |
|---|---|---|---|---|
| Field Name | Bits Len | Default | Type | Description |
| EnableAFPrivateData | [ 1] | 0 | R/W | If '1' enables parsing and routing of AF private data |
| AFPrivateDataBufferIndex | [ 4] | 0 | R/W | Specifies 1 of 15 destination buffers in the system memory |
| PCRIndex | [ 1] | 0 | R/W | |
| EnableAutoSplicing | [ 1] | 0 | R/W | |

Figure 31

METHOD AND SYSTEM FOR RECEIVING AND FRAMING PACKETIZED DATA

The present application is a divisional and claims priority from U.S. patent application Ser. No. 09/490,350, filed Jan. 24, 2000 now U.S. Pat. No. 6,763,390, entitled "Method and System for Receiving and Framing Packetized Data," naming inventors Branko Kovacevic and Kevork Kechichian, which application is incorporated by reference herein in its entirety.

COPENDING APPLICATIONS

A copending application exists having U.S. application Ser. No. 489,682, entitled "Method and System for Accessing Packetized Elementary Stream Data", having at least one inventor in common, and the same filing date as the present application.

A copending application exists having U.S. application Ser. No. 09/491,120, entitled "Method and Apparatus for Accessing Transport Stream Data", having at least one inventor in common, and the same filing date as the present application.

A copending application exists having U.S. application Ser. No. 09/491,121, entitled "Method And System For Handling Data", having at least one inventor in common, and the same filing date as the present application.

A copending application exists having U.S. application Ser. No. 09/491,119, entitled "Method for Synchronizing to a Data Stream", having at least one inventor in common, and the same filing date as the present application.

A copending application exists having U.S. application Ser. No. 09/491,122, entitled "Method and Apparatus for Handling Private Data From Transport Stream Packets", having at least one inventor in, and the same filing date as the present application.

A copending application exists having U.S. application Ser. No. 09/490,207, entitled "Method and System for Retrieving Adaptation Field Data Associated with a Transport Packet", having at least one inventor in common, and the same filing date as the present application.

A copending application exists having U.S. application Ser. No. 09/489,681, entitled "Method for Displaying Data", having at least one inventor in common, and the same filing date as the present application.

A copending application exists having U.S. application Ser. No. 09/491,124, entitled "System For Simulating The Parsing Of A Transport Data Stream", having at least one inventor in common, and the same filing date as the present application.

FIELD OF THE INVENTION

The present invention relates generally to the reception of MPEG-2 data, and more specifically to the framing of MPEG-2 Data.

BACKGROUND OF THE INVENTION

The international organization for standards (ISO) moving pictures experts group (MPEG group), approved an audio video digital compression standard known as MPEG-2 in an effort to provide a versatile compression standard capable of being utilized for a wide variety of data. The MPEG-2 standard provides explanations needed to implement an MPEG-2 decoder through the use of syntax and semantics of a coded bit stream. MPEG-2 is an open standard which continues to evolve and be applied to a variety of applications ranging from video conferencing to high definition television. As a generic standard, MPEG-2 is intended to be used for variety of audio and video coding applications. Part one of the MPEG-2 standard (ISO 13818-1), was designated to improve error resilience and carry multiple programs simultaneously without a common time base between programs.

The transport stream (TS) specified by the MPEG-2 standard, offers a high degree of robustness for noisy channels, and can be used to carry multiple programs, such as multiple TV services. The transport stream is based on a 188 byte long packet suited for hardware error correction and processing schemes. The use of a robust protocol, such as the transport stream, allows for reception over noisy environments such as terrestrial and satellite transmissions. Even in these environments it is possible to obtain fast program access, channel hopping, and synchronization between multiple elementary streams carried within the packetized elementary streams which are subdivided into transport packets.

Prior art FIG. 1 illustrates a Transport Packet Stream defined by the MPEG-2 standard. The transport stream, based on a 188 byte long packet, is well suited for hardware error correction and processing schemes. Such a configuration can carry multiple programs within the same multiplex, even when the transmission environment is noisy. For example, MPEG-2 data can be transferred successfully over coaxial cable networks and satellite transponders with asynchronous multiplexing of constant or variable bit-rate programs to allow fast program access, channel hoping and synchronization between services.

As illustrated further in FIG. 1, MPEG-2 transport stream consists of fixed length Transport Stream Packets (TSP or packets) based on 4 bytes of header followed by 184 bytes of TSP payload. TSP payload carries Packetized Elementary Stream (PES) data obtained by chopping up an Elementary Stream (ES), which consists of data of a common type and program. For example, audio for a specific program would form one elementary stream, while video for the same program would form a second elementary stream.

The TS header consists of a synchronization byte (SyncByte), flags, information indicators for error detection and timing, an adaptation field indicator, and a Packet_ID (PID) field used to identify Elementary Streams carried in the payload. The adaptation field, when present, contains flags, and timing information.

The PID Field is used not only to distinguish separate Elementary Streams, but also separate Program Specific Information (PSI) tables. Prior art FIG. 2 illustrates two types of PSI tables—a Program Association Table 210 (PAT), and a Program Map Table 220 (PMT). The PAT table lists unique program numbers as identifiers for each program, or elementary stream, in a multiplex, and the PID number associated with each program number. A fixed PID number of 0x0000 is assigned to the PAT table, making it possible for the system to download the PAT table on startup by retrieving PID 0x0000 packets.

Each program identified the PAT table has a related Program Map Table (PMT) having its own PID identifier. Each PMT table lists the PIDs for all Elementary Streams (components) making a given program associated with the PMT. A specific PMT table maybe constructed for each program separately, or may be common for a group of programs. In the first case, there are many PMT tables with just one section, and each PMT table has a different PID value. In the second case one PMT table may have many sections, each relevant to one program.

In order to provide multiple services over the same multiplex, data associated with different multimedia services are transmitted, with packet multiplexing, such that data packets from several Elementary Streams of audio, video, data, and others are interleaved on a packet by packet basis into a single MPEG-2 transport stream. Synchronization between Elementary Streams forming a common program is achieved using presentation time stamps and program clock references which can be transmitted as part of the adaptation field specified in the header.

Prior art FIG. 3 illustrates the fields associated with a PES stream. Each PES stream contains a header portion and a data portion. In addition, an optional header portion may exist. The header portion includes a Packet Start Prefix, a stream ID, and a packet length indicator.

Transport stream information can be provided either through a direct broadcast, or through a service provider broadcast. Direct broadcast generally refers to signals which are received directly by an end user. Examples of direct broadcasts include satellite broadcasts received by satellite dishes and provided to a decoder at the end user's location, which receives and decodes the transport stream data. Another type of direct broadcast is the traditional composite television/radio broadcast. In their most elementary forms, these broadcasts are not digital broadcasts. However, the transmission of digital broadcast in MPEG-2 format is being explored and occurring as an alternative. In this manner, the user would have a tuner capable of receiving the direct terrestrial link information containing the television or radio signals. Once demodulated, the transport stream information could be provided to a desktop unit, or decoder, owned by the end user.

Service provider broadcast would include broadcast to the home provided by cable television providers, telephone company providers, or other independent providers. In this configuration, the service provider first receives the number of signals which can be ultimately provided to the end user. Examples of such received signals include satellite feeds, terrestrial feeds, switched video sources, local video sources such as tapes, or laser disk DVD's, as well as traditional table feeds. Based upon the end users demands, the received information can be selectively provided to the end user.

In one manner, the selected feed by the service provider can be provided directly to an end user through a twisted pair connection, which may include a high speed digital subscriber link (DSL) capable of providing data at higher rates than traditionally associated with plain old telephone system (POTS) connections.

In another implementation, the service provider would provide information from a central office or a head-end to a fiber node. A specific fiber node is generally used to support more than one end user. Examples of the use of such fiber nodes includes a fiber coaxial bus (FCB) whereby a fiber link provides the signal containing a large amount of data to a fiber node which in turn drives coaxial cable having a taps. A decoding device attached to taps at user side can receive the appropriate broadcasting signal.

Another example of a fiber node is bi-directional fiber coaxial bus. While similar to the FCB bus, the bi-directional FCB bus is also capable of transmitting data back to the central office or the head-end as well as receiving it. Yet another fiber node example is a hybrid fiber coax, which uses coaxial cable and branch topology toward network interface units. Yet another example associated with service providers is known as fiber to the curb, whereby digital signaling is carried from the central office to the optical network unit which serves only a few dozen homes. Locally, a hybrid twisted pair coaxial pairs will connect to the optical network unit with the consumer's decoder. Twist repair cable carries digital video in the 5 to 40 megahertz range to no more than 500 feet from the fiber connection. Therefore, the number of homes capable of being served by a single optical network unit is limited. Analog television signals are carried in a coaxial cable from the fiber node.

One problem associated with the flexibility of the MPEG-2 standard is that once the transport stream is received, demodulated, and decrypted, the resulting data stream can still have a variety of variations which need be known before the data stream can be properly utilized. For example, the MPEG-2 specification does not indicate a specific set of control signals to be provided with the transport stream, how received data and control signals are qualified, nor the precise format of the actual data transmitted. As a result, implementations of set top boxes require specific service provider information. Specific service provider information results in an incompatibility among transport streams schemes provided by different service providers or cable operators. As a result, chip sets are designed and dedicated to support specific service provider's set top boxes.

Prior art FIG. 4 illustrates a prior art system for parsing a transport stream. The transport parser of the prior art would receive individual packets from the framer. Based upon the PID value, the transport parser would store the TSP data to be used by the system or the graphics engine in a local buffer.

When the transport parser's local buffer was filled, the transport parser would cause a bus request to the appropriate controller (system or video) to initialize a transfer of at least some of the buffered data.

However, when the prior art host video or graphics system needed more data from the transport parser prior to the transport parser initializing the transfer, the system would initialize the transfer by generating a request to access data in the transport parser buffer. Since the bus used internally by the transport parser buffer may have other clients, the host system may have to wait to access the bus. The overall performance of the host system is reduced as a result of the system waiting on data.

Therefore, a system and method of receiving transport stream information that allows for more flexibility and improved performance in terms of data handling, data parsing, design implementation, data stream acquisition would be advantageous.

BRIEF DESCRIPTION OF THE DRAWINGS

FIG. 12 illustrates, in tabular form, global status registers associated with a portion of FIG. 6;

FIG. 13 illustrates, in tabular form, interrupt registers associated with a portion of FIG. 6;

FIG. 14 illustrates, in tabular form, global control registers associated with a portion of FIG. 6;

FIG. 18 illustrates, in tabular form, video control registers associated with a portion of FIG. 6;

FIG. 19 illustrates, in tabular form, auxiliary PID control registers associated with a portion of FIG. 6;

FIG. 24 illustrates, in tabular form, global status registers associated with a portion of FIG. 6 and fully associated with FIGS. 21 and 23;

FIG. 25 illustrates, in tabular form, interrupt registers associated with a portion of FIG. 6 and fully associated with FIGS. 21 and 23;

FIG. 29 illustrates, in tabular form, global status registers associated with a portion of FIG. 6 and fully associated with FIG. 28;

FIG. 30 illustrates, in tabular form, interrupt registers associated with a portion of FIG. 6 and fully associated with FIG. 28.

FIG. 31 illustrates, in tabular form, global status registers associated with a portion of FIG. 6 and fully associated with FIG. 28;

DETAILED DESCRIPTION OF THE DRAWINGS

In a specific embodiment of the present invention a method of receiving data, including receiving at least a portion of a data stream, identifying a first data stream location, wherein the first data stream location has a predefined data value, monitoring subsequent data stream locations which are an integer multiple of a predetermined distance from the first data stream location, determining if data values associated with the subsequent data stream locations are equal to the predefined data value, and asserting an indicator for each subsequent data stream location to indicate the occurrence of the predefined data value.

Figure 5:
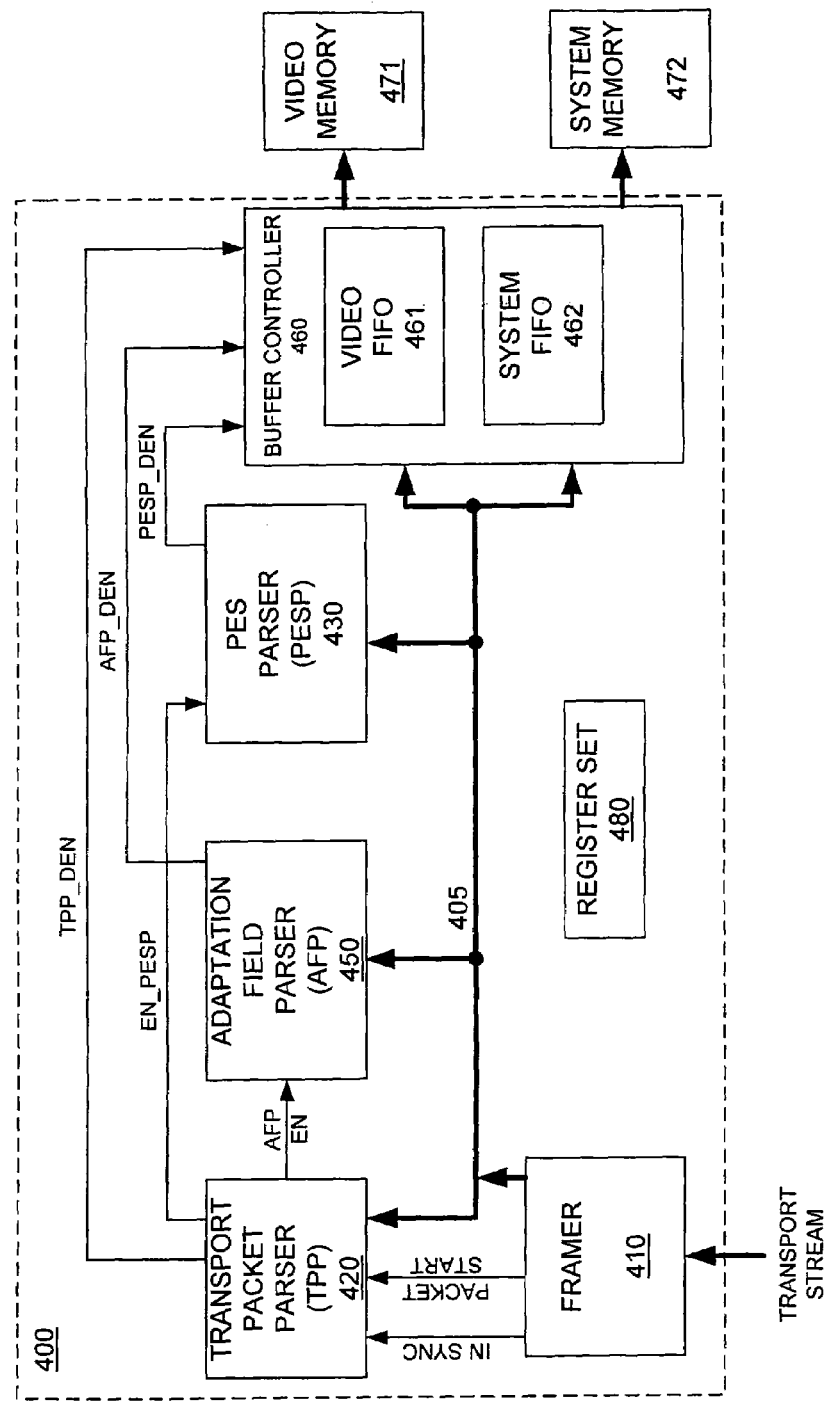
FIG. 5 illustrates, in block diagram form, a transport stream core in accordance with the present invention.

The present invention is best understood with reference to the specific embodiments illustrated in Figures herein. Specifically, FIG. 5 illustrates a transport stream core 400 (TS core), Video Memory 471, and System Memory 472.

In operation, the TS core 400 receives transport stream packets. Each packet is synchronized to the TS core 400, and demultiplexed. Each packet is demultiplexed based upon its Packet IDentifier (PID), which identifies the type of data carried in the packet. The TS core 400 is bufferless in that no packet data is stored within the TS core 400 for access by video or system processing. Instead, the demultiplexed data is stored in one or more locations within each of the Video memory 471, and the system memory 472.

Transport Stream Core 400 includes a Framer 410, Transport Packet Parser 420 (TPP), a PES Parser (PESP) 430, Adaptation Field Parser (AFP) 450, Buffer Controller 460, and register set 480.

Figure 6:
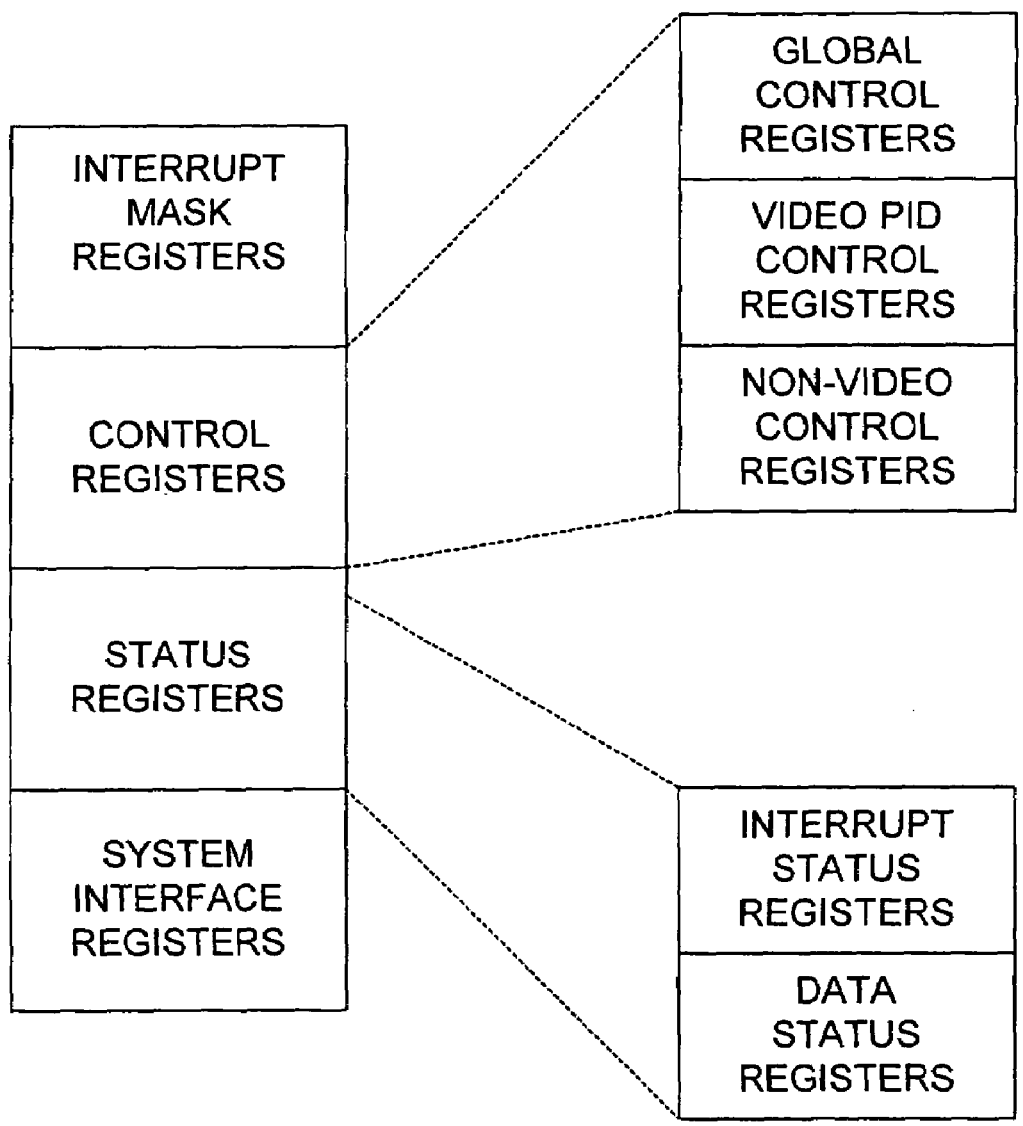
FIG. 6 illustrates a tabular representation of a register set.

The register set 480 is further illustrated in FIG. 6. Generally, the register set 480 includes interrupt mask registers, control registers, status registers, and system interface registers. Interrupt mask registers are used to enable or disable specific interrupts. Control registers specify how various aspects of the TS core 400 are to operate. Further examples of types of control registers include Global Control Registers; Video Control Registers, which control how video packets are handled by the TS core; and Non-Video Control Registers, which control how non-video packets are handled by the TS core.

In operation, the framer 410 receives a raw transport stream which is analyzed to isolate and provide individual transport stream packets (TSP) to the bus 405. In one embodiment, the bus 405 receives byte wide data (the data bus width could also be 16 or 32 bits) and a control signal to indicate when the current byte of data is valid. In addition, the Framer 410 generates a signal labeled PACKET START to indicate the first byte of a packet, and a signal labeled IN SYNC to indicate when the data on the bus 405 is synchronized, or locked onto by the Framer 410.

The TPP 420 is connected to the bus 405, and receives the IN SYNC and PACKET START signals. Parsing of a TSP (packet) by the TPP 420 is enabled when the IN SYNC signal and the PACKET START signals are asserted indicating the beginning of a new packet. During parsing of the header portion of a packet the PID number is obtained. Based upon the value of the PID number, registers are updated, and a determination is made whether the TSP is to be saved, further processed, or discarded.

When it is determined to save the packet, the TPP 420 asserts the signal labeled TPP_DEN which is received by the Buffer Controller 460. Based upon this enable signal, the Buffer controller 460 retrieves the packet data and stores it in a predefined memory location.

When it is determined to discard the packet, no further action by the TPP 420 is needed, resulting in the remainder of the TSP being ignored.

When it is determined to further process the packet by one of the other parsers 450 or 430, the TPP 420 asserts one of their respective enable signals. For example, if it is determined that the packet contains video data, the TPP 420 will assert the signal labeled EN_PESP, likewise, if it is determined that the packet contains adaptation field data, the TPP 420 will assert the signal labeled AFP EN. Based upon these signal being active, the respective parser will further process the packed data.

In response to being enabled by the TPP, the Video PES Parser 430 further processes the packet by parsing the header of the video PES. Based upon information carried in the header of the video PES, registers are updated, and the video payload may be stored or discarded.

When it is determined to save the video payload, the PESP 420 asserts the signal labeled PESP_DEN which is received by the Buffer Controller 460. Based upon this enable signal, the Buffer controller 460 retrieves the packet data and stores it in a predefined location of video memory.

The Buffer controller 460 receives and stores the data payload based upon control signals received from the parsers. Because the packet data is stored directly in the system memory 472, associated with a main system (not shown), or the video memory 471, associated with a video adapter (not shown), the packet data is not stored in TS core 400. Therefore, the core 400 and each of its parsers are described as bufferless. By storing data directly in the system memory 472 and the video memory 471, the system does not have to access memory space within the TS core 400. This eliminates delays associated with the prior art which occurred when the system had to wait on TS core bus accesses to be completed before the needed data could be retrieved.

The bus connections between the buffer controller 460 and the system memory 472 can vary depending upon the implementation chosen. For example, both the video memory 471 and system memory 472 can be connected to the buffer controller 460 through a PCI (Peripheral Components Interconnect) bus, or the system memory 472 can be connected to the buffer control 460 through a PCI bus, while the video memory 471 is connected to the buffer controller 460 through an AGP (Accelerated Graphics Port).

Figure 7:
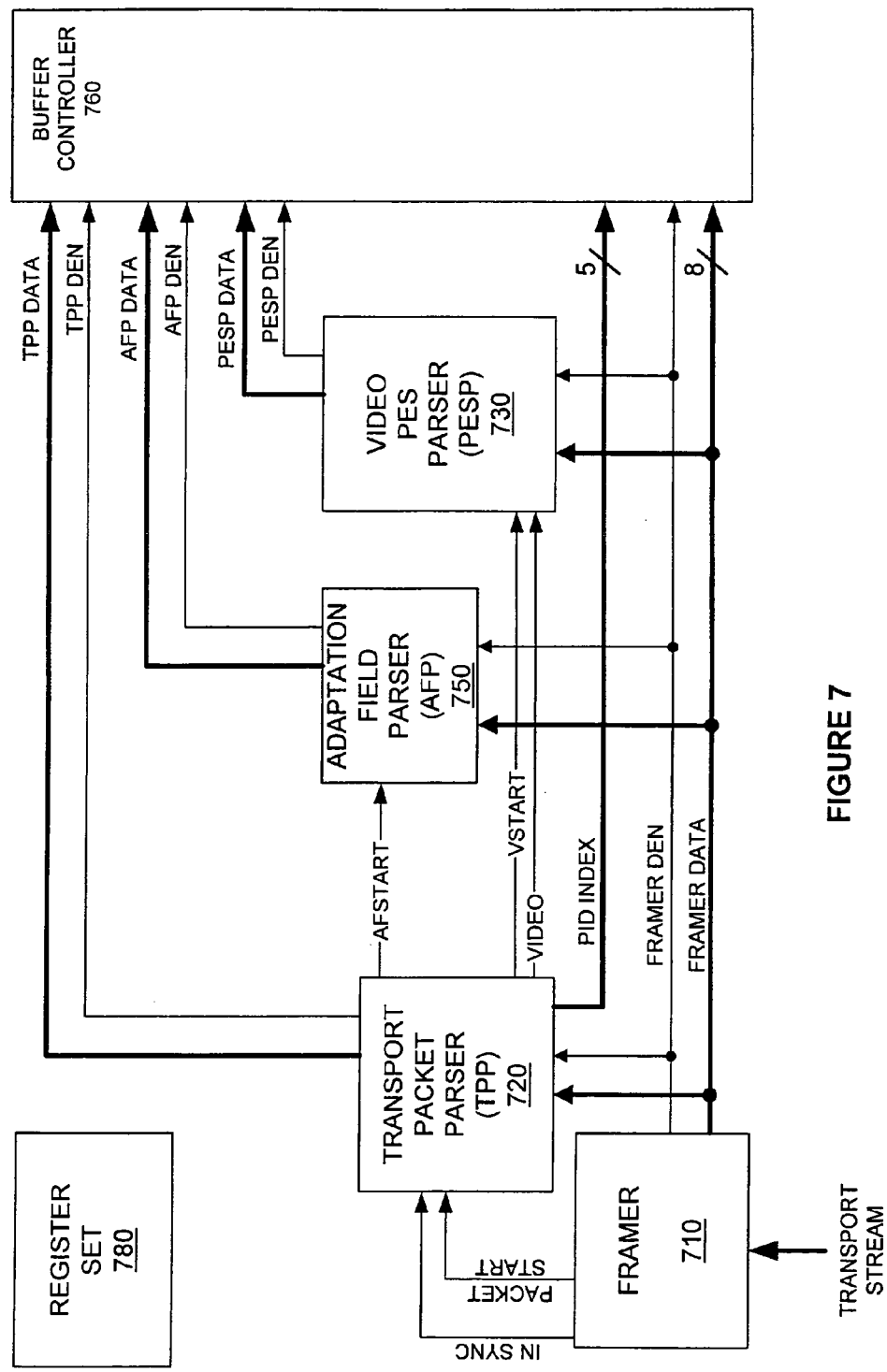
FIG. 7 illustrates, in block diagram form, another embodiment of a transport stream core in accordance with the present invention.

FIG. 7 illustrates another embodiment of a TS core in accordance with the present invention. The TS core of FIG. 7 includes framer 710, TPP 720, AFP 750, PESP 730, buffer controller 760, and registers 780.

The registers 780 are analogous to registers described with reference to FIG. 5.

The framer 710 provides transport stream data labeled FRAMER DATA on an eight-bit bus, (or 16 or 32) and provides a signal labeled FRAMER DEN. The FRAMER DATA an eight-bit wide data byte, or word, which has been received from the transport stream. The FRAMER DATA is qualified by the signal FRAMER DEN, which is an enable signal. The signal FRAMER DEN is asserted during each valid FRAMER DATA.

The FRAMER DATA and FRAMER DEN signals are provided to each of the parsers of FIG. 7, and the Buffer controller 760. The TPP parser 720 receives the header information of new packets when the framer 710 asserts an IN SYNC signal and a PACKET START signal. The combination of these signals, when asserted, indicate that the present FRAMER DATA is part of the packet header. As a result, the TPP 720 receives the FRAMER DATA from the data bus for parsing.

In a specific embodiment, the IN SYNC signal provided by the framer 710 will be active whenever the framer 710 is locked onto, or synchronized with, the transport stream. If the IN SYNC signal is deasserted, the TPP will not receive the data. Furthermore, the PACKET START signal can be a single pulse asserted during the first byte of a new packet, or it can be a signal that is asserted during the first byte of the packet and not deasserted until the last byte of the packet. The first byte of the packet can be defined in different manners. For example, the first byte can be defined to be the sync byte of a packet, or the first byte after the sync byte.

Based upon the PACKET START signal, the TPP 720 can maintain a byte count indicating the location of a current byte within the packet being received. Based upon this count, the TPP 720 will parse the header of the packet which is the first four bytes.

During parsing of the packet header, the TPP receives the PID of the current packet. Based upon the PID value, the TPP can enable other parsers to perform additional parsing operations. For example, when the PESP 730 of FIG. 7 is a dedicated video PES parser, and the PID associated with a packet received by the TTP is the video PID, the TPP will enable the PESP 730 by asserting the signal labeled VIDEO. Additionally, TPP asserts the signal labeled VSTART when the current frame is the first frame of a PES stream. This indicates to the PESP that the elementary stream header is at least partially within the current frame. The VSTART signal allows the PESP to locate and parse the header of the video PES, while the VIDEO signal allows subsequent video payload to be retrieved. Likewise, when the adaptation field control of a packet header indicates that adaptation field data is to follow, the TPP will provide a signal labeled AFSTART to indicate the beginning of the adaptation field. In response, the AFP 750 will parse the adaptation field of the current packet.

When a current packet, that is not a video packet, is to be received by the TS Core of FIG. 7, the TPP will receive the packet from FRAMER DATA and provide the entire packet one byte at a time as TPP DATA to the Buffer controller 760. Similarly, when the packet is a video packet, the PESP 730 will receive video data payload from the FRAMER DATA and provide it to the Buffer controller 760, which is subsequently framing data bytes into double words as PESP DATA. Any data associated with the adaptation field of the packet will be provided to the buffer controller 760 from the AFP parser 750 as AFP data.

In response to the various data and control signals received from the parsers, the buffer controller stores the data. In a specific mode, where all packets are to be stored, the FRAMER DATA and control signal FRAMER DEN can be received directly at the buffer controller 750 for storage.

In accordance with the present invention, each of the parser modules 720, 730, and 750, and the framer 710, as well as any other module which may be included, are implemented to have modular layouts. For example, the layout of the TPP 720 is modular when its layout is performed independent of the layout of any of the other module. As a result, the TPP 720 will have a localized layout independent of the other modules. Independent development and reuse of modules is readily accomplished using modular layouts for modules having independent functions. This is an advantage over the prior art, which did not differentiate the parsing functions using modular layouts, in that it provides greater flexibility and reuse in the design and implementation of transport stream parsers.

Figure 8:
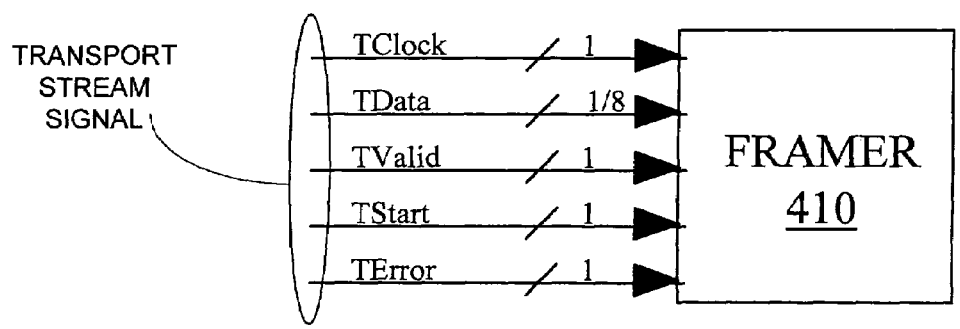
FIG. 8 illustrates, in block diagram form, a framer receiving a transport stream signal.

The framer is best understood with further reference to the FIGS. 5, and 8 through 15. FIG. 8 illustrates a block diagram representation of the transport stream signal received at framer 710. In the embodiment illustrated, the transport stream includes five signals. A clocking signal labeled TCLOCK, a data signal labeled TDATA, a data valid signal labeled TVALID, a packet start signal labeled TSTART, and an error signal labeled TERROR. The TDATA signal can be either a single or multiple bit wide data stream. Each of the control signals of FIG. 8 are single bit signals received by the framer 710.

The transport stream data and control signals can be received either from a direct broadcast or through a specific service provider. The signals actually received by the framer 710 can vary depending on the specific network interface module (NIM) provider of direct broadcast implementation. At a minimum, TCLOCK, and TDATA are needed. The TCLOCK and TDATA signals contain the basic information necessary to retrieve this information. While FIG. 8 illustrates separate TDATA and TCLOCK signal, it is possible to provide the data and clock as an integrated signal, whereby the clock signal would be extracted from the received data.

Where only TCLOCK and TDATA are provided, the TCLOCK signal active, I.E. toggled, only when data is transmitted. When a valid signal, TVALID, is also provided TCLOCK can be a constantly running synchronous clock. In that case the data is qualified with the TVALID signal.

The TSTART signal, when provided, is used to indicate when transmission of a new transport stream packet occurs. When TSTART is available, the synchronization process is trivial because the provider of the transport stream NIM is required to specify the start of each new packet.

The TERROR signal, when present, indicates that the data being received may be corrupted due to a potential error in the data path. TERROR the decoder that the information at this point is at best suspect, if not incorrect.

As previously indicated, various combinations of signals comprising the transport stream can occur. In addition, the format of individual signals can vary. For example, TCLOCK can qualify the TDATA signal on either a rising edge or a falling edge. In accordance with a specific embodiment of the present invention, the TCLOCK edge that qualifies TDATA can be defined in the framer 710.

Another transport stream variation is how the TDATA is transmitted to the framer 710. TDATA can be transmitted in one of either MSB first or a LSB first mode. When transmitted in MSB first mode the most significant bit of each data byte is received first, and in LSB first mode the least significant bit of each data byte is received first. In accordance with a specific embodiment of the present invention, whether data is transmitted LSB first or MSB first can be defined in the framer 710 to properly receive bytes of TDATA.

Another transport stream variation is the polarity of an active control signal. For example, the control signal can be active at either a logic level 1 or a logic level 0, depending upon the system implementation. In accordance with a specific embodiment of the present invention, the polarity of control signals can be defined in the framer 710 to properly identify the correct asserted logic level.

TDATA can be received bit-by-bit, byte-by-byte, or by other various word size. Within the received stream, the individual units of data are referred to having a location. For example, the first byte associated with the data stream is referred to being at a first location, while the $188^{th}$ byte would be referred to as the $188^{th}$ location. The use of the term "location" also implies a point in time, whereby a first byte would occur at a first time, or period, and the $188^{th}$ byte would occur at a $188^{th}$ time period as references to the TCLOCK.

Figure 9:
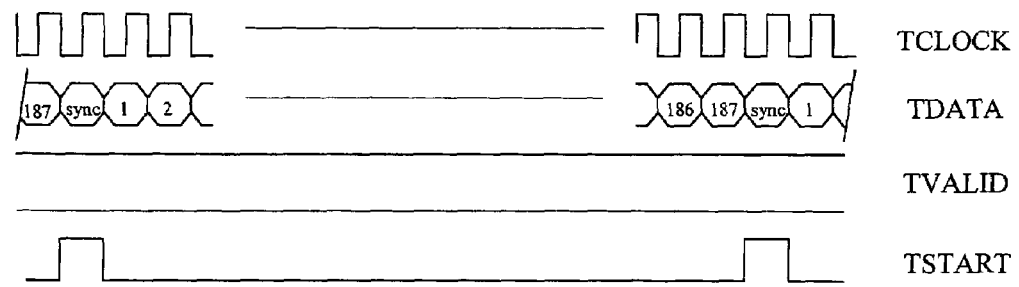
FIG. 9 illustrates, in timing diagram form, the relationship among individual data signals comprising a transport stream.

FIG. 9 illustrates the relationship between the various control and data signals of the transport stream. Specifically, FIG. 9 illustrates a TCLOCK signal having a rising edge for qualifying each data byte of the TDATA signal. Likewise, in the illustration of FIG. 9, the TVALID signal is always asserted during the first byte indicating that the data is valid. The TSTART signal is synchronized to the first byte of the TDATA signal, which is a synchronization byte. In a specific implementation, the synchronization byte of the TDATA signal will always have the Hexadecimal value 47 h. The TERROR signal is not illustrated, however it would be asserted to indicate when an error has occurred.

While the timing diagram of FIG. 9 does not explicitly show bits of TDATA being received serially, it should be understood that for each byte representation of TDATA in FIG. 9, 8 individual data bits can be received, qualified by eight TCLOCK pulses, to form the bytes illustrated. When TDATA is received in a bit-by-bit manner, without a TSTART signal, there is no knowledge as to which of the bits being received represents the first bit of a byte, where by "first bit" it is meant the first bit received when the device is turned on and started latching the data. Likewise, the same is true for the first byte, let alone which byte represents the first byte of the frame. The state diagram of FIG. 10 is a state diagram describing synchronizing the decoder FIG. 7 to the transport stream being received.

Figure 10:
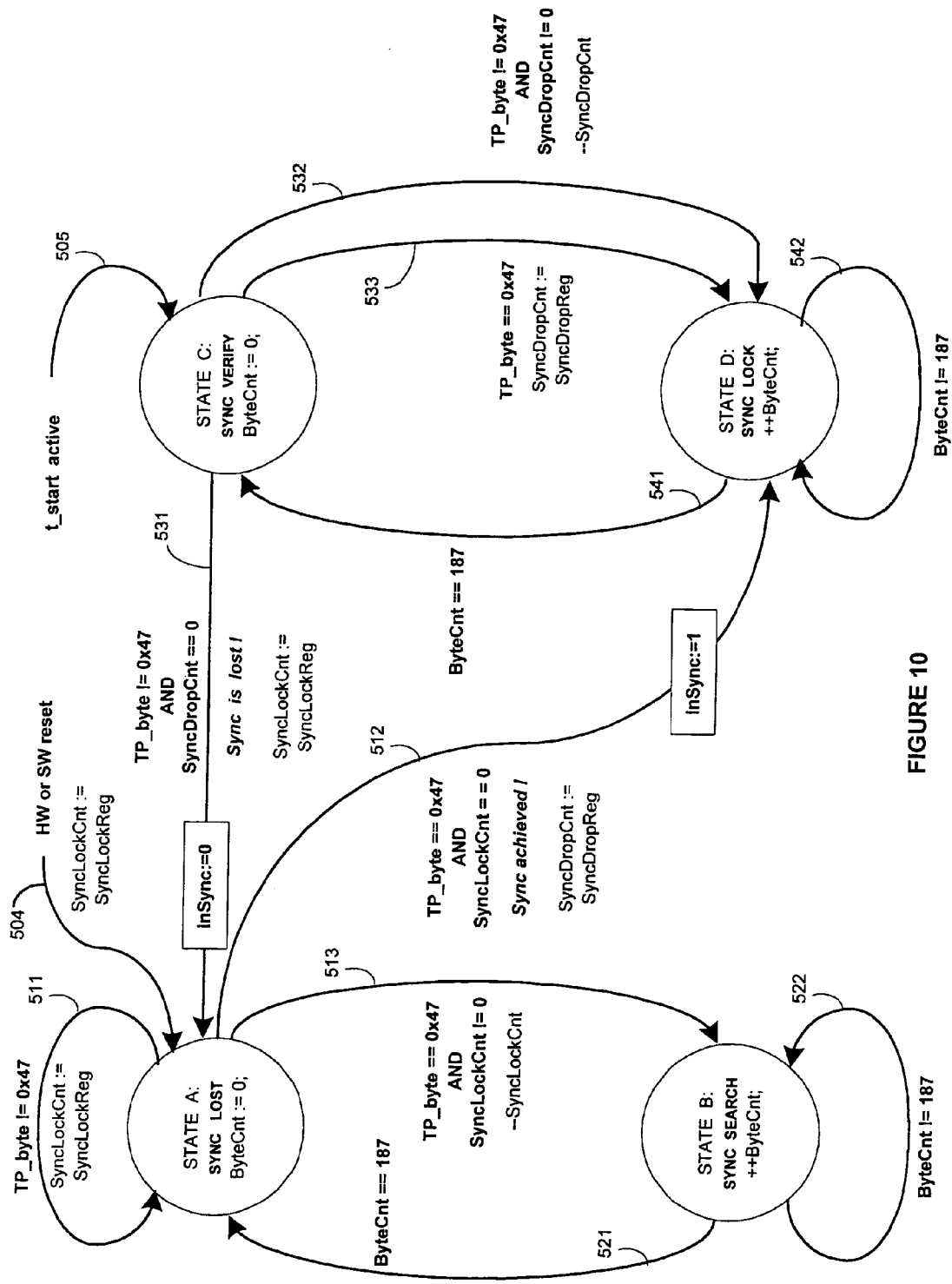
FIG. 10 illustrates, in flow form, a state diagram for implementing a function associated with the framer of FIG. 3.

FIG. 10 illustrates a state diagram for the framer 710. The state diagram of FIG. 10 includes four states. State A is the synchronization lost state. State B is a synchronization search state. State C is a synchronization verify state. State D is a synchronization lock state. Upon a hardware or software reset the system in accordance with the present invention enters State A through transition 504. When in State A, synchronization to the data packets has been lost. When synchronization to the transport stream has been lost, it is not known where a new packet begins or an old packet ends. As a result, it is not possible to receive data Note that when a TSTART signal is provided as part of the transport stream synchronization is known and guaranteed, therefore State C, synchronization verify, is will not be entered if TSTART is active. For illustration purposes, this diagram assumes that the incoming stream is already byte aligned and that there is no need to look for byte boundaries.

The first byte is a sync byte for the transport stream, and has a predetermined value. In MPEG-2 implementation, the synchronization byte has the hexadecimal value 47 h. Transition path 511 loops into State A whenever a byte received is not equal to the synchronization value 47 h. During the transition 511, a synchronization lock counter (SyncLock-Cnt) is set to a stored value. This value of the synchronization lock counter indicates the number of consecutive successful synchronization bytes that must be detected prior to determining the system is synchronized. In the specific implementation, each byte is received by the framer is compared to the value 47 h. In one embodiment where a serial bit-stream is received, and the byte boundary within the bit stream is not known, the bit-stream is monitored on a shifted 8-bit basis in order to monitor every possible combination of the bits in the stream to detect the synchronization value. The transition path 513 is taken once the synchronization value is detected.

During transition 513, the synchronization lock counter is decremented to indicate a successful detection of the synchronization value. By identifying a first synchronization byte, the synchronization lock count is decremented the first time. Note that if the synchronization byte value is equal to 47 h and the synchronization lock count is equal to zero the transition 512 is taken to State D to indicate successful synchronization.

From State B, transition path 522 is taken for each received byte until the expected location of the next synchronization byte is reached. Because MPEG-2 transport stream packet is 188 bytes long, there will be additional 187 bytes before the next synchronization byte is expected. This is necessary because the value 47 h might occur elsewhere in the stream (i.e. this value is not a reserved value). Therefore, on the 187 byte of the packet transition path 521 is taken to return to State A so that the next byte can be evaluated. If at State A it is determined that the 188$^{th}$ byte is has a valid synchronization value of 47 h the state machine will transition either on transition path 512, or transition path 513 depending on how many valid synchronization bytes have been identified. In the event that the 188$^{th}$ byte doesn't have synchronization value, transition 511 is taken, the synchronization lock count is set to the synchronization lock register value, and the system returns to State A.

By transitioning in the manner described between State A and State B, the framer 710 is able to monitor a data stream and determine a valid synchronization location using only the TCLOCK and TDATA signals. Once the valid synchronization location has been identified, by receiving a predefined number of correct sync values, the transition path 512 is taken to State D.

State D indicates that the framer 710 has currently obtained a synchronization lock state. However, in order to assure that the data stream continues to be a valid data stream, the transition 542 is used to determine when the next expected sync byte location is to occur. Transition 541 places the system in state C at reception of the transport stream sync byte to verify synchronization. If synchronization is verified, the system transits to state D along transition path 533. As a result of transitioning along path 533, a drop count is reset to a stored value, which indicates how many sync bytes must be missed before synchronization is lost. This way the incoming stream is continuously monitored for any errors.

By allowing for a predefined number of missed synchronization bytes, intermittent glitches can be ignored. This is useful-depending upon the desired data integrity. For example, a drop count value of three would indicate that more than three lost synchronization values in a row will result in the state machine entering State A the synchronization lost state.

When the synchronization value is not found, transition path 533 is taken back to state D. As a result, the synchronization drop count (SyncDropCnt) is decremented to indicate the sync value was not valid, but SyncDropCnt is not yet zero. When the synchronization value is not found, transition path 531 is taken to State A when the synchronization drop count is equal to zero indicating synchronization has been lost.

In the manner indicated, the state machine of FIG. 10 allows synchronization to be detected by framer 710 based upon a predetermined number of recognized synchronization values. The predetermined number specifies how many valid packets need to be detected sequentially before it is determined that a valid synchronization lock state has occurred. Likewise, once a valid synchronization lock state has been encountered, the number of missed transport stream packets that must occur can be user defined.

Figure 11:
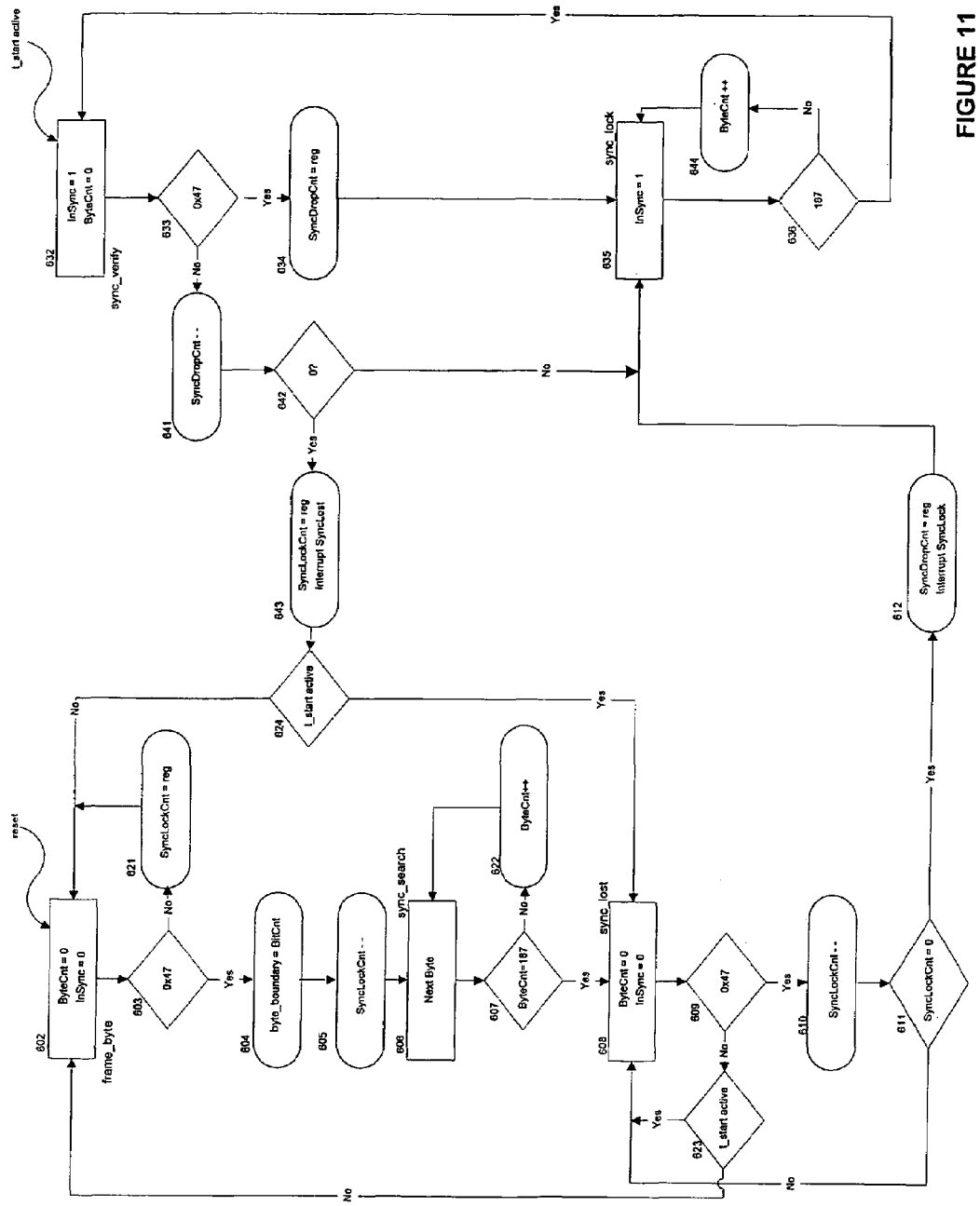
FIG. 11 illustrates an algorithmic state machine associated with the framer of FIG. 3.

FIG. 11 illustrates an Algorithmic State Machine (ASM) diagram in accordance with the framer. Upon reset the flow proceeds to step 602.

At step 602 a variable labeled ByteCnt is set equal to zero indicating the current byte is believed to be the transport stream sync byte, while the variable InSync is also set equal to zero indicating the system is not yet synchronized. At step 602, the framer 710 is in a state labeled frame_byte indicating that the current byte is expected to be a transport stream sync byte, and therefore is to be evaluated.

At step 603, a determination is made whether or not a current byte being evaluated is equal to the hexadecimal value of 47 h. When not equal to this value, the flow proceeds to step 621. At step 621, a variable synchronization lock count (SyncLockCnt) is set equal to a register value that specifies the number of valid synchronization bytes needed before synchronization is declared. From step 621 flow proceeds back to step 602.

If at step 603 the synchronization byte value is detected, the flow continues to step 604. At step 604 a variable byte boundary (Byte_Boundary) is set equal to a value bit count (BitCnt), which is zero at step 604.

At step 605 the synchronization lock count variable is decremented to indicate a successful transport stream sync frame detection.

At step 606 a next byte is received. At step 606, the framer 710 is in a state labeled sync_search to indicate the next expected sync byte is being identified.

At step 607, a determination is made whether or not the next byte is the byte to be evaluated for synchronization. If the byte is not to be evaluated the flow proceeds to steps 622 and 606 where the byte count is incremented and a new byte received. In this manner the loop comprising step 606, 607 and 622 is expected until the next byte is the expected sync byte to be evaluated is received, and the flow proceeds to step 608.

At step 608 the variable ByteCnt is set equal to zero, allowing for the next transport packet to be identified. Also, the InSync flag is set equal to zero. At step 608, the framer 710 is in a state labeled sync_lost.

At step 609 a determination is made whether or not the current byte has a value equal to the synchronization value. When the value is not equal to the synchronization value a further determination is made at step 623 whether or not the TSTART signal is active. If the TSTART signal is active, indicating that the start of the transport stream is occurring, the flow will proceed to step 608 for further synchronization. However, if the TSTART signal is not active, or not currently used, the flow will proceed to step 602 for further synchronization. If at step 609 a determination is made that the synchronization value matches the current byte, the flow will proceed to step 610.

At step 610, the variable SyncLockCnt is decremented to indicate successful detection of the transport stream sync value.

At step 611 a determination is made whether or not the synchronization lock count value has been met indicating the framer has locked onto the transport stream. In the specific example, since the synchronization lock count is decremented, when the SyncLockCnt value is equal to zero the condition has been met. If the desired number of consecutive synchronization bytes have not been received, the flow proceeds to step 608. However, if the desired number of consecutive synchronization has been made the flow proceeds to step 612.

At step 612, the synchronization drop count is set equal to the register value indicating how many sync frames must be missed before synchronization is declared lost, and an interrupt is issued to indicate synchronization lock (SyncLock) has been obtained.

At step 635, a variable InSync is set equal to one to indicate the system is synchronized to the transport stream. Therefore, at step 602, the framer is in a state labeled sync_lock.

At step 636, a determination is made as to whether or the current byte is the expected sync byte value. If not, the flow proceeds to steps 644 and 635 receiving the next byte and incrementing the byte count value. If so, the flow proceeds to step 632. At step 632 the InSync variable is maintained equal to one, and the byte count variable is set to zero. At step 632, the framer is in a state labeled sync_verify.

At step 633 a comparison is made of the value of the received byte in order to determine if it is equal to the synchronization value. In the event the byte does match the synchronization value flow proceeds to step 634, where the sync drop count register is set equal to a predefined register value. By setting the sync drop counter value equal to the register value, it is indicated that a predefined number of synchronization values must be missed before synchronization is deemed to be lost.

If at step 633 the synchronization value is not encountered, the flow continues at step 641. At step 641, the SyncDropCnt is decremented to monitor how many synchronization bytes missed.

At step 642, a determination is made whether synchronization has been lost. Specifically, synchronization has been lost if SyncDropCnt is equal to zero. If so the flow will continue at step 643. If not, the flow continues at step 635 previously discussed.

At step 643 the SyncLockCnt is set to the number of a valid synchronization values which must be recognized before synchronization lock is achieved, and an interrupt is generated indicating that synchronization has been lost (SyncLost). The flow proceeds from step 643 to step 624.

At step 624, a determination is made whether or not the signal TSTART is active. In the event TSTART is not active the flow will proceed to step 602 in the manner previously discussed. In the event that the TSTART is active the flow will proceed to step 608 where the proper synchronization signal will be monitored.

One skilled in the art will recognize that the state diagram of FIG. 10 and the ASM diagram of FIG. 11 implement similar methodologies in order to accomplish synchronization to a transport stream using the framer 710.

FIGS. 12-14 illustrates specific registers capable of being utilized to implement specific framer features. For example, various variables described herein are described in the registers of FIGS. 12-14

FIG. 12 illustrates the status and state registers of the framer 710. A field labeled FramerSyncLock is used to indicate that frame synchronization has been acquired, this is analogous to State D of FIG. 10, and/or having arrived at sync_lock, step 635, of FIG. 11.

A field labeled FramerSyncDrop is utilized to indicate when synchronization has been lost. This is analogous to State A of FIG. 10, and/or having arrived at SyncLost, step 608, of FIG. 11. This is analogous to the FramerSyncLock variable.

The register Field labeled CurrentFramerState indicates one of five states. In a first state, the framer is in the process of capturing a new byte. In a second state the framer is out of transport packet frame synchronization. In the third state, the framer is searching for synchronization. In a fourth state of the framer is checking for synchronization. Finally, in the third state, the framer is in transport packet frame synchronization. Depending upon the location within the state machine of FIG. 10, or the diagram of FIG. 12, the values of FIG. 12 will be updated.

FIG. 13 illustrates a list of the interrupt registers. A field labeled enable global demultiplexer interrupt (EnableGlobalDemuxInterrupt) is utilized to enable all core interrupts. When negated all the core interrupts would be disabled.

An event interrupt mask field (EventInterruptMask) is utilized to mask specific interrupt sources including the FrameSyncLock interrupt, and the FrameSyncDrop interrupt. The framer synchronization drop bit is used to disable an interrupt that would occur when drop synchronization drop has occurred.

FIG. 14 illustrates a portion of a configuration register illustrating various field options associated with the framer. A framer sync lock length field (FramerSyncLockLength) comprises 5 bit field used to select the number of consecutive transport packets, with valid sync bytes, that need to occur sequentially to determine synchronization lock has occurred. The field FramerSyncLockLenth is analogous to the variable SyncLockReg of FIG. 5, and the register value indicated at steps 621 and 643 of FIG. 11.

A framer sync drop length field (FramerSyncDropLength) comprises a 3 bit field to select a number of consecutive transport packets that must be consecutively missed before the synchronization is declared lost. The field FramerSyncDropLenth is analogous to the variable SyncDropReg of FIG. 10, and the register value indicated at steps 612 and 634 of FIG. 11.

A framer bit polarity field (FramerBitPolarity) is a single bit used to indicate whether the transport stream data is being received MSB first or LSB first.

A framer clock polarity field (FramerClockPolarity) is a single bit that when asserted indicates transport stream data that is latched on a rising clock edge. Conversely, when negated, data is latched on a falling clock edge.

A framer mode field (FramerMode) comprises two bits for defining a combination of external transport stream control signals to be used to determine synchronization. In a first mode, only the TSTART value is used to determine when the latched data is valid. In a second mode, the TVALID signal is used determine when synchronization is valid. In the third mode, the framer will use both TSTART and TVALID to determine when synchronization is valid. In the fourth mode, the framer will use TCLOCK and TDATA to latch the bit stream in.

Each of the control signals TVALID, TSTART, and TERROR have an respective register fields TVALID Polarity, TSTART Polarity, and TERROR Polarity to indicate whether the signals are active high signals, or active low signals.

By providing the control information described in the configuration registers of FIG. 14, it is possible to program a decoder core 700 in order to interface to a large number of transport stream protocols.

Figure 15:
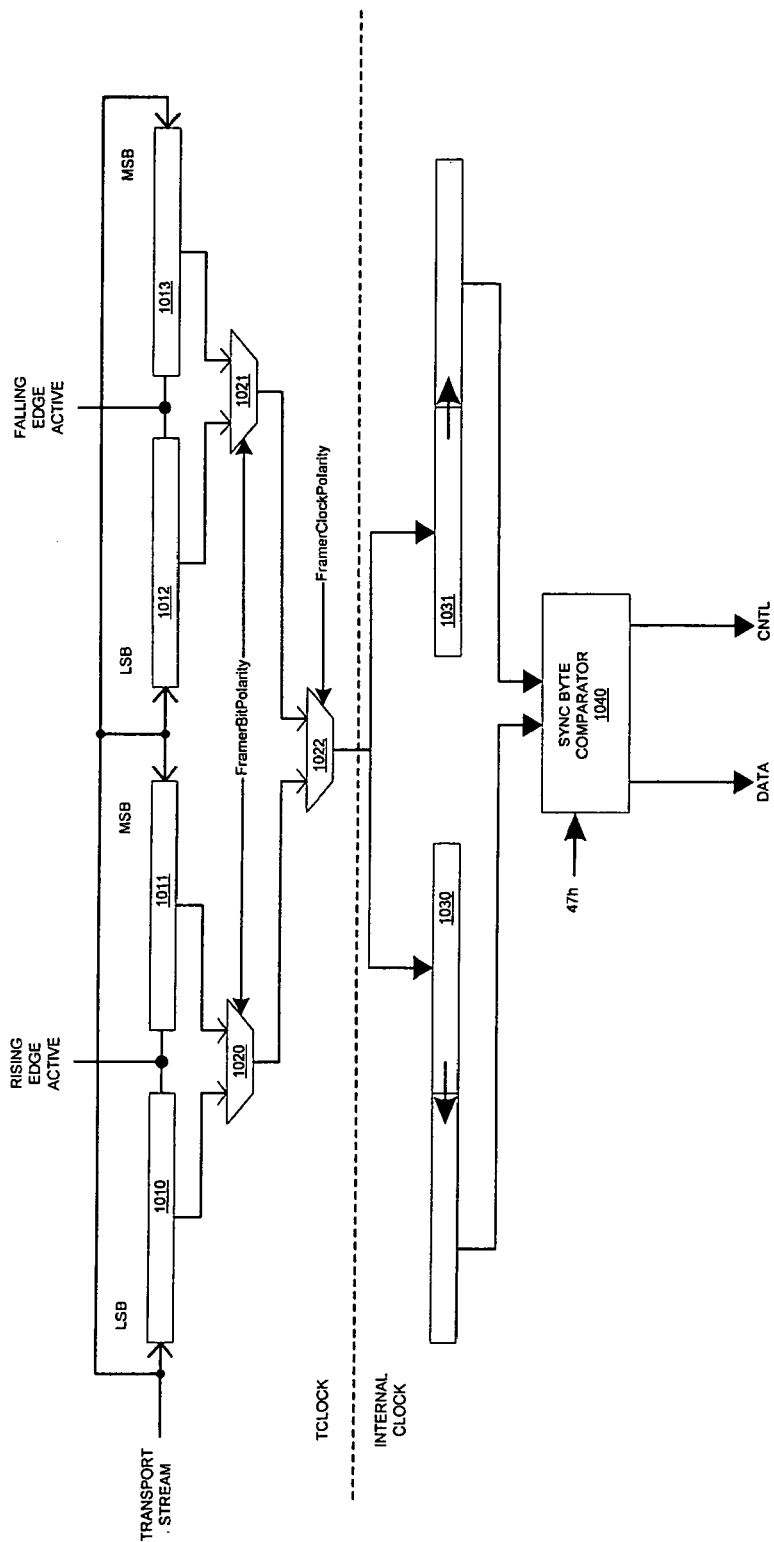
FIG. 15 illustrates, in block and logic form, a portion of a framer in accordance with the present invention.

FIG. 15 illustrates a specific implementation of a portion of the framer 710 using the control register information. The implementation utilizes various configuration registers to select modes of operation. In the specific embodiment illustrated, the transport stream data (t_data) is received serially and loaded into four registers 1010 through 1013. The serially loaded data is provided at a parallel output associated with each of the registers. The parallel outputs of registers 1010 and 1011 are received at inputs of multiplexer 1020. Parallel outputs of registers 1012 and 1013 are provided to the inputs of a multiplexer 1021. The parallel outputs from the multiplexers 1020 and 1021 are provided to inputs associated with the multiplexer 1022. The output of multiplexer 1022 is provided to two bit shifters 1030 and 1031. Parallel outputs of the bit shifters 1030 and 1031 are provided to a comparator 1040.

In operation, registers 1010 and 1011 receive the serial bits of data on rising clock edge, while registers 1012 and 1013 receive the serial bits of data on falling clock edge. This assures proper storage of data without knowledge of TDATA's relationship to TCLOCK. Clock triggers registers 1010 and 1011 store the data either from left-to-right, or from right-to-left. By loading data from opposite directions it is assured that whether data is received MSB first or LSB first that the data is stored in a manner consistent with the architecture. For example, a hexadecimal value 11 h stored in register 1010 will be stored as a hexadecimal value of 88 h in register 1011.

Register field FramerBitPolarity is to select either the MSB first registers 1011 and 1013, or LSB first registers 1010 and 1012, while the register field FramerClockPolarity will select the register having the appropriate clock qualification.

The data provided to the bit shift registers 1030 and 1031 is shifted bit-by-bit, to provide all possible byte combinations to the sync byte comparator 1040, which determines when the synchronization value has been encountered, and asserts the control bit in response to a successful compare. When a successful compare occurs, it is assumed that the byte and Packet boundaries have been located.

The synchronization hardware illustrated below multiplexer 1022 of FIG. 15 is isolated from the external clock. This is advantageous over the prior art, in that a loss of the TCLOCK signal does not shut down the control logic associated with synchronization of the transport stream.

In accordance with the present invention, it is possible to provide a flexible framer capable receiving a variety of physical transport stream formats and determining synchronization when only clock and data are present, and to provide appropriate synchronization control signal.

One skilled in the art will recognize that many specific implementations of the framer can be incorporated. For example, the framer may have a first in first out (FIFO), or other type buffer associated with it. In addition, instead of selecting specific configuration parameters using registers, other configuration specification means could be used, such as making them pin selectable, or any other of various types methods capable of describing selectable features.

Figure 16:
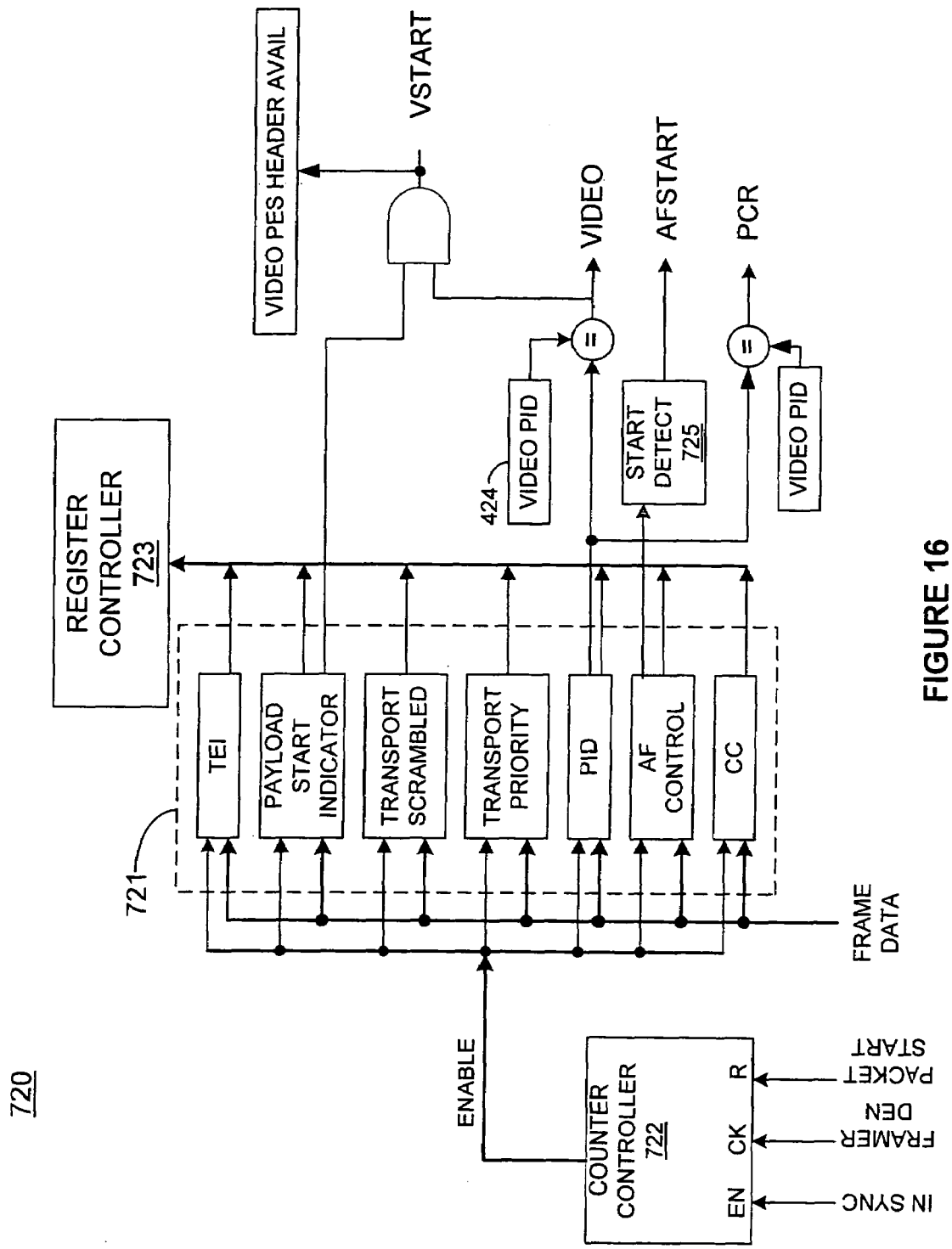
FIG. 16 illustrates, in block and logic form, a transport packet parser in greater detail.

FIG. 16 illustrates a more detailed view of the TPP 720. TPP 720 further includes storage locations 721, a counter controller 722, register controller 723, video PID location 724, and adaptation field start detect circuit 725.

In the implementation shown, each of the various header fields of a transport stream packet have a storage location within the storage locations 721. Because the transport stream data is received on a byte-by-byte basis, and because the header field locations are fixed, the data for the individual fields is readily obtained. In the embodiment of FIG. 16, each storage location for a specific data field is connected to the appropriate bits of the data bus, and the counter controller 722 provides enable signals to each field location to load values at the correct time.

Once a specific field has been parsed, register fields dependent upon the specific field can be updated. The register set 780 is accessed and updated by the register controller 723 of FIG. 16, which is connected to storage locations 721. In addition, the register controller 723 can retrieve register data as needed. For example, the value stored in the video PID storage location 724 is retrieved from register set 780 by the register controller 723.

The TPP 720 generates the VIDEO signal, which indicates the current packet is a video packet, by comparing the value stored in the video PID location 724 to the PID value stored in storage locations 721. When a match is detected, a video packet has been received. When the VIDEO signal is asserted and the Payload start indicator is also asserted, the packet is the first packet of a new video PES, and the VSTART signal is asserted.

The TPP 720 generates the AFSTART signal using the start detect module 725, which monitors the value of the adaptation control field, which in turn specifies the start of a new adaptation packet.

Figure 4:
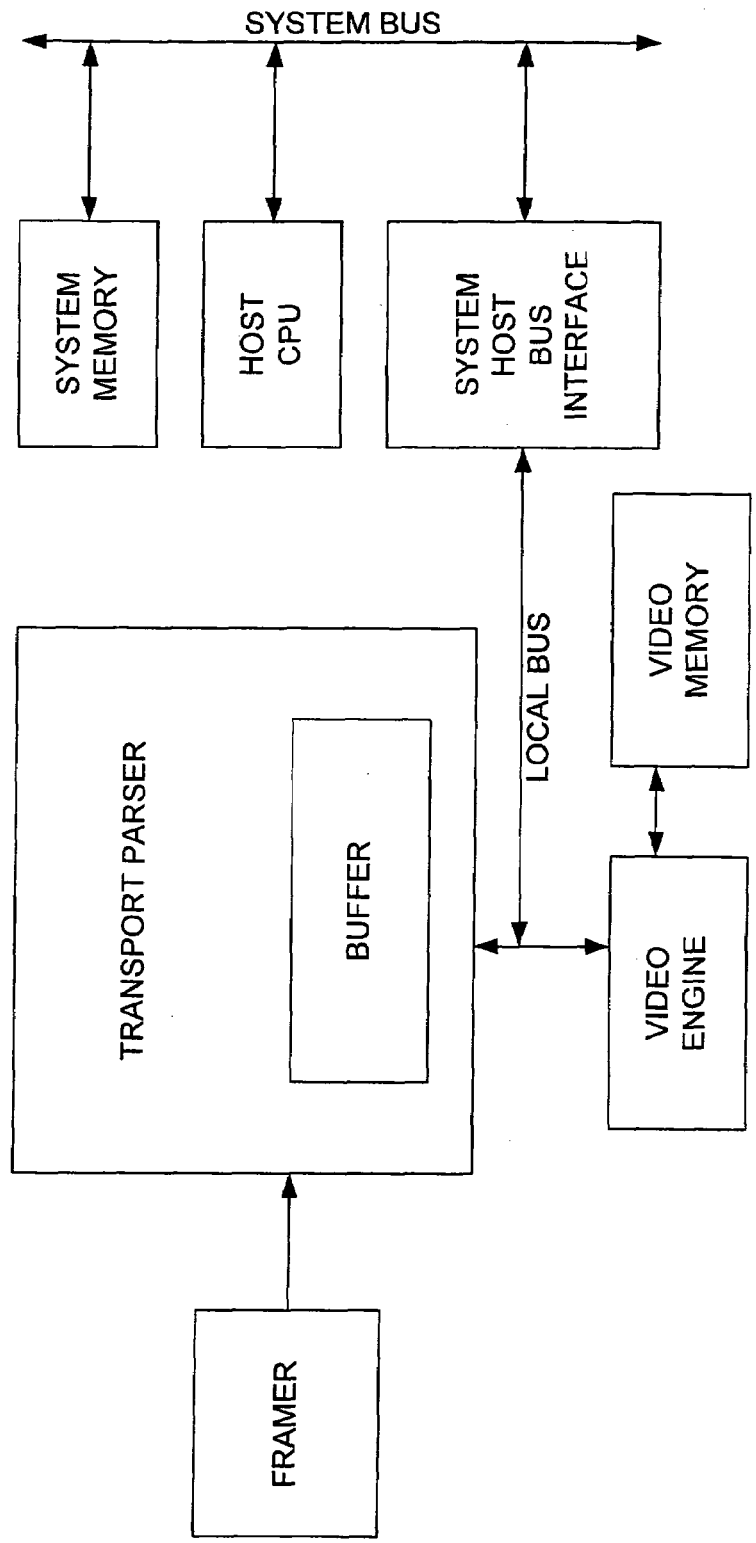
FIG. 4 illustrates, a prior art representation of a parser system.

The TPP 720 generates the PCR signal, which indicates the current packet is responsible for providing program count reference (PCR) values to the video decoder associated with the video memory of the system of FIG. 7 or FIG. 4. When a match is detected, the PCR related fields of the packet need to be parsed to determine if PCR data has been provided. When both the VIDEO and PCR signals are asserted the PCR data is retrieved from the video packet.

Figure 17:
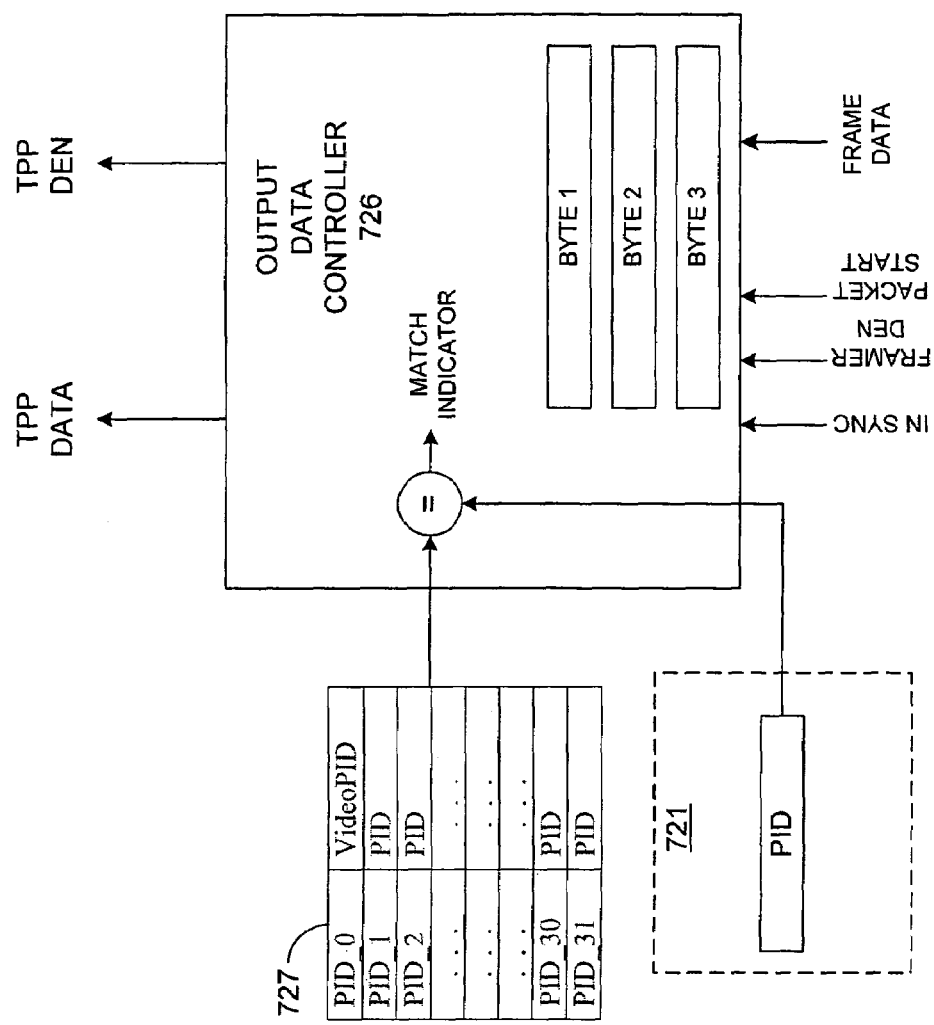
FIG. 17 illustrates, in block and tabular form, a data output controller in greater detail.

FIG. 17 illustrates another portion of the TPP 720 that determines if a specific packet is to be saved. FIG. 17 includes an allocation table 727, an output data controller 726, and a portion of the storage locations 721.

In operation, the Output data controller 726 provides data packets to the Buffer controller 760 of FIG. 7, when the PID value associated with the data packet is included in the allocation table 727. Therefore, each valid entry of the allocation table 727 is compared to the current PID value stored in storage location 721. If any of the valid entries match, the Output data controller 726 will provide the entire packet to controller 760 for storage. Because the current PID value is not available until after the fourth byte of the header is received, the output data controller 726 saves the first three byte in case they need to be stored.

The allocation table 727 illustrated lists 32 PID indexes (PID_0-PID_31) which have PID values associated with them. The allocation table 727 can actually be an abstraction of register locations from the register set 780. FIG. 18 illustrates video control registers, which are a portion of the register set 780. The PID value associated with the PID_0 entry of the allocation table 727 is defined to be the active video PID value, which is received from the VideoPID field of the Video Control Registers of FIG. 18. Likewise, FIG. 19 illustrates Demultiplexer Control Registers, which are a portion of the register set 780 used to identify packets, other than current video packets, which are to be saved. The PID values associated with the PID_1 through PID_31 entries of the allocation table 727 are received from their respective register locations within the Demultiplexer Control Registers of FIG. 19. For an entry to be valid, the EnableParsing field of the PID register needs to be enabled.

If a received packet's PID number is not listed in the PID Allocation Table, the packet is not processed further, i.e. discarded, and the next received TSP is analyzed. However, if the PID of the current packet is listed in the PID allocation table, and it is not the video PID, the packet is saved to memory.

Figure 20:
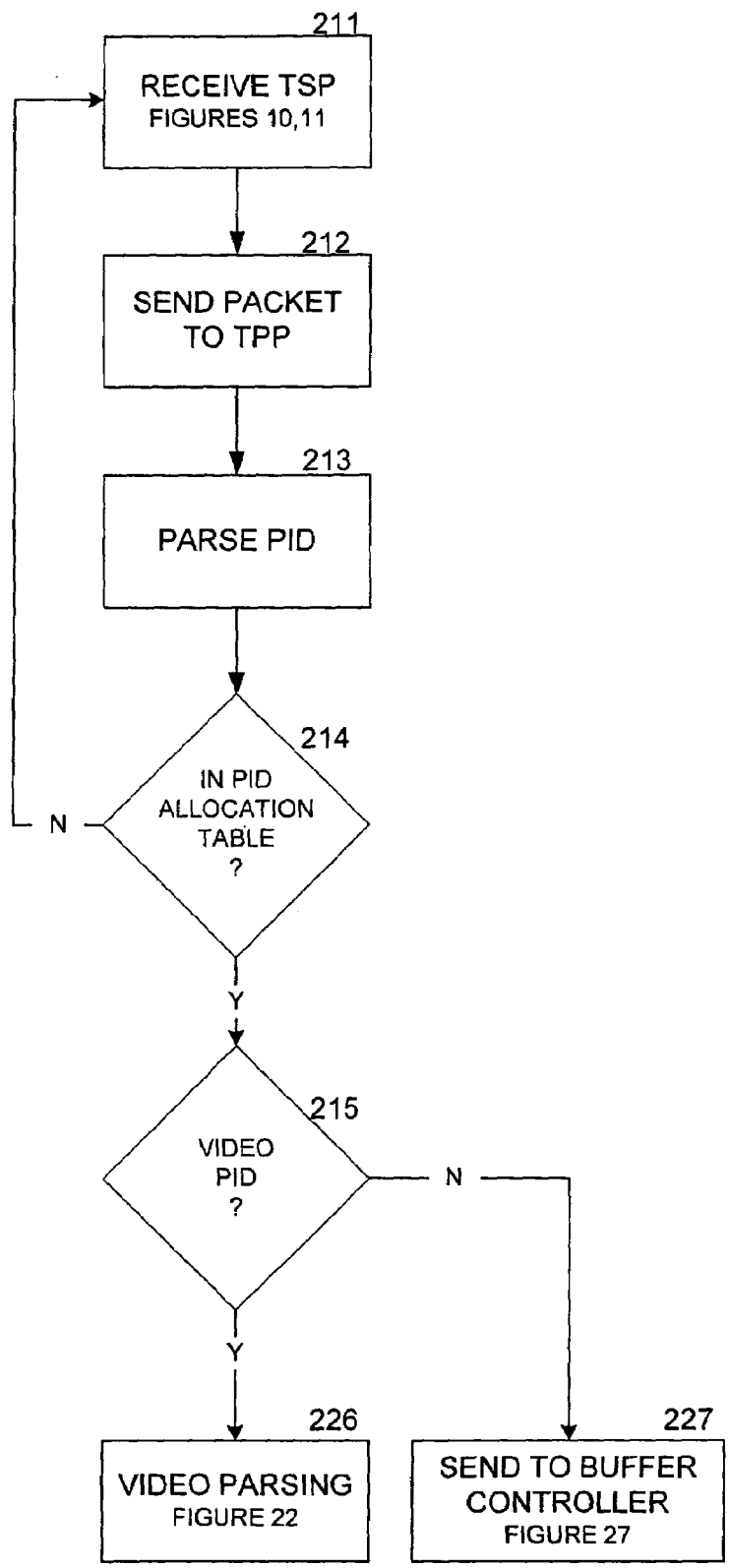
FIG. 20 illustrates, in flow diagram form, a method in accordance with the present inventions.

FIG. 20 illustrates a method associated with the TPP parser. At step 211, the TSP is received by the framer as discussed with reference to FIGS. 10 and 11 herein.

At step 212, the packet is received at the TPP. In the manner discussed herein, the packet is made available to the TPP one byte at a time. The framer provides an indicator where the first byte of the packet is located.

In response to receiving the first byte of the packet, the TPP will parse the packet header at step 213. From the parsing of the header, the TPP will retrieve the PID value of the packet.

At step 214, a determination is made whether the packet is identified as a valid packet. As previously described, one way to be identified as a valid packet is be specified in an allocation table, which can be derived from specific register information. When a PID value is listed in the allocation table, the packet is to be further processed.

Figure 22:
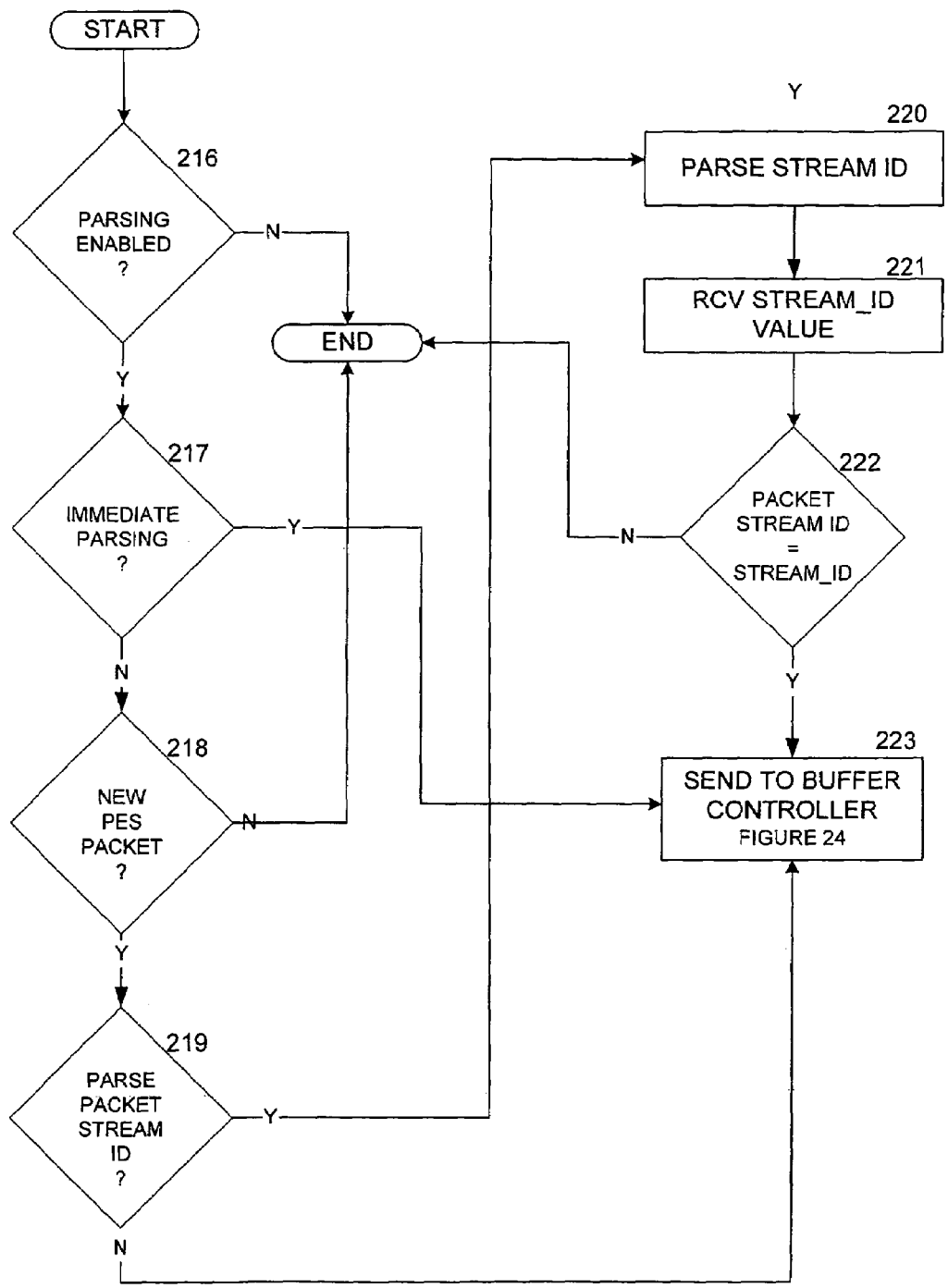
FIG. 22 illustrates, in flow diagram form, a method in accordance with the present inventions.

At step 215, a determination is made whether the packet is a packet that is to be additionally parsed. For example, step 215 specifically indicates that a determination is being made whether the PID value indicates the packet is a video packet. If so, flow proceeds to step 226 for video parsing as indicated in FIG. 22. If the PID does not indicate a packet for special processing, i.e. not a video packet, the flow proceeds to step 227 where the data is send the buffer controller for storage, as indicated with reference to FIG. 22.

When the PID allocation table, or other means, indicates the packet is a video packet the Packetized Elementary Stream Parser (PESP) is enabled to allow further processing. In the specific embodiment of the PID allocation table listed above, the video PID is stored as PID_0. However, other methods of identifying the video PID, such as the use of a flag or other indicator are also possible. The operation of the PESP is controlled by the PESP Control Registers, as illustrated in FIG. 18.

Figure 21:
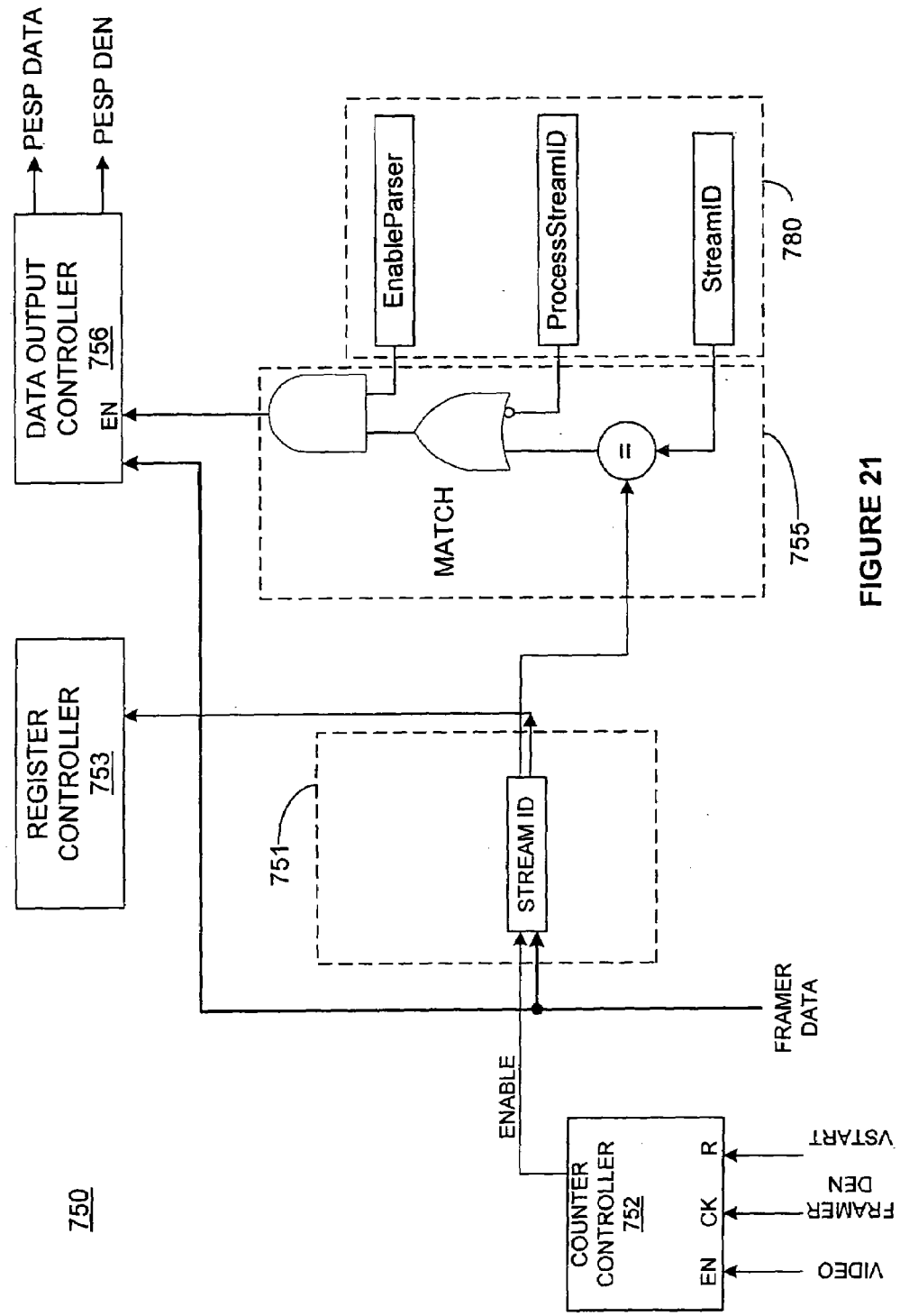
FIG. 21 illustrates, in block and logic form, a video packetized elementary stream parser in greater detail.

FIG. 21 illustrates the PESP 730 in greater detail. PESP, of FIG. 21, includes a counter controller 752, storage location 751, register controller 753, data output controller 756, video data control module 755, and portions of register set 780.

In the implementation of FIG. 21, a storage location within the storage locations 751 is reserved for the STREAM ID header field of a transport stream packet. In the embodiment shown at FIG. 21, inputs of the storage location for STREAM ID are connected to the appropriate bits of the data bus and the counter controller 752, to receive stream ID data from the FRAMER DATA representation of the transport stream at the correct time. The counter controller 752 receives the VSTART signal indicating the start of a new video PES and generates enable signals to capture the stream ID, and other information, from the video PES header. The counter controller is controlled by the signals VIDEO, FRAMER DEN, and VSTART. The VIDEO signal indicates the current packet is a video packet. The FRAMER DEN signal indicates when the current FRAME DATA byte is valid, and VSTART indicates when the current packet is the first packet for the video PES, in other words, VSTART indicates when the video packet contains video PES header data to be parsed. Based upon the VSTART signal, and the FRAMER DEN signal, the counter controller 752 can determine which byte of the header is currently being received.

In another implementation, control module 755 is controlled by the EnableParsing field (not shown in FIG. 21) of the video control registers of FIG. 18. The EnableParsing field is a one bit field, which when deasserted, prevents further parsing of the video packet by the video PESP. Therefore, when the EnableParsing field is negated, the header of the video packet would not be parsed, and therefore, the packet would be discarded. The counter controller can be controlled directly from the EnableParsing bit of the video control registers, or indirectly where the VIDEO signal is disabled by the TPP 720 in response to the EnableParsing bit being deasserted.

Once the video PES header field has been parsed, register fields dependent upon the specific fields of the video PES header can be updated. The register set 780 is accessed and updated by the register controller 753 of FIG. 21, which is connected to storage locations 751 of the PESP. In addition, the register controller 753 can retrieve or access register data as needed. For example, the values EnableParser, ProcessStreamID, and StreamID are register values from register set 780.

The video data control module 755 contains logic that enables the video data payload of the present packet to be stored. Operation of the control module 755 is determined in the content of various video control registers, as illustrated in FIG. 18. The EnableParsing field is a one bit field, which when negated prevents any data from the current video packet from being saved. The ProcessStreamID field is 1 bit-field. When asserted, it enables further parsing based upon a specific stream ID value of the video PES header, such that if the video control register field StreamID of FIG. 18, does not match the parsed steam ID from the current packet, the data of the packet will not be saved. This is an advantage over the prior art, where filtering on the stream ID field of the video PES was done in software, generally by the system.

In the specific implementation illustrated, only the data payload of the video PES is stored. Since the parsing is done in hardware, there is no need for the header information to be stored.

In another embodiment, the field labeled StartFromPU-SICommand is used to indicate whether video PES parsing is to start immediately with the next packet or wait until a new PES stream is received as indicated by the VSTART signal, where the acronym PUSI stands for Payload Unit Start Indicator and is a part of MPEG-2 syntax. Once the new video PES stream is identified, the StartFromPUSICommand field is negated, and all subsequent video packets are further processed by the PESP.

The video PESP parser is bufferless in that no local buffers are used to store the payload data for access by other parts of the system. The prior art parsers stored the parsed data in large buffers locally, which were then capable of being accessed by system components by requesting access to the local bus. The bufferless parsers of the present invention do not store data locally for access by the system. Instead, parsed data to be buffered is transmitted to the buffer controller 460, which buffers data in system or video memory.

FIG. 22 illustrates a method associated with a video PESP parser. At step 216, the PESP has received an indication that a video packet is ready to be parsed. The notification can be directly from the TPP, by a polling mechanism, or other type interrupt. Step 216 determines whether parsing of the video stream is enabled. This can be determined based upon the field labeled EnableParsing of the video control registers of FIG. 18. When parsing of the video packet is not enabled, a specific action will occur. One action would be to perform no further processing of the packet, as illustrated. In another implementation, the packet would be automatically stored without further parsing, perhaps with the packet header field. When parsing of the video packet is enabled, the flow proceeds to step 217.

At step 217, a determination is made whether the packet is to be parsed immediately, or whether parsing of video packets is to wait until a new video PES is detected. If the packet is to be parsed immediately, the flow proceeds to step 223. If the packet is not to be parsed immediately, flow proceeds to step 218 to determine when the proper criteria for parsing is met. Field StartFromPUSICommand indicates whether parsing is to be immediate.

At step 218, a determination is made whether the present packet is the first packet of the video PES. If the packet is a new video PES packet, the field StartFromPUSICommand is disabled, and flow proceeds to step 219. If the new packet is not the first packet of a video PES, the flow will terminate as indicated with no further processing.

At step 219, a determination is made whether the current video packet is to be parsed based upon the packet stream ID. If so, flow proceeds to step 220, if not, flow proceeds directly to step 223.

Figure 23:
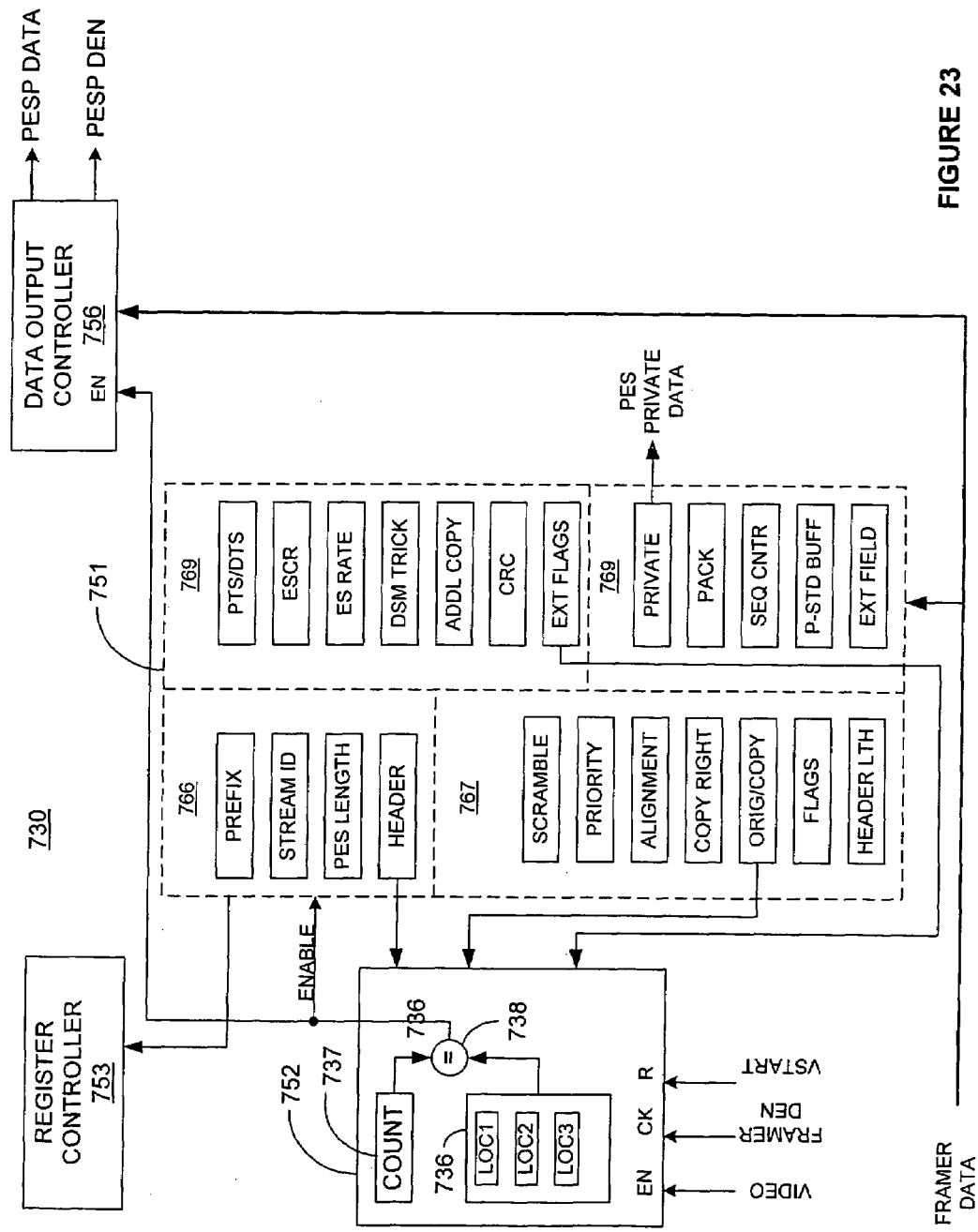
FIG. 23 illustrates, in block diagram form a video packetized elementary stream parser.

At step 220, the PESP parses the stream ID from the PES header as discussed with reference to FIG. 21. In addition, FIG. 23 illustrates addition hardware parsing which can be performed by the PESP.

At step 222, a determination is made whether the parsed steam ID from the PES header is equal to the value stored at register field StreamID of the video control registers of FIG. 18. If so, the field StartFromPUSICommand is disabled to allow subsequent packets associated with the video PES to be stored, and flow proceeds to step 223. If no match occurs, the flow terminates as indicated, and no further processing occurs.

At step 223, the packet data is sent to the buffer controller for storage, as discussed with reference to FIG. 24.

Note that additional parsing steps can occur between steps 217 and 223, such that from step 217 additional parsing would occur. The parsing steps illustrated in FIG. 22 are all by-passed if the current transport stream packet is to be immediately routed to a system memory and parsed by the host processor.

FIG. 23 illustrates additional parsing features of the PESP 730. FIG. 23, includes a counter controller 752, storage location 751, register controller 753, and data output controller 756.

In the implementation of FIG. 23, a storage locations within the storage locations 751 are reserved for the specific PES header field of the Packetized Elementary Stream. In the embodiment of FIG. 21, inputs to the storage locations 751 for specific PES header fields are connected to the appropriate bits of the data bus, while the counter controller 752, which receives the VSTART signal indicating the start of a new video PES, receives PES header data from the FRAMER DATA representation of the transport stream at the correct time.

The counter controller 752 will generate enable signals to capture the various PES header fields based upon the values stored in locations 736, and a counter value generated by counter 737. The counter controller is controlled by the signals VIDEO, FRAMER DEN, and VSTART. The VIDEO signal indicates the current packet is a video packet. The FRAMER DEN signal indicates when the current FRAME DATA byte is valid, and VSTART indicates when the current packet is the first packet for the video PES, in other words, VSTART indicates when the video packet contains video PES header data to be parsed. Based upon the VSTART signal, and the FRAMER DEN signal, the counter controller 752 can determine which byte of the header is currently being received. As indicated with reference to the StartFromPUSICommand register of FIG. 18, the counter controller can either allow for immediate PES parsing upon receiving a video packet, or it can wait to parse the PES data until a packet containing PES header information is received. Where PES parsing is immediate, the video data is provided to the output buffer.

In operation, a compare operation determines if the present counter 737 values is equal to any of the values stored in location 736. If so, it indicates that the current clock cycle is providing data to be stored in one of the fields of storage locations 751. As a result, the controller 752 will generate an enable to the appropriate one or more fields represented in the current clock cycle, and the field data will be latched.

The compare function 738 can be implemented in many different ways. For example, a state machine or logic can be used to indicated which of the storage locations 751 are to be stored at a specific time. In addition, feedback is provided to the controller 752 from various storage locations 751 to assure proper operation. For example, all PES header will have the field portions 766 of storage location 751. However, depending upon various values of these, and other fields, the field portions 767-769 may or may not be present in a particular PES header.

Figure 3:
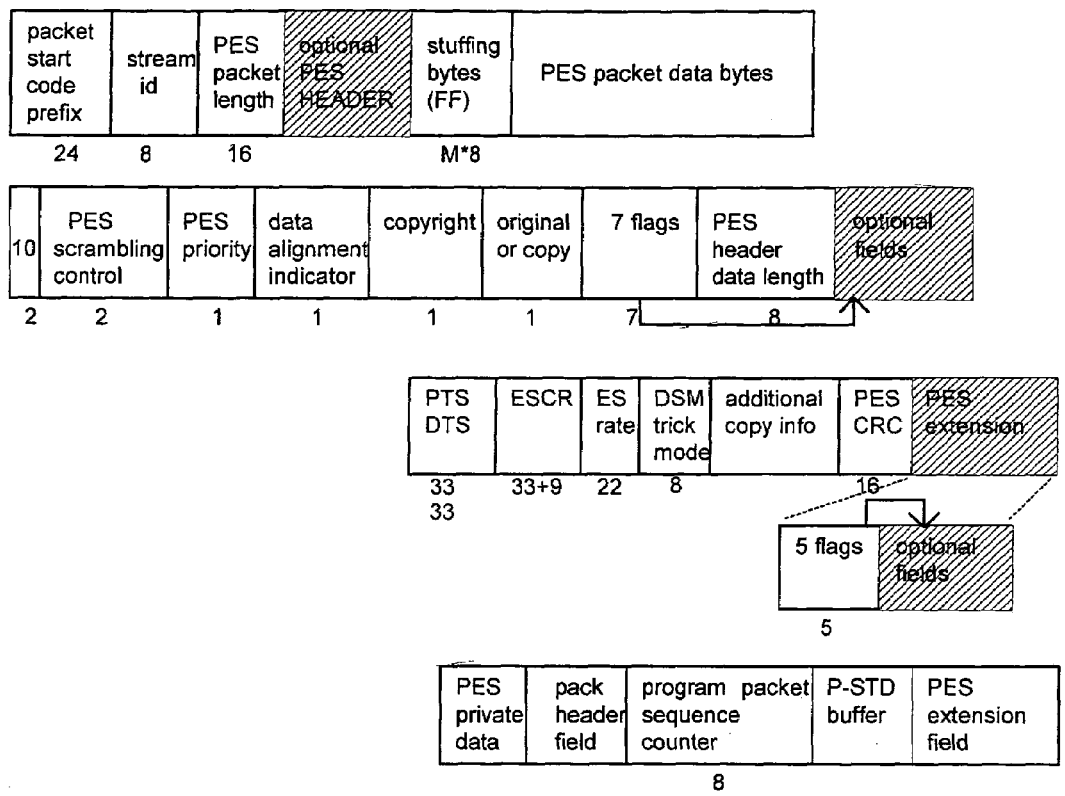
FIG. 3 illustrates, in block form, prior art fields associated with Packetized Elementary Stream.

For example, whether the fields portions 767 exist in a current header is determined by whether the binary framing indicator "10" immediately follows the PES packet length field as in FIG. 3, and as stored in the OptionalHeader indicator field. This OptionalHeader indicator field is compared to the expected value and the results are provided to the controller 752 to indicate additional parsing is to be done. As a result, the parser 752 continues to generate control signals to store the fields associated in the field portions 767.

In a similar manner, the Flags field of storage portion 767 indicates which of the storage portions 768 are present, and the ExtentionFlags of storage portion 768 indicate which of the storage portions 769 are present. In this manner, the controller 752 determines which header fields are present and need to be stored in storage locations 751.

Once the video PES header field has been parsed, register fields dependent upon the specific fields of the video PES header can be updated. The register set 780 is accessed and updated by the register controller 753, which is connected to storage locations 751 of the PESP. In addition, the register controller 753 can retrieve or access register data as needed. FIG. 24 illustrates a subset of the Status Register Fields associated with on implementation the PESP, while FIG. 25 illustrates interrupt mask registers having corresponding bits.

Once the header has been completely parsed, the data associated with the payload portion of the current PES packet can be provided to the data output controller 756 as discussed with reference to FIG. 21. In an alternate embodiment, the 16 bytes of optional PESPrivate data associated with the PES header and stored in storage locations 769 are provided external the PESP to a private data packetizer as will be discussed in greater detail herein.

Figure 26:
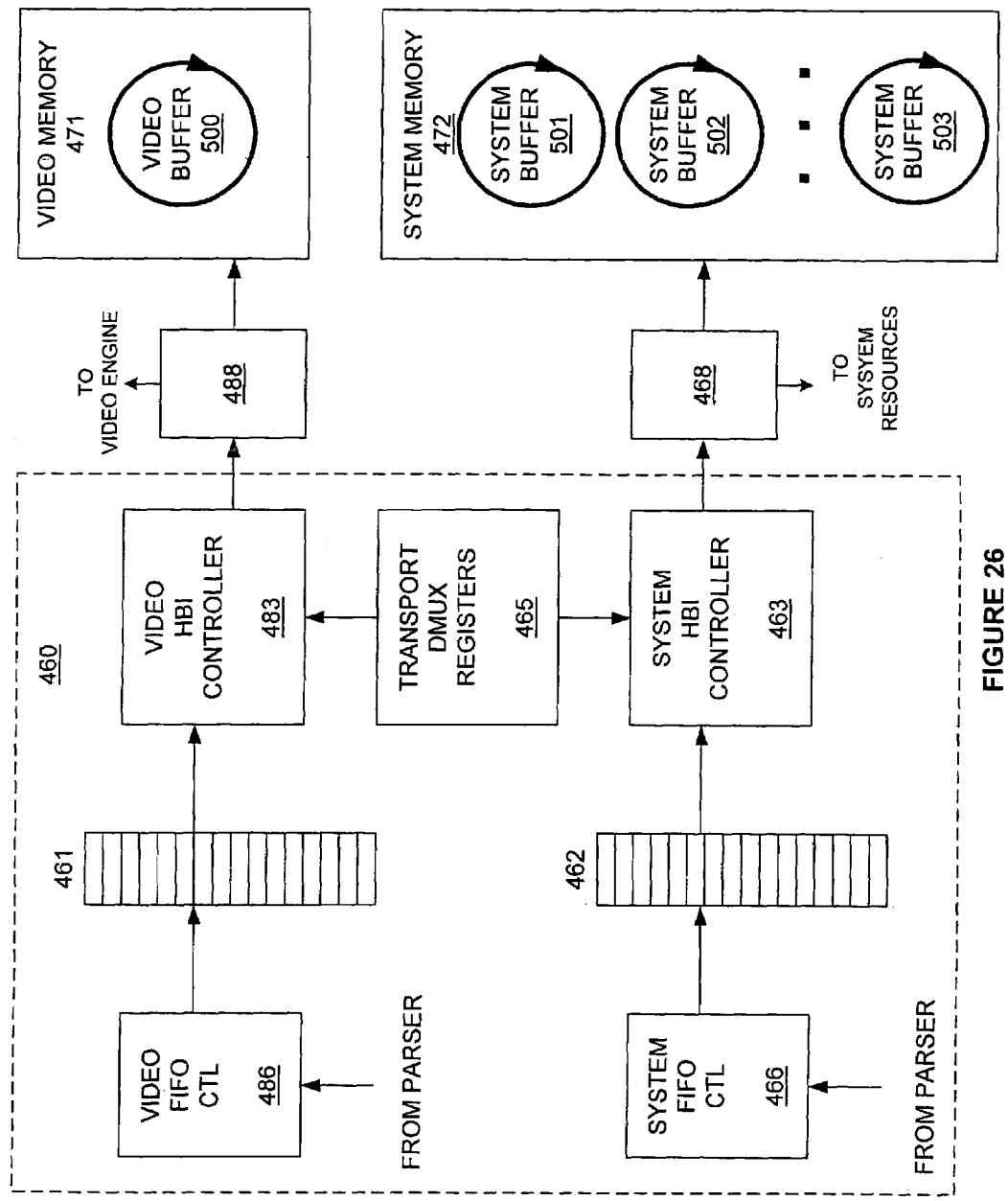
FIG. 26 illustrates, in block form, an output controller and memory in accordance with the present invention.

FIG. 26 includes a detailed view of buffer controller 460 of FIG. 5, video bus/memory controller 488, system bus/memory controller 468, video memory 471, and system memory 472. In the specific embodiment illustrated in FIG. 26, the buffer controller 460 includes a data path for handling video PES data to be stored in the video buffer 500 of video memory 471, and a data path for handling other PES data that is to be stored in system memory buffers 501-503 of the system memory 472. The data path for handling other PES data includes the System FIFO (First In First Out) controller 466, FIFO 462, and System HBI (Host Bus Interface) Controller 463. The data path for handling video PES data includes a Video FIFO controller 486, FIFO 461, Video HBI Controller 483. Each of the System and Video data paths accesses transport demultiplexer register 465.

In operation, the System FIFO controller 466 provides an interface between the Parsers of FIGS. 5 and 7 and the FIFO 462. The controller 460 allows filtered packet data to be received and stored in the FIFO 462. Once stored in the FIFO 462, the System HBI controller 463 requests access to the system memory 472 through the controller 468. The controller 468 may include a system bus controller, a memory controller, or a combination of a memory/system bus controller. Generally, the controller 468 will control access to other system resources as well.

In accordance with the invention, the System Memory 472 has been partitioned by the system host to include one or more system circular buffers 501-503. The system buffers 501-503 are implemented as circular buffers and are filled by operation of the controller 483. The controller 483 handles the buffer "write" pointer. The "read" pointer for the buffers is managed by the software on the system host side (not shown) which retrieves data from the buffers 501-503. There can also be a "high water" mark register associated with each buffer (not shown). The purpose of a "high water" mark register is to provide an interrupt when the write pointer crosses the value in this register. However, because there is generally only one interrupt for each of the plurality of buffers, software polling can be used to determine the cause of the interrupt.

In a specific implementation, the number of system buffers is limited to 15 buffers. The transport core may use fewer than 15 buffers. More than one PID per buffer is allowed. However they have to be different, i.e. the same PIDs can not be allocated to more than one buffer (i.e. one TSP packets can be routed into only one destination ring buffer). The Transport Demultiplexer registers of FIG. 19 are used to specify where data associated with a specific PID is to be stored. For each PID to be saved, a buffer index is used to specify one of the 15 buffer locations in system memory. Multiple PID types can be stored at a common buffer by specifying the same buffer in the BufferIndex field In an alternate embodiment, data associated with all system PIDs can be stored to a single buffer, which may be specified or defined by default. Note with reference to FIG. 7, the buffer index, or location, can be determined by one of the parsers, and provided to the Buffer controller 760.

The video data path of FIG. 26 is handled in a manner analogous to the system path described above. However, in the specific embodiment, only one buffer, in video memory, is associated with the video path.

The physical memory location and the size of the ring memory buffers 500-503 is specified by the system host using buffer configuration and management registers (not shown). The host processor has to initially specify buffer start address and length of the buffer. Other buffer data can also be used, for example, a threshold register can be implemented.

The size of the video buffer depends on horizontal and vertical pixel resolution, frame rate, profile and level, maximum bit rate and video buffering verifier (VBV). ATSC requires a buffer of minimally 0.95 MB (VBV=488); while for MPEG-2 Main Level at High Profile, the size is 1.17 MB (VBV=597). The buffer controller 460 will manage a write pointer for the video stream. The read pointer is managed by the control 488 associated with the video adapter. Hardware or software can generate an interrupt if the write pointer is equal to the read pointer—1 (overflow condition).

Regarding the audio buffer requirements, the worst case is for a when the nominal audio bit rate 640 kbps with sampling frequency of 32 kHz. The actual size of the compressed bit stream audio buffer depends on a priority and the rate of occurrence of the audio decoder thread, when audio is decoded in software.

On a channel change, software will flush the buffers by setting the read pointers to be equal to the write pointers after the transport stream parser has been turned off.

Figure 27:
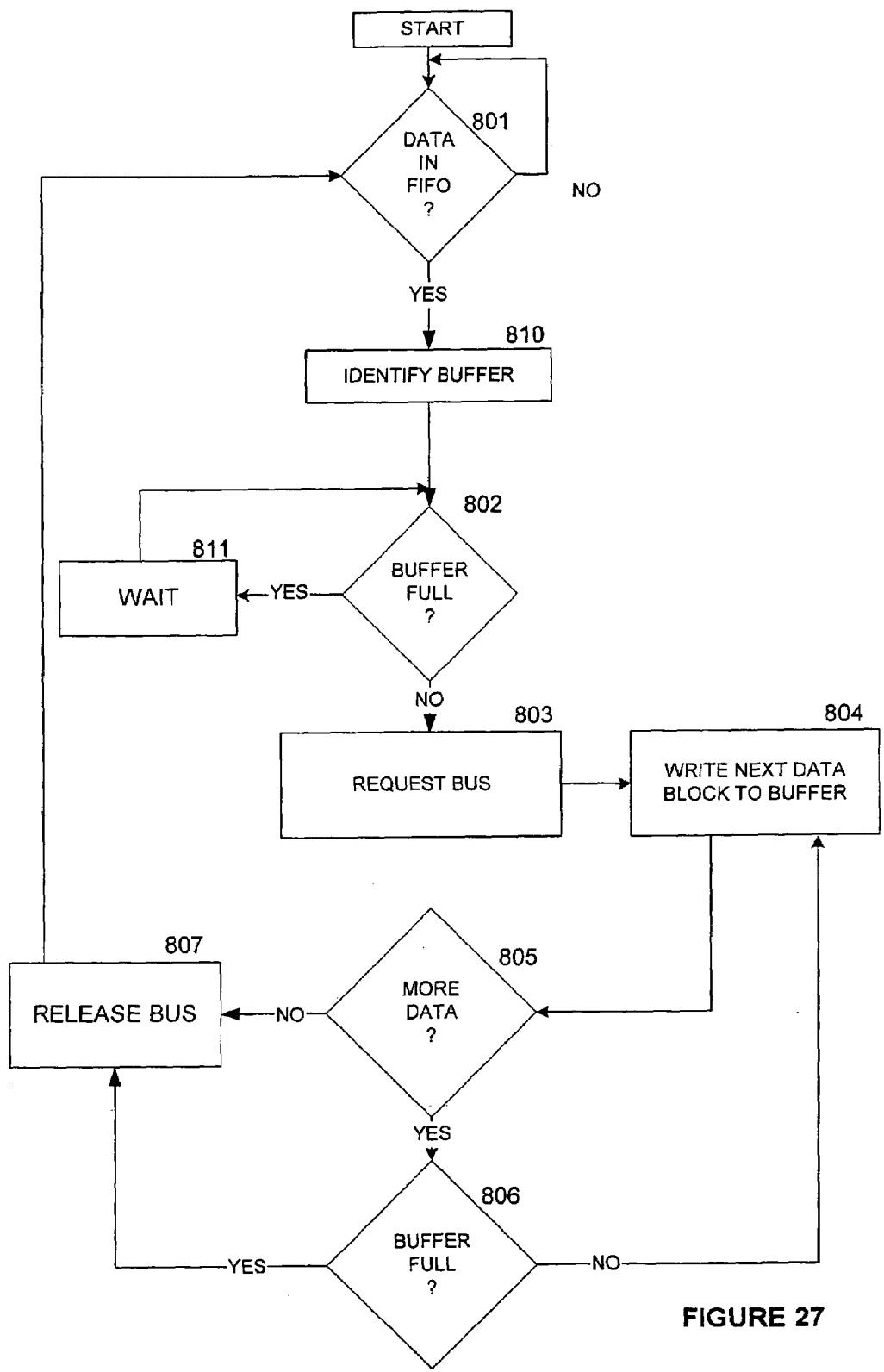
FIG. 27 illustrates, in flow diagram form, a method in accordance with the present invention.

FIG. 27 illustrates a method in accordance with the present invention describing the operation of the system HBI controller 463 of FIG. 26. The flow is also applicable to the video HBI controller 483. At step 801, a determination is made whether there is data stored in the FIFO 462. If not, flow remains at step 801 until data is present, otherwise, the flow proceeds to step 810. At step 810, the buffer to which the data is to be stored is identified. The destination buffer is identified when matching and crossing the PID number, or identifier, to the buffer number in the transport demultiplexer register 465. The buffer can be identified by accessing the allocation table, or by receiving a buffer index from the transport parser or other portion of the transport core.

At step 802, a determination is made whether the identified buffer is full, or otherwise not capable of receiving additional data. If the buffer is not capable of receiving additional data, the flow loops back to step 802 through step 811, which implements a delay. Note the delay of step 811 may be a fixed delay, as result of polling to determine if the buffer is full, or the delay of step 811 may be variable, such as where the delay is based an interrupt which indicates when the buffer is available. Once the desired buffer is no longer full, flow proceeds to step 803.

At step 803, a bus request is made to allow access to one of the buffers 501-503. Once the bus connected to the buffer has been acquired, the next block of data is written to the appropriate buffer at step 804. A block of data can be a word, double word, or any other size of data specified by the system. In a specific embodiment, the parsers of FIG. 5 assure data is provided to the FIFO only in whole blocks by always writing entire blocks of data to the FIFOs.

At step 805, a determination is made whether the identified buffer 501-503 is now full. If so, the flow proceeds to step 807 where the bus is released, if not full, the flow proceeds to step 806, where it is determined if more data is to be written.

At step 806, a determination is made whether more data resides in the FIFO 462. If so, flow proceeds to step 804, otherwise, the flow proceeds to step 807 where the bus accessing the Buffer is released and flow returns to step 801. In another embodiment, the bus would be released after each block is transferred, instead of determining if more data is to be written. By implementing the flow of FIG. 26, the data stored in the FIFO 462 is transferred to the buffers.

The buffer implementation described provides an advantage over the prior art in that moving the buffers in to system and video memory associated with an external system, such as a general purpose computer, allows for bufferless parsers. As a result, the system and video resources do not have to wait to access buffers local to the parsers. The performance improvements using bufferless parsers has been observed by the present inventors to be up to 40% over the prior art. In addition, by allowing for parsing of the PES data, it is possible to limit the amount of bandwidth used to store unused data. One skilled in the art will recognize the present invention has been described with reference to a specific embodiment, and that other implementations and variations of the present invention would be anticipated. For example, when a TSP is "sent" from the TP to the PESP or the buffer controller, it is to be understood that not necessarily all of the header information need be sent. In fact, in would generally be necessary for only the PID associated with the packet be forwarded. In addition, the location and implementation of the register sets and functionality described herein can be partitioned in ways other than the specific implementations described.

Figure 28:
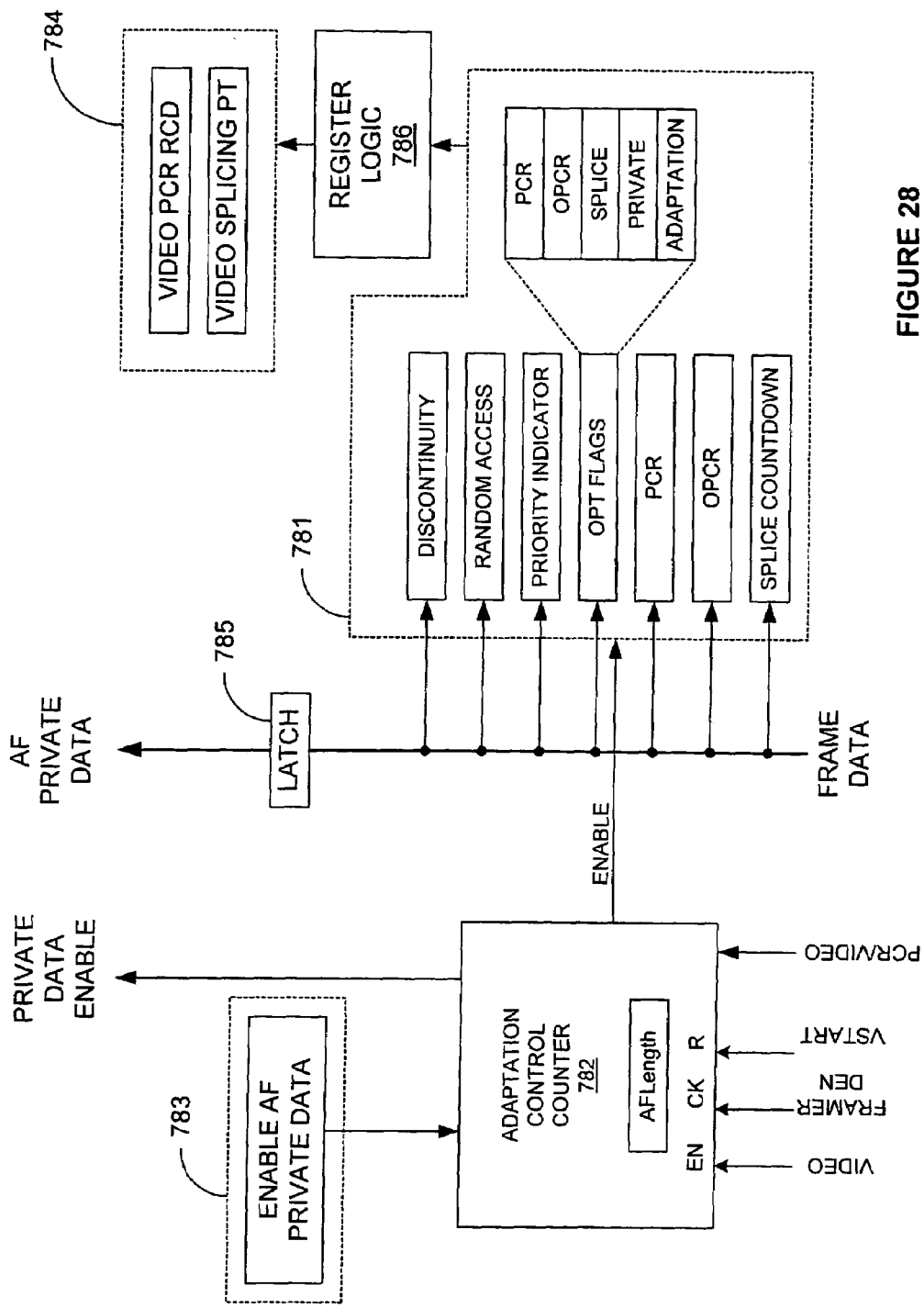
FIG. 28 illustrates, in block diagram form, a detailed view of an adaptation field parser.

The AFP parser 750, illustrated in FIGS. 5 and 7, parses data associated with the adaptation field of a transport packet. The Transport Packet Parser 720 enables operation of the Adaptation Field Parser 750 when the adaptation field of the header indicates the presence of an adaptation field. FIG. 28 illustrates, in block diagram form, a detailed view of the Adaptation Field Parser 750.

The AFP 750 illustrated in FIG. 28 includes adaptation control counter 782, latch 785, register logic 786, and storage and register locations 781, 783, and 784. In operation, the adaptation control counter 782 receives signals on connections labeled AF START, FRAMER DEN, and FRAME DATA. The connection labeled AF START receives signals from the Transport Packet Parser 720, and indicates the beginning of the transport packet's adaptation field. The connection labeled FRAMER DEN receives signals from the Framer 710, and indicates when each new byte of data is available on the FRAMER DATA bus. Based upon the received signals, the adaptation control counter 782 provides the control signals necessary to parse specific field information from data received on the FRAME DATA bus.

In operation, the Transport Packet Parser 720 will assert a signal on to the connection AF START in response to the adaptation field control portion of the transport packet header indicating the presence of an adaptation field. The signal on the AF START connection will be asserted in relation to the assertion of the first byte of adaptation field data onto the FRAMER DATA bus.

The first byte of the adaptation field indicates the length adaptation field. Therefore, the adaptation control counter 782 will latch the first byte of the frame data into a storage location labeled AF LENGTH to determine the length of the adaptation field. Accordingly, the adaptation field has a variable length between 1 and 183 bytes long. By decrementing the adaptation field length by one as each new byte of data is received on the FRAME DATA bus, the adaptation control counter 782 can monitor which fields, or field portions, of the adaptation field are present on the FRAME DATA bus at a specific time. Accordingly, the adaptation control counter 782 provides operational control signals to each of the storage locations of storage portion 781 to correspond to the presence gets data on the FRAME DATA bus.

Generally, the storage locations 781 correspond to specific registers of the register set 780 of FIG. 7. For example, the discontinuity indicator field is known to be the first bit, of the second byte, of the adaptation field. Therefore, the storage location labeled Discontinuity Indicator of storage area 781 will be connected to only the first bit of the FRAME DATA bus. Furthermore, logic associated with the Adaptation Control Counter 782 will provide a latch control signal to the Discontinuity Indicator of storage location 781 only when the counter associated with the Adaptation Control Counter 782 indicates the second byte of data is present on the FRAME DATA bus. In a similar fashion, the other specific adaptation bit-fields associated with locations 781 will be parsed. Note that the individual locations of storage locations 781, may be the actual register locations of register set 780, or may be storage locations local to the adaptation field parser 750. Where the storage locations are local to the parser 750, a register control portion (not shown) can be used to update values within the register set 780.

Figure 1:
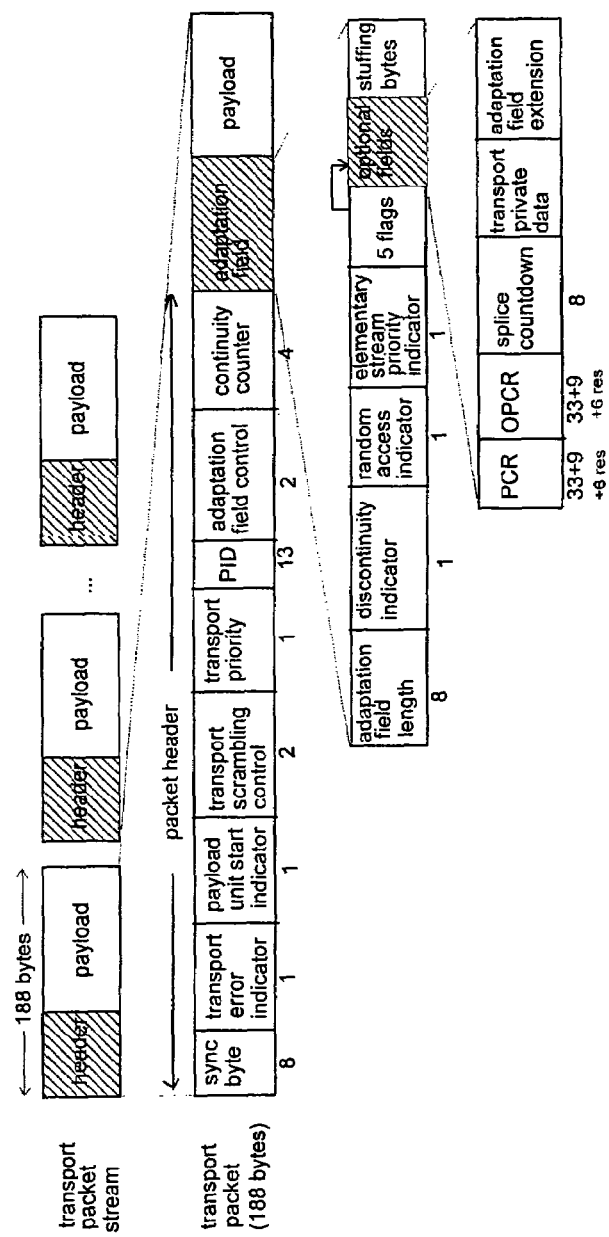
FIG. 1 illustrates, in block form, prior art fields associated with a transport stream packet.

The Optional Flags field of storage locations 781 is connected back to the adaptation control counter 782 in order to provide feedback. The need for this feedback is best understood with reference to prior art FIG. 1. Prior art FIG. 1 illustrates that the adaptation field can include five optional fields. The presence of each of these five optional fields is indicated by flag bit. The field labeled Optional Flags represents the five flags of the adaptation field to indicate the presence of the optional fields. Therefore, by providing feedback from the optional field location, the adaptation control counter 782 can correctly determine which optional field data is present, and when to receive optional field data.

Storage locations 784 generally represent register locations whose values are determined based upon the parsed information of storage locations 781. Specifically, the register logic 786 monitors the operation of the adaptation control counter 782 and/or the contents of the locations 781 to determine when the PCR value has been received. In addition, the displaced countdown value received at the adaptation field parser is monitored determine when the actual video splicing point occurs.

When the optional flags indicate that the optional fields includes transport private data, the adaptation control counter 782 will provide the private data from the FRAME DATA bus to a PESP PRIVATE DATA bus through either directly, or through a latch 785. In addition, the adaptation control counter 782 will provide a signal to a node labeled PRIVATE DATA ENABLE to indicate when the PESP PRIVATE DATA bus has valid data. In one embodiment, the PRIVATE DATA ENABLE node is clocked for each valid byte of data written to the PESP PRIVATE DATA bus. In another embodiment, the PRIVATE DATA ENABLE node would include multiple nodes, whereby one node pulsed to indicate each valid byte of data written to the PESP PRIVATE DATA bus, while the other node indicated the valid PESP private data cycle. The valid PESP private data node would be asserted for the entire assertion of PESP private data from a common transport packet.

Operation of the adaptation field parser 750 is better understood with reference to FIGS. 29 through 31 which illustrates portions of the register set 780 associated with the adaptation field parser 750. Specifically, FIG. 29 illustrates status registers, FIG. 30 illustrates interrupt mask registers, and FIG. 31 illustrates control registers.

FIG. 29 illustrates a number of status register fields associated with the register set 780 of FIG. 7, which are associated with the operation of the adaptation field parser 750. Video AFPcrReceived is a single read bit, which is set to 1 after arrival and extraction of the PCR sample in the adaptation field. The assertion of this bit will cause an interrupt be generated if the VideoAFPPcrReceived bit of the event interrupt mask is enabled. Subsequent read access of this field will cause it to be cleared.

Register field VideoAFPcrDiscontinuity is a single bit of R/W field data that is set to 1 when a discontinuity indicator in the adaptation field is asserted. The assertion of this bit will cause an interrupt to be generated if the VideoAFPCRDiscontinuity bit of the event interrupt mask of FIG. 30 is enabled. Subsequent access of this field by software will cause the field to be cleared.

Register field VideoAFDiscontinuityFlag is a single bit R/W field that is set to 1 after a discontinuity indicator flag has been asserted in the adaptation field of the video transport packet. Assertion of the discontinuity indicator flag indicates discontinuity on the continuity counter. The assertion of this bit will cause an interrupt to be generated if the VideoAFDiscontinuityFlag of the event interrupt mask register of FIG. 30 is asserted. The subsequent access of this field by software will cause this field to be cleared.

Register field VideoAFRandomAccess is a single bit R/W field that is set to 1 when the video packet has a random access flag asserted in the adaptation field. This indicates the start of the new elementary stream. The assertion of this bit will cause an interrupt be generated if the VideoAFRandomAccess bit of the event interrupt mask register of FIG. 30 is asserted. The subsequent access of this field by software will cause the field be cleared. Register field VideoAFSplicingFlag is a single bit. R/W field that is set to 1 when the video packet has the splicing point flag asserted in the adaptation field. This flag indicates that a splicing point is approaching. The assertion of this bit will cause an interrupt to be generated if the VideoAFSplicingFlag bit of the event interrupt mask register of FIG. 30 is asserted. The subsequent access of this field by software will cause the field to be cleared.

Register field VideoAFSplicingPoint is a single bit R/W field that is set to 1 when the video packet has the VideoAFSplicingFlag asserted and the AF Splice Countdown register has a value of 0. The setting of this bit is controlled by the register logic 786 of FIG. 28. The assertion of this bit will cause an interrupt to be generated if the VideoAFSplicingPoint bit of the event interrupt mask register of FIG. 30 is asserted. The subsequent access of this field by software will cause the field to be cleared.

Register field VideoAFPrivateData is a single bit R/W field, which when set to 1 indicates the video packet has adaptation field private data. The assertion of this bit will cause an interrupt be generated if the Video AF Private Data bit of the event interrupt mask register of FIG. 30 is asserted. The subsequent access of this field by software will cause the field to be cleared.

Register field AFSpliceCountdown is a byte wide R/W field that contains the current splice countdown value from the current adaptation field.

FIG. 31 illustrates control registers associated with register set 780 that control operations associated with the Adaptation Field Parser 750.

Register field EnabledAFPrivateData is a single bit R/W field that when asserted enables parser of the adaptation field private data.

Register field AFPrivateDataBufferIndex is a four bits field which specifies 1 of up to 15 destination buffers in the system memory where the private data is to be stored.

Register field PCRIndex is a five bits field which specifies one of 32 PID values from which the PCR data is to be extracted.

Register field Enabled Auto Splicing is a single bit R/W field that enables automatic splicing of the video elementary stream.

Figure 32:
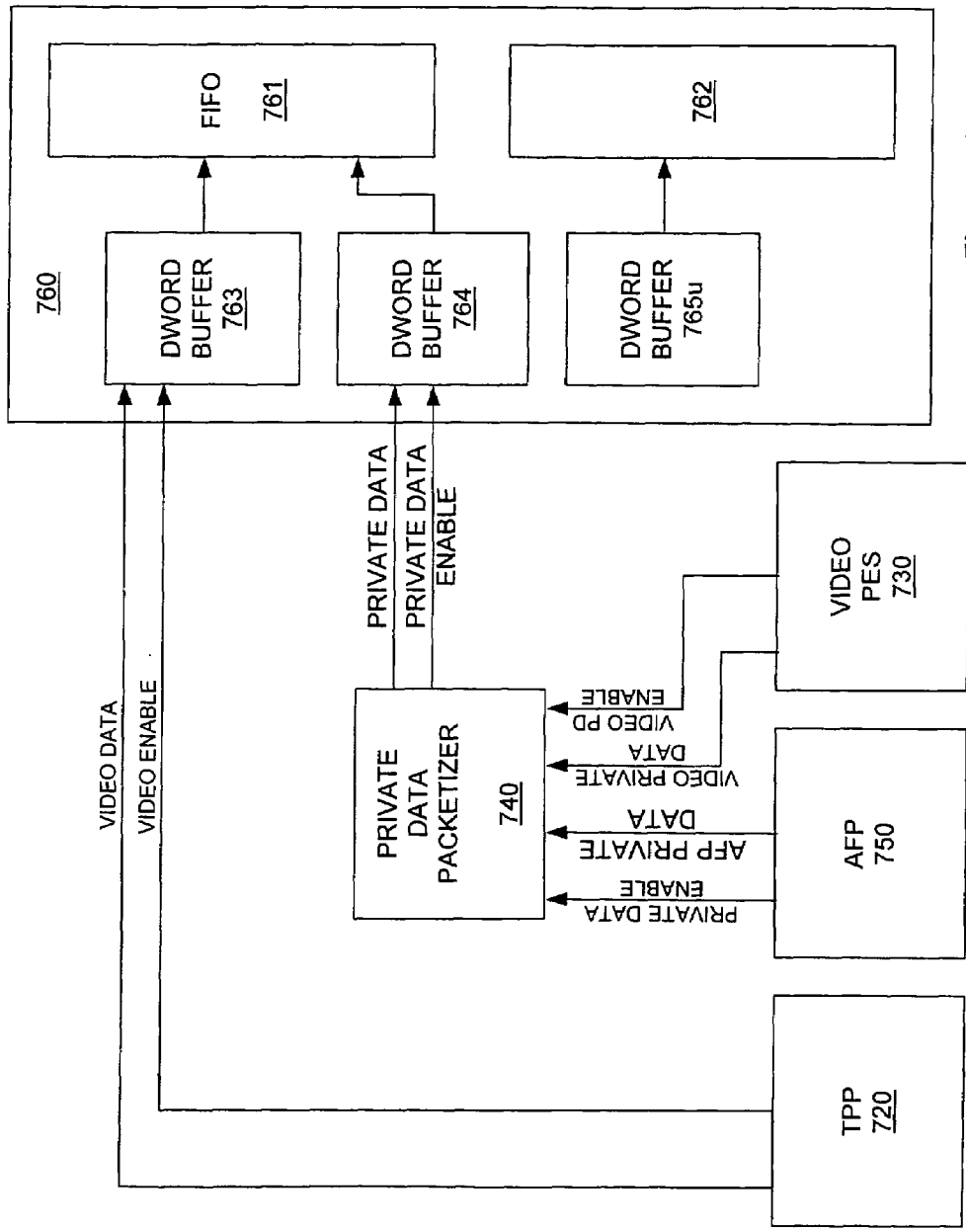
FIG. 32 illustrates, in block diagram form, an alternate embodiment of a transport packet demultiplexor.

FIG. 32 illustrates an alternate embodiment of a portion of the transport demultiplexer illustrated in FIG. 7. Specifically, FIG. 32 illustrates a Private Data Packetizer 740 connected to the Adaptation Field Parser 750 and the Video PESP 730. The Adaptation Field Parser 750 is connected to the Private Data Packetizer 740 through the AFP PRIVATE DATA bus and node PRIVATE DATA ENABLE. The Video PESP 730 is connected to the Private Data Packetizer 740 through the bus labeled VIDEO PRIVATE DATA and node labeled VIDEO PRIVATE DATA ENABLE. The Private Data Packetizer 740 receives private data from the AFP 750, and video PESP 730 and associated control signals. In turn, private data packetizer 740 provides the private data packet on a bus labeled PRIVATE DATA to buffer controller 760, and a control signal on the node labeled PRIVATE DATA ENABLE to the buffer controller 760.

In operation, private data associated with the video PESP 730 has a fixed length of 16 bytes. However, the private data associated with the transport packet, which is parsed by the AFP 750, has a variable length from 1 to 181 bytes. Because the FIFOs 761 and 762 of the buffer controller 760 store double words, it is possible, and in fact likely, that the private data associated with the adaptation field of transport packet will not provide to the FIFOs private data that ends on a double words boundary. The significance of this is best understood with a discussion of the operation of one embodiment of the buffer controller 760.

During normal operation of the buffer controller 760, bytes of data associated with transport packets from the Transport Packet Parser 720 and video data from the Video PESP 730 are provided to the buffer controller 760. Each parser has a corresponding double word buffer in the buffer controller 760, which receives and stores the individual bytes of data until an entire double word has been received. For example, the first byte of data provided by the Transport Packet Parser 720, is stored in the first byte location of a double word buffer 763, while the second, third, and fourth data bytes will be stored in second, third, and fourth byte locations of the double word buffer 763 respectively. When the double word buffer 763 has received the fourth byte, the double word is written from the double word buffer 763 to the FIFOs 761, thereby freeing up the double word buffer 763 for subsequent bytes.

When a specific data packet of a packetized elementary stream does not end on a double word boundary, the double word buffer 763 will be partially filled and therefore not send the end of the reception of the specific data packet. However, this is not a problem if specific data packet is repeatable over many packetized elementary streams, because the subsequent data packet associated with the same packetized elementary stream can be expected to be received within a relatively short amount of time to complete filling the double word buffer. Once the double word buffer is filled using data bytes from the subsequent data packet, the field double word buffer 763 will be sent to the FIFOs 761.

While it is not problematic for a specific packet of a packetized elementary stream to not completely fill the double word buffers associated with the buffer controller 760, the same is not true of private data associated with specific transport stream or packetized elementary stream. This is because the private data associated with packetized elementary stream has a fixed length and is not streaming data of the type associated with the transport packet parser 720 or the video of the video PESP 730. Because the private data from be transport packet has a variable length, there is no guarantee that the private data will end on a double word boundary. If the private data does not end on a double word boundary, the partial double word portion of private data at the end will not be sent to the FIFO until additional private data from unrelated source is received. Therefore, the system software that interprets private data, would have incomplete data. The private data packetizer 740, illustrated in FIG. 32, addresses this problem.

Figure 33:
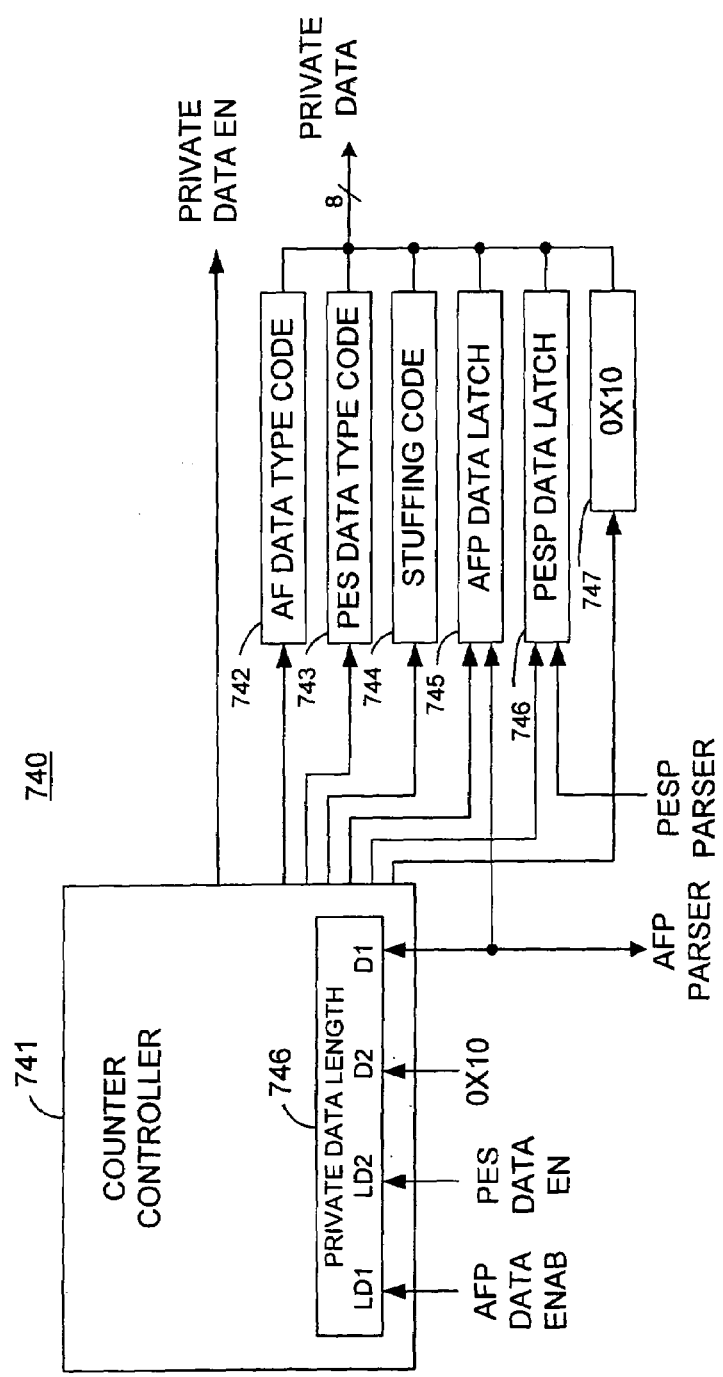
FIG. 33 illustrates, in block diagram form, a detailed view of a private packet packetizer of FIG. 32.

In operation, the private data packetizer 740, can receive private data from each of the Adaptation Field Parser 750, and the Video PESP Parser 730, and forms a private data packet to be sent to the buffer controller 760, which is guaranteed to have a length that ends on a double word boundary. Note that both the packetized elementary stream data from the Transport Packet Parser 720, and the private data generated by the private data packetizer 740 are sent to the system FIFOs 761. An index indicator, which specifies which circular buffer in system memory the private data is to be stored, is provided to the FIFOs 761. The index indicator is specified in the register field labeled AFPrivateDataBufferIndex, which was discussed with reference FIG. 31 herein. Therefore, all private data, whether from the Adaptation Field Parser 750 or from the Video PESP 730, is been provided to the same buffer in system memory. FIG. 33 illustrates the private data packetizer 740 in greater detail.

The private data packetizer 740 of FIG. 33 includes counter controller 741, the AF Data Type Code storage location 742, PES Data Type Code storage location 743, Stuffing Code storage location 744, AFP Data Latch 745 PESP Data Latch 746, and fixed length Indicator Code 747.

The AF Data Type Code storage location 742 stores the specific eight-bit type indicator associated with the adaptation field private data. The PES Data Type Code storage location 743 stores the specific the eight-bit type indicator associated with the PESP private data. The Stuffing Code storage location 744 stores the specific eight-bit stuffing code which is used to pad private data packet to insure the private data packet always ends on a double word boundary. The AFP Data Latch 745 is used to store the actual private data from the adaptation field parser to be provided to the buffer controller 760. Similarly, the PESP Data Latch is used to store the actual private data from the PESP parser is to be provided to the buffer controller 760. The fixed length indicator code 747 stores the fixed length value associated with the PESP parser private data. In the specific example, the PESP parser private data will always be 16 bytes of data, or 0x10 hexadecimal.

In operation, the counter controller 741 can be enabled either by be AFP Data Enable signal, or by the PESP Data Enable signal. When the counter controller 741 is enabled by the PESP Data Enable signal, the number of bytes of private data is fixed at 16 bytes, therefore, the value of 16 will be used by be AFP counter controller 741 to generate the appropriate signal for the PRIVATE DATA bus. Unlike PESP private data, AFP private data has a variable length. The actual number of bytes of AFP private data, not including the length byte, is transmitted in the first byte of the AFP private data field of the data packet. Therefore, the counter controller receives the number of bytes of transport packet private data by latching the first byte of the private data field of the data packet. The first byte of the private data field is received on the AFP DATA bus on or after the PES Data Enable signal has been received. Based upon the source of the private data and the length of private data, the private data packetizer 740 will construct the private data packet.

Figure 34:
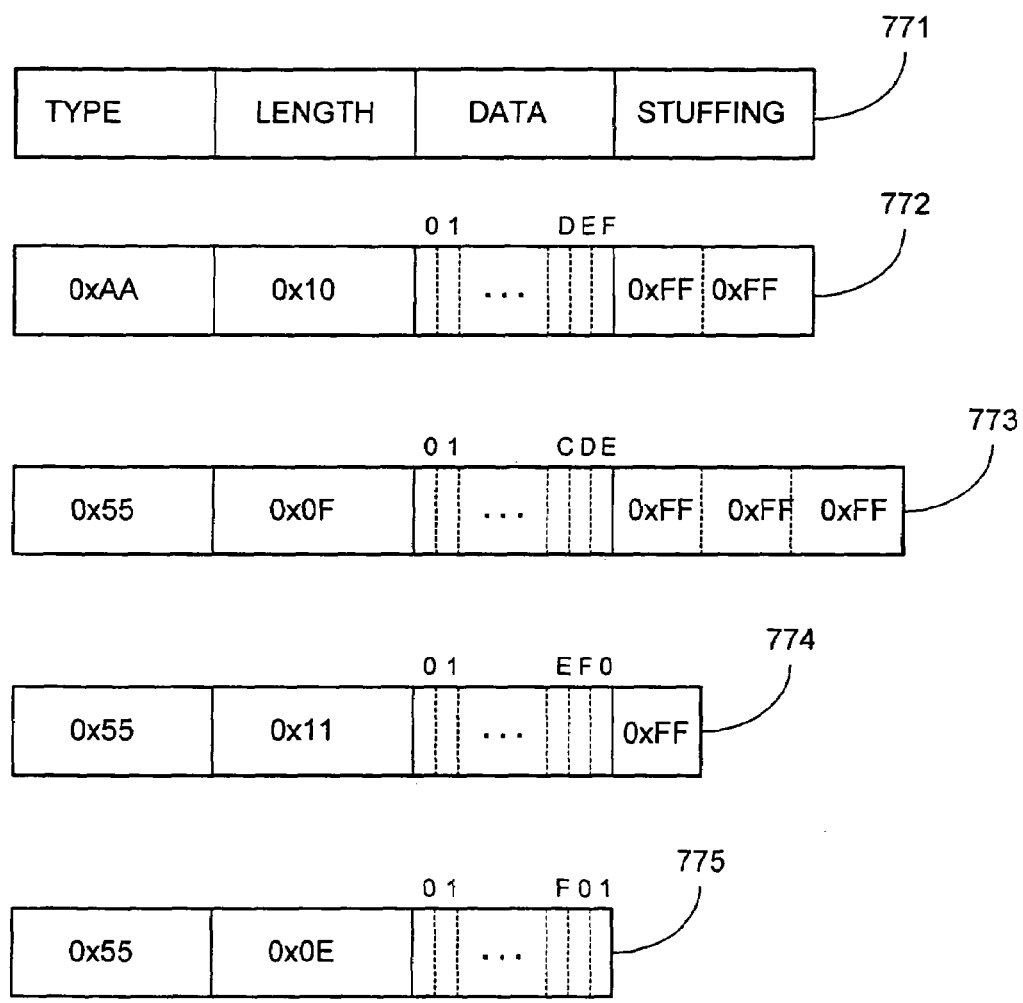
FIG. 34 illustrates, in block form, representations of private packets from the packetizer of FIG. 33.

FIG. 34 illustrates a specific embodiment of a private data packet generated by the private data packetizer 740. Data block 771 illustrates the format of the private data packet having specific fields: type, length, data, and stuffing.

The type field of the private data packet indicates the source of the private data, either transport packet private data, or video PES data. In a specific embodiment, the hexadecimal value of 0x55 is used to indicate private data associated with the transport packet received from the AFP 750, and a hexadecimal value of 0xAA is used to indicate private data from the video PES received from the video PESP. Note that in other embodiments of the present invention, additional data types can be received from other sources.

The length field of the private data packet specifies the length of private data that is to follow the private data packet. Note that in the specific embodiment illustrated, be value of the length field does not include a count for the length field byte.

The stuffing field of the private data packet is used to assure the private data packet ends on a double word boundary. As indicated, the stuffing field can include zero to three bytes of data.

Data block 772 of FIG. 34 illustrates a private data packet associated with the video PES stream. Specifically, private data packet 772 has a type value of hexadecimal value 0xAA indicating the private data packet is associated with a video PES. The length field of packet 772 has a hexadecimal value of 0x10, which indicates that 16 bytes are contained within the subsequent data field. Accordingly, the subsequent data field of the private data packet includes 16 bytes, 0 through F. Because the length of the fields type, length, and data is no one, the number of stuffing bytes needed to insure the private data packet ends on a double word boundary is readily determined. Therefore, two stuffing bytes of 0xFF are represented in the stuffing field of private data packet 772.

By adding to stuffing bytes in the stuffing field of the private data packet, the length of the private data packet ends on a double word boundary. Therefore, when the data bytes of the private data packet 772 of FIG. 34 are provided to the buffer controller 760, and more specifically to the double word buffer 764 of the buffer controller 760, it is assured that the entire private data packet will be provided to the FIFOs 761 without delay. Once the data is provided to the FIFO 761, the double word of data will be provided to the appropriate buffer in system memory. System software will, therefore, be able to access the private data stored in system memory without delay, and determine the type of data based upon type field, and length of the data based upon length field. Private data packet 773 of FIG. 34 illustrates another specific private data packet. Specifically, packet 773 has a type value of hexadecimal value 0x55, which represents an adaptation field data packet. The length field of the packet 773 has a hexadecimal value of 0x0F, which indicates 15 bytes of data are associated with the adaptation field private data. As a result, 15 bytes of data 0 through E are represented in the data field, and a total of three stuffing bytes are needed in order to assure that private data packet ends on a double word boundary.

Data blocks 774 and 775 indicate other specific private data packets associated with the transport packet provided by the adaptation field parser 750. Specifically, the length of the private data has been varied in packet 774 and 775 to illustrate packets having a single stuffing byte, and no stuffing bytes respectively.

Referring to FIG. 33, the counter controller 741 provides the appropriate data type code to the buffer controller 760 by selecting storage location 742 or 743 respectively depending upon whether adaptation field private data or video PES private data is being received. As a result, the appropriate data type will be provided onto the bus labeled PRIVATE DATA. Note the bus labeled PRIVATE DATA is illustrated to be a wired-OR bus, however any type of multiplexing would be the appropriate.

The length field of the private data packet is provided to the PRIVATE DATA box differently depending upon whether adaptation field private data or video PES private data is being provided. The length of video PES private data, which is always 16 bytes, is provided to the PRIVATE DATA bus by selecting the storage location 747, which contains the hexadecimal value 0x10. Enabling the storage location 747 allows the hexadecimal value 0x10 be provided to PRIVATE DATA bus. The length of adaptation field private data is provided to the PRIVATE DATA bus by latching the first byte of the adaptation field private data into be AFP data latch 745. Because the first byte of the adaptation field private data specifies the number of private data bytes that follow, the appropriate length value for the length field is provided to the PRIVATE DATA bus.

Once the type and length field data have been provided to the PRIVATE DATA bus, the actual data is provided to the PRIVATE DATA bus. This is accomplished in a similar manner for both the adaptation field private data and a video PES private data. Specifically, the counter controller 741 latches the data into one of the appropriate data latches AFP data latch 745, or PESP data latch 746. In response, be associated private data is provided to the PRIVATE DATA bus. Note the private data could be provided to the PRIVATE DATA bus directly to transmission gates, or any other appropriate logical interface.

The generation of stuffing codes, from the stuffing code register 744, is controlled by the control counter 741. Because the control counter 741 knows the length of the private data provided, it can readily determined the number of bytes needed, if any, to assure the private data packet ends on a double word boundary is readily calculated. Therefore, after the last byte of the private data, from either the AFP or PESP, the appropriate number of stuffing codes are been provided to the PRIVATE DATA bus by selecting the storage location the 744 determined number of times this assures the buffer controller 760 will receive a number of bytes that and on a double word boundary. As a result, the private data can be provided to the system buffer controller 760 without delay.

FIGS. 35 through 38 illustrate a method of performing automatic splicing using the data parsed herein provided to their respective registers. The term splicing refers to the process of switching between two video streams. For example, splicing can be used to switch between the video of the main program and a video of a commercial, between video to a commercial, and from a commercial video back to the main program video. The method of FIGS. 35 through 38 is contingent upon being enabled by the compound to field of the control register. Splice points can be sorted as Out Points or In Points.

Figure 35:
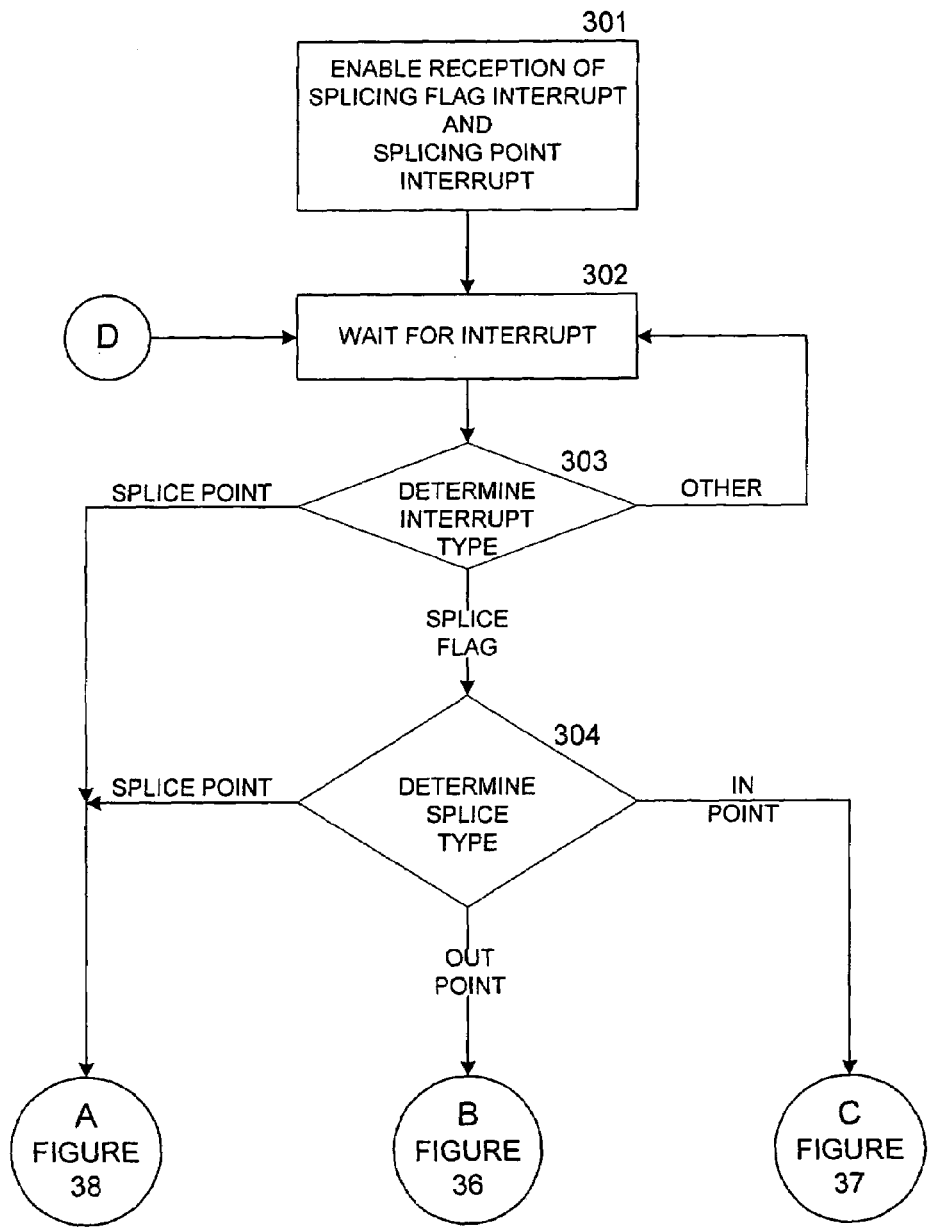
FIGS. 35-38 illustrate, in flow diagram form, a method of splicing video in accordance with the present invention.

An Out Point is a location in the stream where the underlying elementary stream is well constrained for a clean exit (usually after I or P frame). An Out Point Packet is the packet of the PID stream preceding an Out Point. MPEG-2 syntax defines Out Points at transport layer as:
splicing_point_flag=1, splice_countdown=0, seamless_splice_flag=1;

An In Point is a location where the stream is well constrained for a clean entry (usually just before a sequence_header and I frame at the closed GOP. MPEG-2 syntax defines In Points at transport and PES layers as:
splicing_point_flag=1, splice_countdown=−1, seamless_splice_flag=1;
payload_unit_start_indicator=1 random_access_indicator=1, data_alignment_indicator=1;

At step 301, of FIG. 35, the interrupt mask register is written to, in order to enable reception of interrupts based upon the video splicing flag and the video splicing point. The video splicing flag and the video splicing point values are determined by parsing performed by the Adaptation Field Parser 750. The video splicing flag indicator is one of the optional flags of storage location 781 of FIG. 28, and is represented by register field VideoAFPSplicingFlag in the global status register of FIG. 29. The video splicing point is determined by register logic 786 of FIG. 28, and results in the register field labeled VideoAFSplicingPoint being set when the video splicing flag is set and the splicing countdown register, labeled AFSpliceCountdown, is equal to 0.

At step 302, the method of FIG. 35 waits for an interrupt to occur.

At step 303, an interrupt has been received, and a determination is made as to the interrupt type. If the interrupt type is a splice point, the flow proceeds to connector A, which is continued at FIG. 38. If the interrupt type is a splice flag, the flow proceeds to step 304. If the interrupt type is a different type of interrupt, the flow returns back to step 302.

At step 304, a determination is made as to the type of splice represented by the splice flag interrupt. This can be determined by analyzing the splice countdown value received by the adaptation field parser 750 of FIG. 28. Specifically, if the splice countdown value is a positive value it is an indication that the splice flag has identified an out-splice point. An out-splice point indicates that the current video elementary stream being received is about to end, and the flow proceeds to connector B, which continues at FIG. 36.

If at step 304 the splice countdown value is equal to zero, it is an indication the splice flag has identified a splice point. The splice point is as identified as that point in time were video is to be switched from a current video stream to a next video stream. A splice point flag is set and the adaptation field parser 750 of FIG. 28, when the splice flag is asserted, and the splice countdown register is equal to 0. (Note that under normal operation, the splice point path from step 304 will not be taken because the splice point should have been detected at step 303, thereby bypassing step 304).

If at step 304, it is determined that the splice countdown value is negative, it is an indication that an in-splice point has been identified. And in-splice point indicates that the current video elementary stream being played is just began, and the flow proceeds to connector C that continues in FIG. 37.

One skilled in the art will recognize that specific register values identifying splice-in points and splice-out points could be provided in the same manner the separate register location was provided for the splicing point. Likewise, many other variations of the specific flow herein can be made without departing from the inventive intent.

Figure 36:
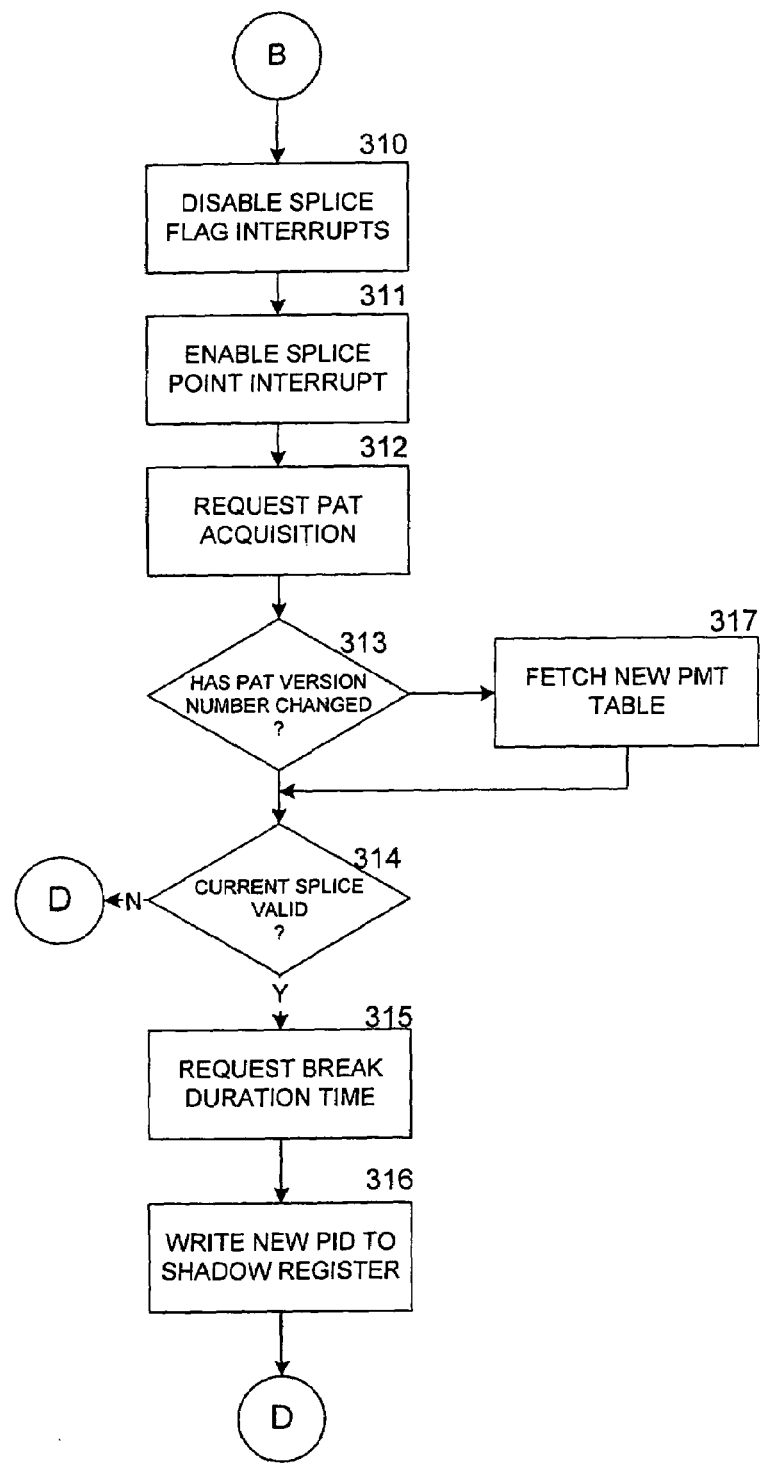

When out point has been detected at step 304, the flow proceeds to FIG. 36. At step 310, of FIG. 36, the splice flag interrupt is disabled. The splice flag interrupt is disabled because specific method illustrated in FIGS. 35 through 38 only needs to execute and out point routine one time. Since the splice countdown value for an out point includes the values from 7 to 1 the out point routine disables the splice flag interrupt at step 310 in order to avoid having to unnecessarily process interrupts caused by the subsequent out point values.

At step 311, splice point interrupts are enabled. Note that splice point interrupts should already be enabled from step 301 of FIG. 35. Therefore, the step 311, under ideal operating conditions, will be redundant and not strictly necessary.

At step 312, acquisition of the PAT table is requested. The PAT table is discussed with reference to prior art FIG. 2.

At step 313, a determination is made whether or not the PAT table version number has changed. If the PAT table version number was not changed, the flow proceeds to step 314. However, if the PAT table version number was changed, the flow proceeds to step 317.

Figure 2:
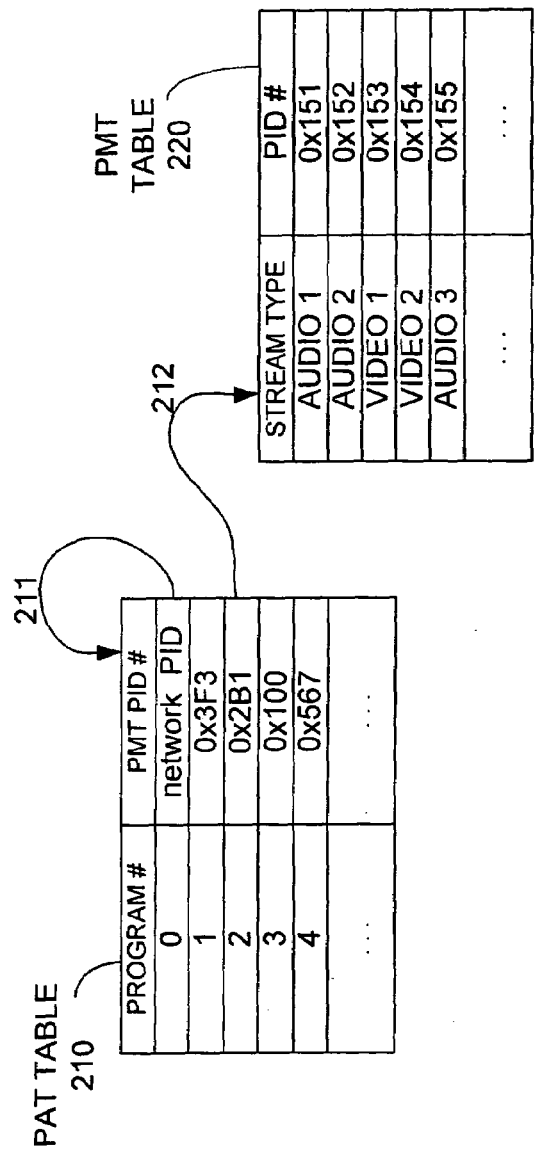
FIG. 2 illustrates, in tabular form, a prior art Program Specific Information tables.

At step 317, if the PAT table version number has changed, a new PMT table, see FIG. 2, is fetched and the flow proceeds to step 314.

At step 314, a determination is made whether or not the current splice is valid. A valid splice point is recognized by asserted (set to 1) splicing_point_flag and seamless_splice_flag. Flags are stored in the global status register. If it is determined that the current splice point is not valid, the flow proceeds to step 302 of FIG. 35. However, if it is determined that the current splice point is valid, the flow proceeds to step 315.

At step 315, a request is made to receive the break duration time as an optional bit-field available in the splice_info_section that indicates an approximate time when the break will be over and when the network In Point will occur. At step 316, the new PID number, received from the new PMT table, is written to a register that shadows the VideoPid register of FIG. 18. Referring to FIG. 16, the VIDEO PID storage location 424 provides the PID value which identifies the current video stream, while the shadow register associated with location 424 (not illustrated) stores the PID value of the next video stream to be accessed at the splice point. Subsequent to step 316, flow proceeds back to step 302.

Figure 38:
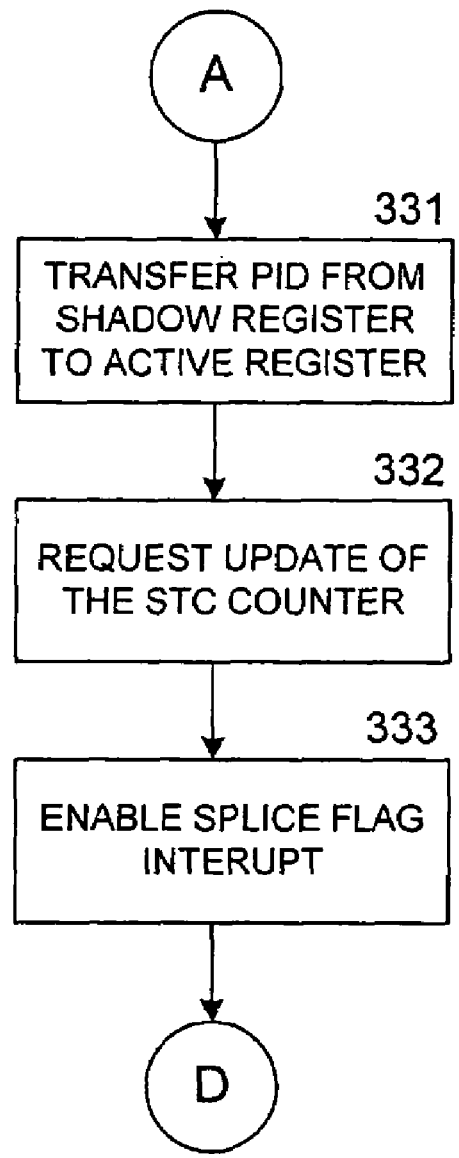

When it is has been determined at either step 303 or step 304 that the splice point has occurred, the flow proceeds to FIG. 38. At step 331 of FIG. 38, the PID value stored in the shadow register is transferred into the active PID register. As a result, the value stored in the VIDEO PID location 424 of FIG. 16 is updated to the new PID value, resulting in the new video PID packets been identified, and selected, as the current video stream. In effect, the newly selected video image will be displayed.

At step 332, a request is made to update the STC counter. The STC counter is updated in order to synchronize the system counter with the new program counter, i.e. a new time base.

At step 333, the splice flag interrupt is enabled. The Splice Flag Interrupt Enable Bit is asserted in order to allow for the recognition of the splice in point. From step 333, the flow proceeds to step 302 of FIG. 35. Note that in another embodiment of the present invention, a determination step could be made at the beginning of the flow of FIG. 38 as to whether the new PID is associated with a desirable program. If not, an alternate flow ignoring the PID, or using a dummy or alternate PID, could be used. For example, this feature could be used eliminate viewing commercials or other program types.

Figure 37:
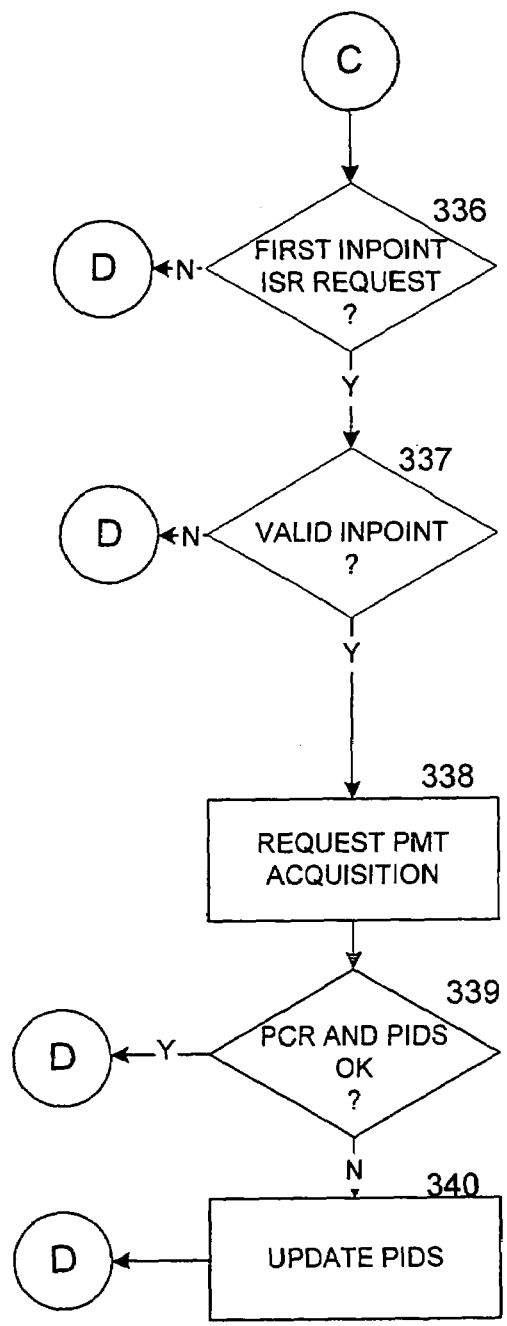

If at step 304, FIG. 35, it is determined that an in-splice point is occurring, the flow proceeds to FIG. 37. At step 336, of FIG. 37, a determination is made whether or not this is the first in-splice point interrupt service request. The first in-splice point interrupt service request, is generally associated with the value minus 1 of the splice countdown register. However, in order to accommodate for possible lost packets, the determination of step 320 may be used along with an indicator as to whether or not to the previous in-splice point interrupt service request has occurred. If this is not the first in-splice point, the flow proceeds to step 302 of FIG. 35. If this is the first in-splice point, the flow proceeds step 337.

At step 337, a determination is made whether or not the in-splice point indicator is valid. The in-splice point indicator is validated by determining whether or not random access flag register is set along with discontinuity flag register. The random access flag register, and discontinuity flag register, should both be set because the first packet of a new data stream will indicate the current packet is capable of being randomly accessed by the system, and since no previous packets are associated with the PES stream the discontinuity flag should be set.

At step 338, a request for PMT table acquisition is made. This is done to verify that current PID assignment for a present program is as before the brake (or before added commercial). At step 339, a determination is made whether the PCR and video PID values are valid. PIDs are verified by analyzing a content of received PMT table for known MPEG-2 program_number. Change formidable if the PCR and PIDs are okay, flow proceeds to step 302 of FIG. 35. Otherwise, flow proceeds to step 340.

At step 340, the new PID values are updated.

The method described 32 through 35 provides advantages over the prior art by allowing for the automated handling of in-splice point. Utilizing register values updated by the hardware parsers described herein, automatic splicing is enabled. The amount of saved system software bandwidth provides an advantage over the prior art.

Therefore, one skilled in the art will recognize that providing for hardware parsing of adaptation fields, and the generation of the private data packet regardless of the source of private data, provides advantages over the prior art. In addition, the splicing method described herein, provides for automatic hardware splicing control, which provides advantages over prior art methods of software control splicing. In another embodiment of the disclosure, a transport stream demultiplexer core register set is initialized to indicate a possible set of transport stream characteristics. An acquisition routine is executed. If acquisition of the transport stream signal does not occur during a predetermined amount of time, the acquisition is not successful. When not successful, the register set is initialized to indicate a different possible set of transport stream characteristics, and the acquisition routine is once executed. This process continues, until the transport stream core acquires the transport stream signal.

FIGS. 39-42 illustrate a specific implementation of a method for blind synchronization to a transport stream. Blind synchronization allows the framer to acquire the transport stream, i.e. lock onto the transport stream, without any prior knowledge of the transport stream characteristics.

As discussed with reference to FIGS. 8 and 9, the transport stream can include a variety of signals. At a minimum, the transport stream will include a data signal (TDATA) and a clock signal (TCLOCK). Additional signals that may exist include TSTART, TVALID, and TERROR. Based upon these signals, the transport stream has a number of characteristics, such as individual signal polarities, and data ordering.

One transport stream characteristic is the polarity of the control signals, which can vary based upon the service provider implementation. In other words, each of the control signals TVALID, TSTART, and TERROR can be either active high or active low signal. As illustrated in FIG. 14, each of the control registers has respective register field (T_ValidPolarity, T_StartPolarity, and T_ErrorPolarity) to specify the active edge of each control signal.

An additional characteristic is the data ordering, or the bit polarity. Because the data is received bit at a time, or by bytes, whether the LSB is first or the MSB is first can vary. A field labeled FramerBitPolarity is used to select between a LSB and MSB bit polarity of TDATA.

Another transport stream characteristic is whether the TCLOCK signal latches data on a rising edge or on a falling edge. A field labeled FramerClockPolarity is used to select between these two characteristics.

Figure 39:
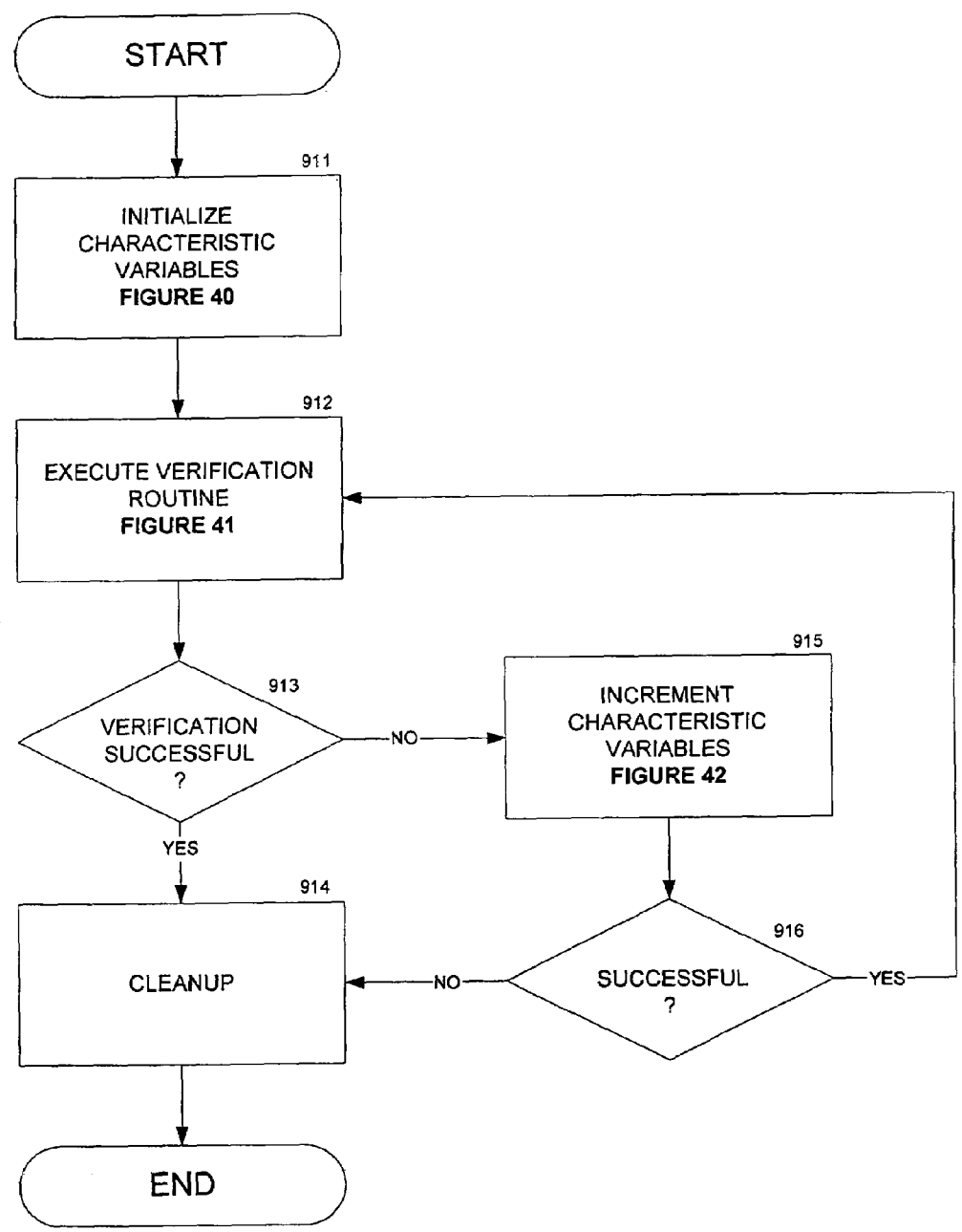
FIGS. 39-42 illustrate, in flow diagram form, a method of performing blind acquisition of an MPEG-2 data stream.

At step 911 of FIG. 39, these variables are initialized to represent a specific set of transport stream characteristics. As further illustrated in step 921 of FIG. 40, the registers T_ErrorPolarity, T_StartPolarity, and T_ValidPolarity are set equal to zero. For purposes of discussion, a value of zero will represent an active low polarity, while a value of one will represent an active high polarity.

A variable BIT_ORDER, which corresponds to field FramerBitPolarity, is set to LSB to indicate the LSB of TDATA is to be received first, or right justified bytes of data are received. The variable BIT_ORDER can also be set equal to LSB to indicate the MSB of TDATA is to be received first, or will be right justified where bytes of data are received.

A variable labeled CLOCK_POLARITY, which corresponds to the field labeled FramerClockPolarity in FIG. 14, is set to zero, where zero indicates that TDATA is latched on a falling edge.

Figure 40:
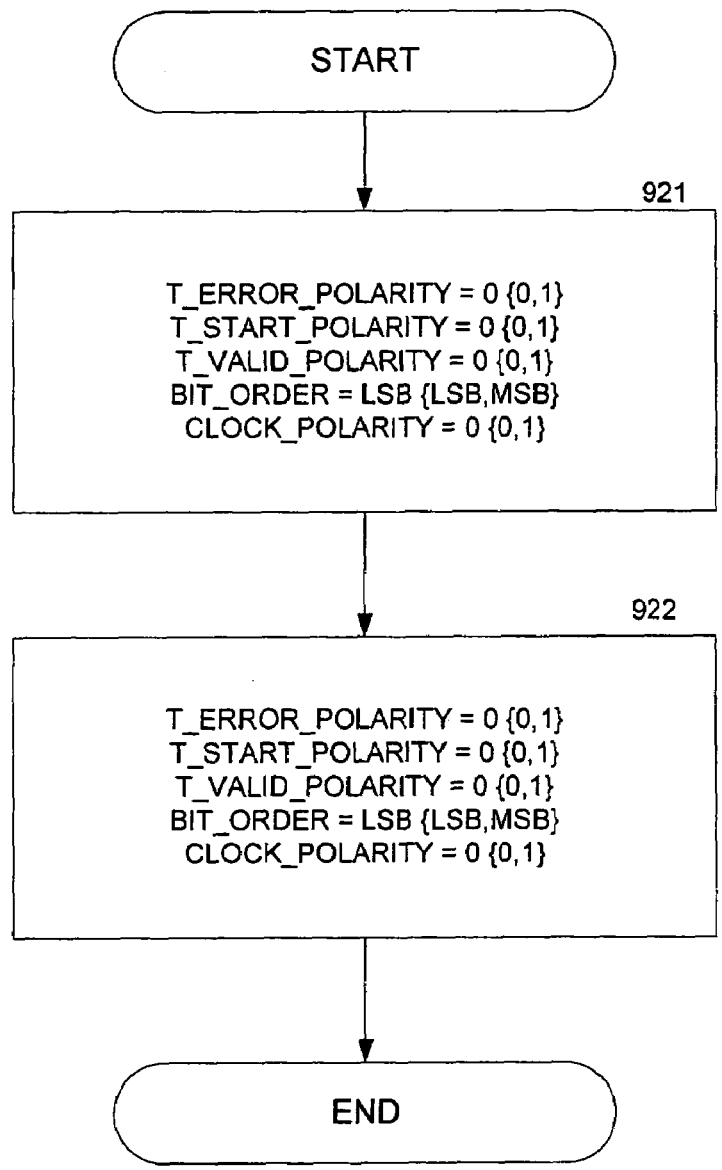

At step 922 of FIG. 40, other initialization overhead functions are performed. For example, FIG. 14 illustrates a field labeled FramerMode that specifies the signals associated with the transport stream. Step 912 can include initialization of this field as well.

At step 912 of FIG. 39, a verification routine is executed. The verification routine is illustrated in greater detail with respect to FIG. 41. At step 931 of FIG. 41, reception of the transport stream is enabled. In effect, it implements settings of the current transport stream characteristic. Upon enabling reception of the transport stream, the framer portion of transport stream demultiplexer core begins operation as described previously in an attempt to achieve synchronization.

At step 932 a predetermined amount of delay time occurs to allow the framer to detect a synchronization byte. When the data stream being received is an MPEG-2 data stream the synchronization byte is a hexadecimal 47 (47 h). The predetermined delay is used to detect one 188 byte long MPEG-2 packet, and depends on a stream bit-rate and is typically under 100 microseconds.

At step 933, a determination is made whether the synchronization byte was detected. If not, the flow proceeds to step 935, if so, the flow proceeds to step 934.

At step 934, a determination is made whether or not additional synchronization bytes need to be detected before synchronization is declared. In FIG. 14, the variable labeled FramerSyncLockLenghth indicates how many consecutive transport packet synchronization frames need to be detected before synchronization is declared. Based upon this value, the flow will return to step 932 until the specified number of synchronization values has been detected. When the specified number of synchronization frames has been detected, the flow returns to FIG. 39 and indicates a successful verification.

At step 935, it has been determined that the transport stream reception has not been successful. As a result, no further attempt is made to acquire the transport stream with the present settings of the transport stream physical characteristic. Therefore, step 935 performs any overhead functions needed, for example, reception of the transport stream can be disabled. Note in other embodiments, reception of the transport stream with improper characteristic settings continues.

Figure 41:
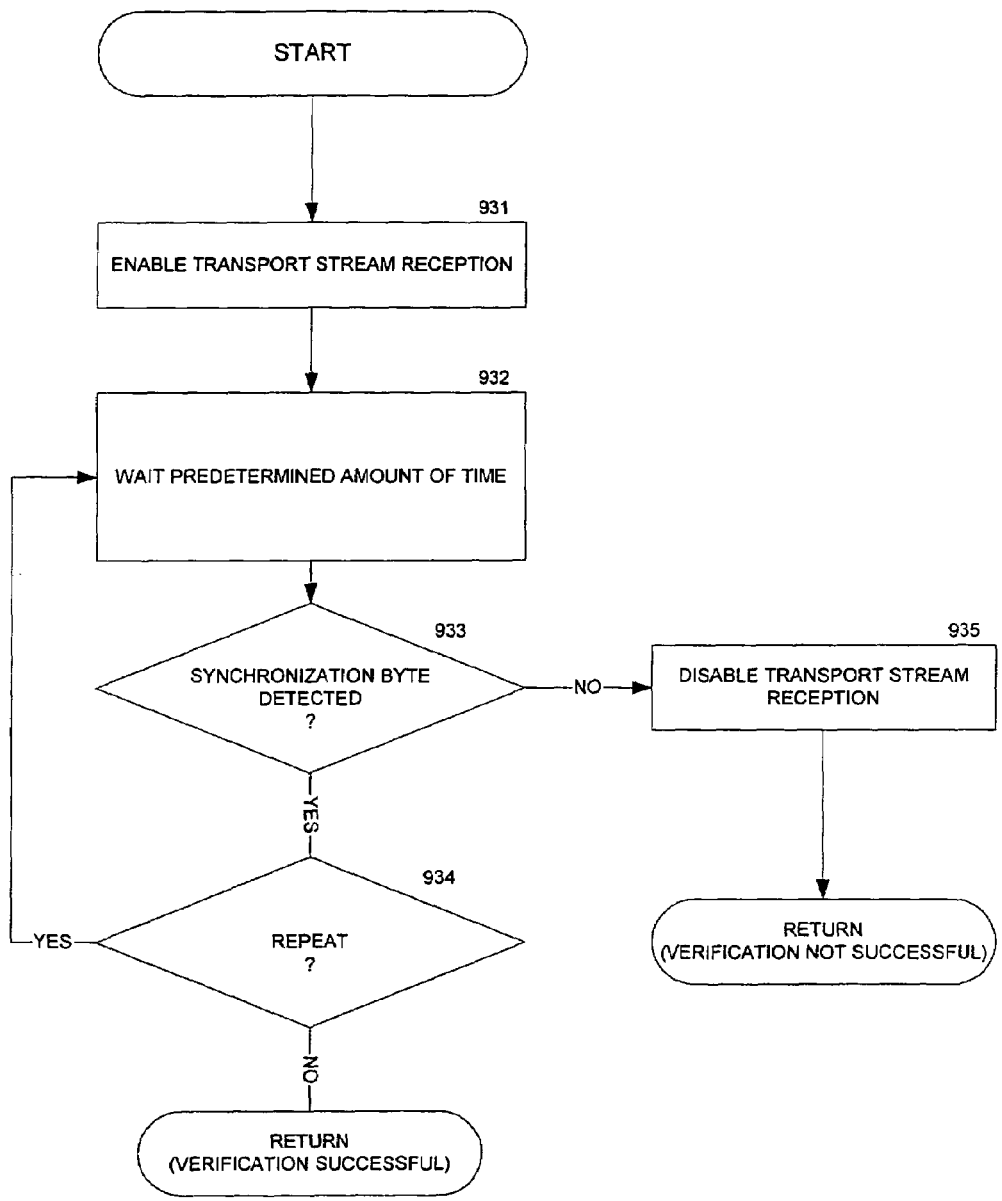

From step 935, the verification flow of FIG. 41 returns to FIG. 39 and indicates that the verification was not successful.

At step 913 of FIG. 39, a determination is made whether the verification routine was successful. If so, the flow proceeds to step 914, if not, the flow proceeds to step 915.

At step 914, the proper set of transport stream characteristics has been found and any necessary cleanup occurs. Examples of necessary cleanup items would include notifying the use of successful synchronization, storing of the synchronization characteristics.

Figure 42:
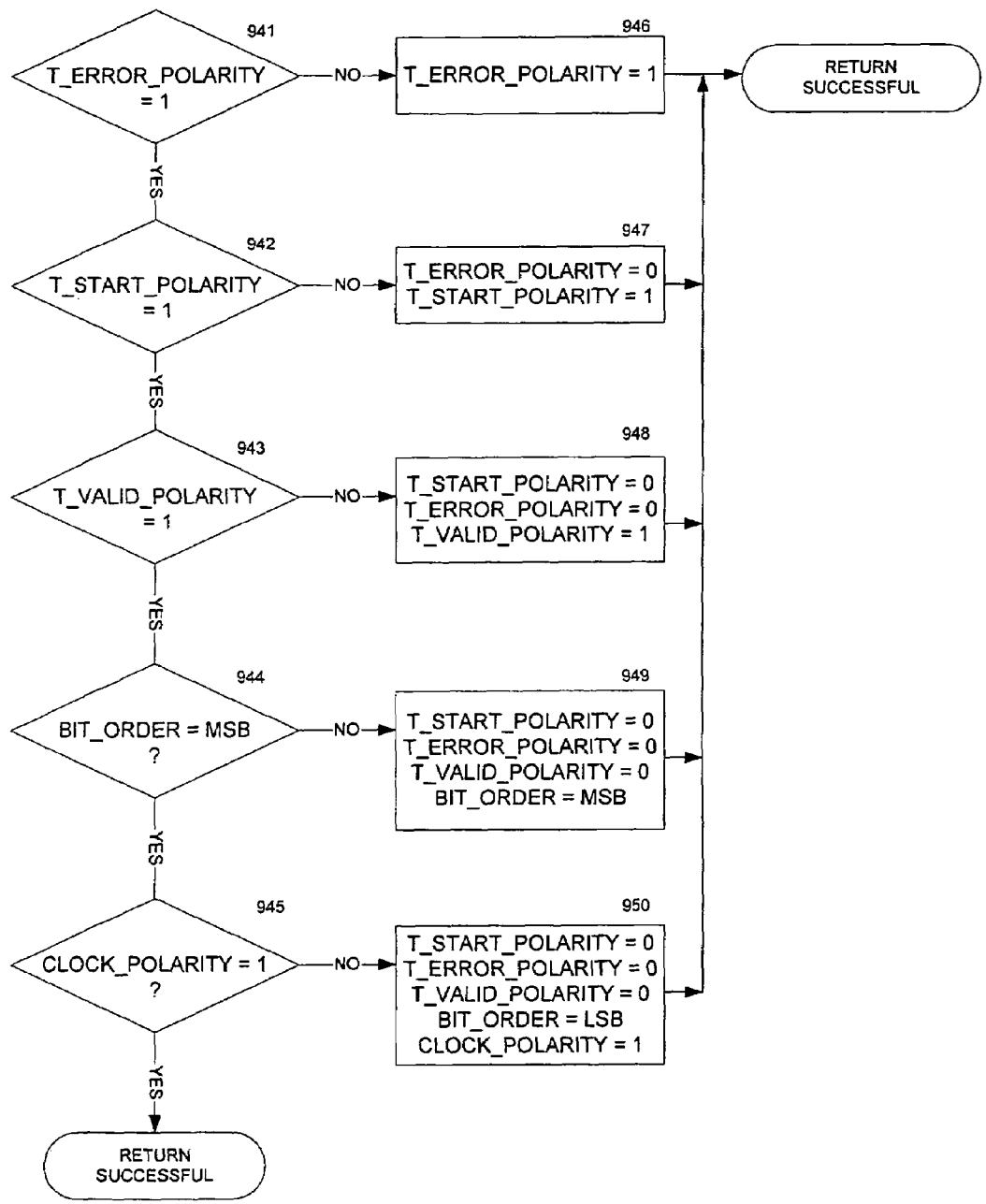

At step 915 the transport stream characteristics are incremented. FIG. 42 illustrates one method of incrementing the characteristics specified with respect to step 911.

FIG. 42 illustrates a flow diagram that increments the transport stream characteristic in such a manner that all possible combinations are covered. By executing this routine, a successful increment will be indicated for all values, except for when BIT_ORDER variable is equal to MSB, and all other characteristics are equal to one. This state indicates that all possibilities have been tested, and an unsuccessful return occurs.

At step 916 of FIG. 39, a determination is made whether the increment of the transport stream characteristic variables was successful. If so, the flow returns to step 912 where the verification routine is executed again. If the increment of the transport stream characteristic was not successful, indicating that no lock was obtained, the flow proceeds to step 914 for appropriate cleanup.

The present method provides a fast method for acquiring a transport stream having unknown characteristics. Variations of the method described herein would include varying the number of consecutive synchronization byte required for acquisition to be successful, varying the order in which the variables are varied. Varying the framer mode to indicate the possible combinations of transport stream signals, i.e. clock and data only.

It should be understood that the specific steps indicated in the methods herein may be implemented in hardware and/or software associated with the specific parsers or controller described. For example, a specific step may be performed using software and/or firmware executed on one or more a processing modules. In general, a system for handling transport stream data may include a more generic processing module and memory performing the functionality described herein. Such a processing module can be a single processing device or a plurality of processing devices. Such a processing device may be a microprocessor, microcontroller, digital processor, micro computer, a portion of the central processing unit, a state machine, logic circuitry, and/or any device that manipulates the transport stream. The manipulation of the transport stream is generally based upon operational instructions. The memory may be a single memory device or a plurality of memory devices. Such a memory device may be a read only memory a random access memory a floppy disk memory, magnetic tape memory, erasable memory, a portion of a system memory, and/or any device that stores operational instructions in a digital format. Note that when the processing module implements one or more of its functions to be a state machine or logic circuitry, the memory storing in the corresponding operational instructions is embedded within the circuitry comprising the state machine and/or other logic circuitry.

Figure 43:
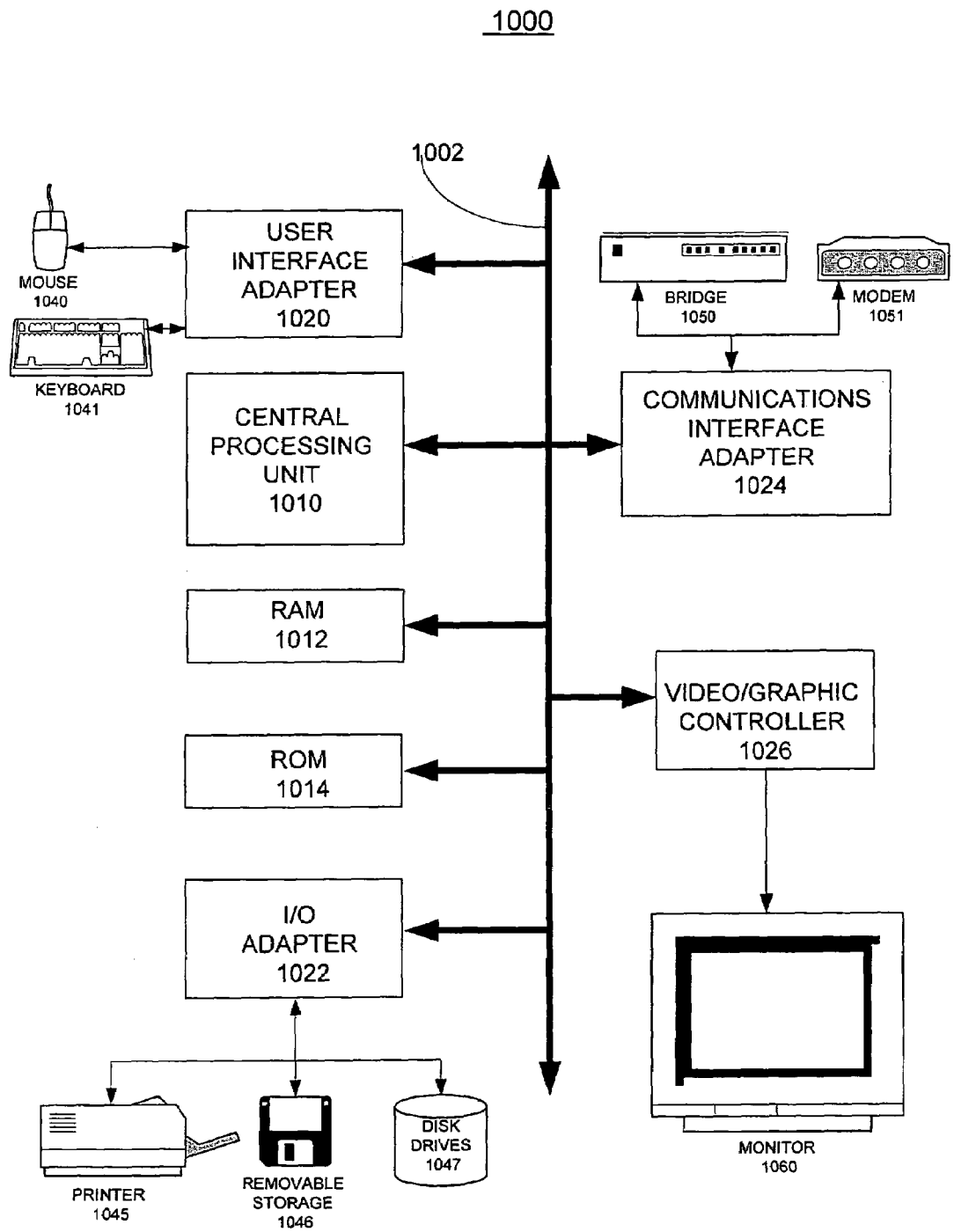
FIG. 43 illustrates, in block form, a general purpose computer system in accordance with the present inventions.

FIG. 43 illustrates, in block diagram form, a processing device in the form of a personal computer system 1000. The computer system 1000 is illustrated to include a central processing unit 1010, which may be a conventional proprietary data processor, memory including random access memory 1012, read only memory 1014, input output adapter 1022, a user interface adapter 1020, a communications interface adapter 1024, and a multimedia controller 1026. Note the central processing unit 1010, the communications interface adapter 1024, and video/graphics controller can individually be considered processing devices.

The input output (I/O) adapter 1022 is further connected to, and controls, disk drives 1047, printer 1045, removable storage devices 1046, as well as other standard and proprietary I/O devices.

The user interface adapter 1020 can be considered to be a specialized I/O adapter. The adapter 1020 is illustrated as connected to a mouse 1040, and a keyboard 1041. In addition, the user interface adapter 1020 may be connected to other devices capable of providing various types of user control, such as touch screen devices.

The communications interface adapter 1024 is connected to a bridge 1050 such as is associated with a local or a wide area network, and a modem 1051. By connecting the system bus 1002 to various communication devices, external access to information can be obtained.

The multimedia controller 1026 will generally include a video graphics controller capable of displaying images upon the monitor 1060, as well as providing audio to external components (not illustrated).

In accordance with the present invention, the transport core can be implemented at various portions of the system 1000. For example, the transport core can be part of the Communication Interface Adapter 1024, as part of the Multi-Media Controller 1026, or as a separate component of the system connected directly to the bus 1002. In a specific embodiment, the video memory of FIG. 5 resides within the Multi-Media Controller 1026, while the system buffers 501 to 503 would generally reside in RAM 1012. In other implementations, a unified memory can be used.

Therefore, it should now be apparent, that the present invention discloses an improved method and apparatus for designing a framer and parser in such a manner as to permit modular design techniques, and avoid the used of buffering data in parsing modules. As a result, system efficiencies are gained.

We claim:

1. A method of receiving data, the method comprising:
   receiving at least a portion of a data stream;
   identifying a first data stream location, wherein the first data stream location has a predefined data value;
   monitoring subsequent data stream locations which are an integer multiple of a predetermined distance from the first data stream location;
   determining if data values associated with the subsequent data stream locations are equal to the predefined data value;
   asserting an indicator for each subsequent data stream location to indicate the occurrence of the predefined data value; and
   providing the data stream to a data stream parser.

2. A system of receiving data, the system comprising:
   a means for receiving at least a portion of a data stream;
   a means for identifying a first data stream location, wherein the first data stream location has a predefined data value;
   a means for monitoring subsequent data stream locations which are an integer multiple of a predetermined distance from the first data stream location;
   a means for determining if data values associated with the subsequent data stream locations are equal to the predefined data value; and
   a means for asserting an indicator for each subsequent data stream location to indicate the occurrence of the predefined data value.

3. The system of claim 2, further comprising:
   a means for synchronizing the data stream to a clock not based upon the data stream.

4. The system of claim 2, further comprising:
   a means for receiving a data clock for qualifying data associated with the data stream; and
   wherein the step of receiving includes a means for storing a first representation of at least a portion of the data stream based upon a rising edge of the data clock; and
   storing a second representation of at least a portion of the data stream based upon a falling edge of the data clock.

5. The system of claim 4, wherein the first representation of transport stream is stored in response to a first mode of operation where the data is known to be qualified with a rising edge of the data clock, and the second representation of transport stream is stored in response to a second mode of operation where the data is known to be qualified with a falling edge of the data clock.

6. The system of claim 2, wherein a means for receiving includes:
   a means for receiving bits of data associated with a data word sequentially, beginning with a first bit;
   when in a first mode of operation, a means for receiving the bits of data in a memory location with the first bit of data being a right most bit of the data word; and
   when in a second mode of operation, a means for receiving the bits of data in a memory location with the first bit of data being a left most bit of the data word.

7. The system of claim 2, wherein the predefined data value is a hexadecimal value 47 h.

8. The system of claim 2, wherein the predetermined distance is 188 data words from the first data stream location.

9. The system of claim 2, wherein the predetermined distance is an amount of time determined by waiting for an amount of time corresponding to 188 data words.

10. The system of claim 2, wherein the means for asserting includes asserting the indicator when a predetermined number of predefined data value locations have been identified.

11. The system of claim 10, wherein the means for asserting further includes the predetermined number of predefined data values locations being four.

12. The system of claim 11 further comprising:
   a means for negating the indicator for each subsequent data stream location to the occurrence of a value other than the predefined data value.

13. The system of claim 12, wherein the means for negating the indicator includes providing an interrupt to indicate a lock on the predefined data value has been lost.

14. The system of claim 10, wherein the means for asserting further includes the predetermined number of predefined data values locations being programmable.

15. The system of claim 14, wherein the means for negating the indicator includes a means for providing an interrupt to indicate a loss of the predefined data value.

16. The system of claim 14, wherein the means for negating occurs when the occurrence of a value other than the predefined data value occurs over a plurality of subsequent data stream locations.

17. The system of claim 16, wherein a value indicating a number of the plurality subsequent data stream locations is programmable.

18. A system comprising:
   a first module comprising an input to receive a data stream, and an output to identify a first location of the data stream having a predefined value;

a second module comprising a first input coupled to receive the data stream, a second input coupled to the output of the first module, and an output to indicate when subsequent locations of the data stream, at an integer multiple of a predetermined distance from the first location, are determined to have a data value equal to the predefined value.

19. The system of claim 18 further comprising:
a third module to the data stream to a clock not based upon the data stream.

20. The system of claim 18 further comprising:
a clock input to receive a clock to qualify data associated with the data stream.

21. The system of claim 20 further comprising:
a first select controllable to indicate one of a rising edge and a falling edge of the clock qualifying the data associated with the data stream.

22. The system of claim 20 further comprising:
a first storage location to store a first representation of at least a portion of the data stream qualified by a rising edge of the clock; and
a second storage location to store a second representation of at least the portion of the data stream qualified by a falling edge of the clock.

23. The system of claim 18 wherein the second module further comprises a memory location coupled to receive a first bit of the data stream at a right most bit of the memory location when in a first mode of operation and to receive the first bit of the data stream at the right most bit of the memory location when in a second mode of operation.

24. The system of claim 18, wherein the predefined value is 47 h.

25. The system of claim 24, wherein the predefined distance is based upon an amount of time corresponding to the reception of 188 data words from the first data stream location.

26. The system of claim 18, wherein the first module identifies the first location after a predetermined number of data values are identified.

27. The system of claim 18 further comprising a storage location programmable to store the predetermined number of data values.

28. The system of claim 18, wherein the second module to negate the output of the second module in response to the integer multiple of the predetermined distance from the first location representing a subsequent data stream location with a value other than the predefined value.

29. The system of claim 18, wherein the second module to negate the output of the second module in response to the integer multiple of the predetermined distance from the first location representing a subsequent data stream location with a value other than the predefined value for a plurality of subsequent data stream locations.

30. The system of claim 29, wherein the plurality of subsequent data stream locations is programmable.

31. A system of receiving transport stream data, comprising:
a means for receiving data;
receiving a clock to qualify the data;
a means for latching a first data representation of the data on a rising edge of the clock, wherein the first data representation includes a predetermined amount of data;
a means for latching a second data representation of the data on a falling edge of the clock, wherein the second data representation includes a predetermined amount of data;
a means for determining if a specific sequence of data in the first data representation equals a predefined values, wherein the specific sequence of data is a subset of the first data representation; and
a means for determining if a specific sequence of data in the second data representation equals the predefined values, wherein the specific sequence of data is a subset of the second data representation.

32. A system of receiving transport stream data, comprising:
a framer comprising:
a means for receiving data;
receiving a clock to qualify the data;
a means for latching a first data representation of the data on a rising edge of the clock, wherein the first data representation includes a predetermined amount of data;
a means for latching a second data representation of the data on a falling edge of the clock, wherein the second data representation includes a predetermined amount of data;
a means for determining if a specific sequence of data in the first data representation equals a predefined values, wherein the specific sequence of data is a subset of the first data representation; and
a means for determining if a specific sequence of data in the second data representation equals the predefined values, wherein the specific sequence of data is a subset of the second data representation;
a transport stream parser coupled to the framer to parse data identified by the framer.

33. The system of claim 32 further comprising:
a packetized elementary stream parser coupled to the framer to parse data identified by the framer.

* * * * *